US011152847B2

(12) United States Patent
Jitaru

(10) Patent No.: US 11,152,847 B2
(45) Date of Patent: Oct. 19, 2021

(54) ENERGY INJECTION IN A RESONANT CIRCUIT WITH INITIAL CONDITIONS

(71) Applicant: Rompower Technology Holdings, LLC, Milford, DE (US)

(72) Inventor: Ionel Jitaru, Tucson, AZ (US)

(73) Assignee: RompowerTechnology Holdings, LLC, Milford, DE (US)

( * ) Notice: Subject to any disclaimer, the term of this patent is extended or adjusted under 35 U.S.C. 154(b) by 0 days.

(21) Appl. No.: 15/825,647

(22) Filed: Nov. 29, 2017

(65) Prior Publication Data

US 2018/0241299 A1 Aug. 23, 2018

Related U.S. Application Data

(60) Provisional application No. 62/429,373, filed on Dec. 2, 2016.

(51) Int. Cl.
| | | |
|---|---|---|
| H02M 1/08 | (2006.01) | |
| H02M 3/335 | (2006.01) | |
| H02M 1/42 | (2007.01) | |
| H02M 3/155 | (2006.01) | |
| H01F 38/42 | (2006.01) | |
| H02M 1/00 | (2006.01) | |
| H02M 1/34 | (2007.01) | |

(52) U.S. Cl.
CPC ......... *H02M 1/083* (2013.01); *H02M 1/4258* (2013.01); *H02M 3/155* (2013.01); *H02M 3/335* (2013.01); *H02M 3/33553* (2013.01); *H02M 3/33592* (2013.01); *H01F 38/42* (2013.01); *H02M 1/0058* (2021.05); *H02M 1/342* (2021.05); *Y02B 70/10* (2013.01)

(58) Field of Classification Search
CPC ..... H02M 2001/0058; H02M 3/33592; H02M 3/33553; H02M 1/12; H02M 2003/1552; H02M 2003/1586; H02M 3/1584; H02M 3/3353; H02M 3/33576; H02M 3/3374; H02M 7/5387; H02M 1/083; H02M 1/4258; H02M 2001/342; H02M 3/155; H02M 3/335; Y02B 70/1475; Y02B 70/1491; Y02B 70/1433; Y02B 70/126; H01F 38/42
See application file for complete search history.

(56) References Cited

U.S. PATENT DOCUMENTS

| | | | | | |
|---|---|---|---|---|---|
| 5,410,467 | A | * | 4/1995 | Smith | H02M 3/158 363/131 |
| 5,430,632 | A | * | 7/1995 | Meszlenyi | H02M 3/3382 363/17 |
| 9,712,055 | B1 | * | 7/2017 | Swartz | H02M 3/158 |
| 2005/0226009 | A1 | * | 10/2005 | Jitaru | H02M 3/28 363/17 |

(Continued)

*Primary Examiner* — Emily P Pham
(74) *Attorney, Agent, or Firm* — Thomas W. Galvani, P.C.; Thomas W. Galvani

(57) ABSTRACT

In this invention we introduce the concept of energy injection in a resonant circuit with initial conditions which is part of almost all of the present topologies. The patent will present in details several methods of energy injection in a resonant circuit with initial conditions and how it is applies to different topologies. The patent presents also a simple and economical method of driving the clamp switch in a flyback topology operating in discontinuous mode and a bias circuit in a flyback topology wherein the output voltage varies over a large range.

5 Claims, 44 Drawing Sheets

(56) References Cited

U.S. PATENT DOCUMENTS

| | | | |
|---|---|---|---|
| 2010/0067259 A1* | 3/2010 | Liu | H02M 3/33569 363/21.01 |
| 2012/0020122 A1* | 1/2012 | Fornage | H02M 3/33507 363/21.12 |
| 2014/0092643 A1* | 4/2014 | Luccato | H02M 3/335 363/21.12 |
| 2015/0326105 A1* | 11/2015 | Pan | H02M 1/143 363/21.12 |
| 2017/0012547 A1* | 1/2017 | Jitaru | H02J 3/00 |
| 2018/0153020 A1* | 5/2018 | Sun | H02M 3/33553 |
| 2018/0198374 A1* | 7/2018 | Jitaru | H02M 3/3353 |

* cited by examiner

A.) $Zc = \sqrt{\dfrac{L_m}{C_{eq}}}$

B.) $\omega = \dfrac{1}{\sqrt{L_m * C_{eq}}}$

C.) $\theta = \arctan(Zc * \dfrac{I_m}{V_r - V_{in}})$

D.) $V_{SW}(t) = V_r - (V_r - V_{in})\dfrac{\cos\theta - \cos(\theta - \omega t)}{\cos\theta}$ E.) $I_{Lm}(t) = (V_r - V_{in})\dfrac{\sin(\theta - \omega t)}{Zc * \cos\theta}$ F.) $E = \dfrac{1}{2}C_{eq}V_r^2 + \dfrac{1}{2}L_m I_m^2$

ENERGY INJECTION IN A RESONANT CIRCUIT WITH INITIAL CONDITIONS

INTRODUCTION

The resonant circuit formed by an inductive element and the parasitic capacitance across a switching element is part of many topologies used in power conversion. Traditionally this resonant circuit causes ringing across the switching element and the energy contained in the resonant circuit is dissipated. The continuous quest for higher efficiency and higher power density lead to a detailed study of this resonant circuit and several solutions to harvest this energy are presented in this patent application. In this application are also described several solutions to inject additional energy in the resonant circuit with initial conditions previously described in order to create zero voltage switching conditions across the switching element at the time when the switching elements turns on. The resonant circuit with initial condition is part of many topologies presently used, such as flyback topology, boost topology, sepic topology, buck topology two transistor forward topology and many others. This application will focus mostly on the flyback and boost topology, though the same concept claimed in this patent will also apply to the rest of topologies. This patent application will offer solutions to harvest the energy in the resonant circuit with initial conditions and also solution of energy injection into the resonant circuit in order to accomplish certain goals such as zero voltage switching conditions across the switching element.

This application will also offer solutions for efficiency improvements in flyback topology which is the preferred topology in AC-DC adapters. The significant technological advancement in portable computing devices, laptops and tablets wherein the size has been significantly reduced, the AC-DC adapters remain further quite large. This has created pressures for the size reduction. To reduce the size of the adapters and maintain the convection cooling methodology used today does require a significant improvement in efficiency. Increasing the operation frequency in the flyback or any other topology for size reduction of the magnetic and capacitive devices, does require zero voltage switching across the switching elements. Though there has been a significant improvement in the semiconductor technology and the present high voltage switching devices have much lower on resistance and smaller parasitic capacitance especially with the introduction of GaNs technology, there are other parasitic capacitances created by the magnetics, layouts which are still dominant. Zero voltage switching at turn on across the primary switching devices will also eliminate the ringing across the secondary switching element such as the synchronous rectifier.

Zero voltage switching in flyback topology can be accomplished in prior art through complex implementations such as the active clamp. This method does have some limitations and requires an increased amount of circulating current which will negatively impact the efficiency.

The prefer solution for zero voltage switching is by harvesting the energy contained in the parasitic elements such as the energy contained in the resonant circuit with initial conditions and the energy contained in the leakage inductance. In the patent application "Resonant Transition Controlled Flyback", application No. 61/821,884, is presented such a concept and also in the US U.S. Patent application US2011/0228569 A1 and US Reissued Patent, US-RE40,072E.

In the prior art previously presented the energy contained in the resonant circuit with initial condition is harvested to lower the voltage across the primary switching element at turn on and in the U.S. patent application "Resonant Transition Controlled Flyback", application No. 61/821,884 additional energy is added to the resonant circuit with initial conditions through "push back current:" wherein the rectifier means is allowed to conduct in reverse and in this way transferring the energy from the output towards the resonant circuit with initial conditions. This solution does require a sophisticated control mechanism wherein the synchronous rectifier conduction time is tailored for the proper amount of push back current. This solution would not work in the event we are using diodes or emulated diodes, wherein the synchronous rectifier turns off when the current through it becomes very small. The solution presented in application it is not the most efficiency solution to obtain zero voltage switching because the energy is transferred from the secondary after the energy was already processed, back to the primary.

SUMMARY OF THE PRESENT INVENTION

The resonant circuit with initial conditions is depicted in FIG. 1A. It is composed by a voltage source, Vin, an inductive element, Lm, a switching device SW, and a capacitor across SW, Ceq. The initial conditions are the voltage across the Ceq, Vr, and the current flowing through Lm, Im. In FIG. 1B are presented the key parameters associated with the resonant circuit with initial conditions such as, the characteristic impedance, Zc, the resonant frequency, $\Omega$, the phase lag and the equation for the voltage across Ceq and the current through Lm. In FIG. 1C is depicted the voltage across Ceq, based on the equations from FIG. 1B and the current through the inductive element Lm. As depicted in FIG. 1C the voltage across Ceq will start ringing with a frequency given by $\Omega$. It will start decaying in a resonant manner from the initial value Vr, decaying to a lowest level, referred also as the first valley and continue to ring. In real applications the inductive element Lm and the capacitance Ceq are not ideal devices as a result there will be power dissipation and the amplitude of the ringing will decay as depicted by the dotted line. After the energy contained in the resonant circuit with initial conditions will dissipate the voltage across Ceq will be settled to the level of input voltage source, Vin. The current through the inductive element will start from its initial conditions, Im, and ring with the same frequency as the voltage across the Ceq. As mentioned before, because the inductive element Lm and Ceq are not ideal devices the energy contained in the resonant circuit with initial conditions will dissipate and the amplitude of the current through Lm will decrease towards zero. The initial energy stored in the resonant circuit with initial conditions is the summation of the energy stored in the capacitor Ceq charged with the voltage Vr and the energy contained in the inductive element Lm with the initial current flowing through it, Im.

This resonant circuit with initial conditions is a key part of many topologies. In FIG. 2A is depicted a flyback topology using a transformer with N1 turns in the primary and N2 turns in the secondary. The dotted line in FIG. 2A carves out the resonant circuit with initial conditions, which in this case is formed by the primary of the transformer, the Ceq which is the parasitic capacitance reflected across the switch SW. This is formed by the parasitic capacitance of the switch SW in parallel with the parasitic capacitance reflected across the primary of the transformer, which represent the parasitic capacitance across the primary winding, the parasitic capacitance across the secondary winding reflected in the primary, the parasitic capacitance of the secondary rectifier means, Do, the parasitic capacitance between switching node A and the input ground caused by the layout and any other circuitry which may be connected to the switching node (A). The initial voltage condition presented in the resonant circuit with initial conditions of FIG. 1A, is Vr=Vin+n*Vo. In the event wherein the rectifier Do does not have any reverse current and that the flyback topology of FIG. 2A operated in discontinuous mode there will not be any initial current conditions through the primary of the transformer. The voltage in the switching node (A) will start ringing as described in FIG. 2B. Due to the conduction losses in the impedance of the primary winding, and losses in the magnetic core of the transformer Tr1 the ringing across switching element will decay settling at the level of input voltage Vin.

In order to minimize the switching losses when SW is turned on sophisticated controllers were developed to turn in the primary switching element, SW, at the valley, where the voltage in switching node (A) it is the lowest, employing what is known in the industry as valley detection circuits.

The resonant circuit with initial conditions is also part of the traditional boost converter operating in discontinuous mode as depicted in FIG. 3A. It is composed by the primary voltage source, Vin, the inductive element Lm, the switching element SW, and the parasitic capacitance across the switching element SW, Ceq, which is formed by the parasitic capacitance across Lm, SW, and the rectifier Do. The initial voltage conditions across Ceq are the output voltage, Vo. If the rectifier means, Do, does not conduct in reverse and the operation of the boost converter is done only in discontinuous mode there will not be any initial current through Lm. The voltage in the switching node (A) is ringing as depicted in FIG. 3B and the amplitude of the ringing will decay as a result of the losses in Lm and Ceq, settling to the level of Vin. In application wherein the Vo it is at least twice the input voltage Vin, the voltage ringing in the switching node (A) will reach zero voltage.

In FIG. 4A we identify the resonant circuit with initial conditions as part of the buck topology. The resonant circuit is formed by the inductance element Lm, and the parasitic capacitance across SW1, Ceq, which combines the parasitic capacitance across SW1, SW2 and Lm. The initial voltage condition across Ceq1 is the input voltage, Vin. The ringing caused by the resonant circuit with initial condition will settle to the Vo voltage level.

In FIG. 5A depicts the two transistor forward topology wherein we can identify the resonant circuit with initial conditions formed by the primary of the transformer TR1, and the parasitic capacitances Ceq1 and Ceq2. The initial voltage across the Ceq1 and Ceq2 is Vin. In the event wherein the current through Lo is lower than zero, which will happened at very light load situations the voltage across Ceq1 and Ceq2 will ring as described in FIG. 5B and will settle at the voltage which is half of the input voltage Vin/2 across each switching element.

As previously presented the resonant circuit with initial conditions it is present in many topologies and the energy contained in the resonant circuit with initial conditions traditionally has been dissipated. In addition to the energy loss the ringing in the switching node of the resonant circuit with initial conditions create additional noise in the circuit and creates problem in meeting the EMI compliance.

In FIG. 6A is presented a Prior Art concept wherein the energy existing in the resonant circuit with initial conditions it is preserved for a period of time when SW aux is turn on. While SWaux is turned on the voltage in the switching node A is not allowed to go below the Vin level. The resonant transition in A starts when the voltage in A is Vr. While the energy containing in Ceq is decreasing by the decrease in the voltage across Ceq, the current through Im is increasing. As depicted in FIG. 5B. In the circuit depicted in FIG. 6A the current through Im reaches its peak when the voltage in the switching node A reaches Vin. When the voltage in A will try to go below Vin level the Im is shorted by D1 in series with SWaux which was tuned on prior the voltage in A reached Vin level as depicted in FIG. 6B. During the time SWaux is on the current keeps circulating through Lm, D1 and SWaux. Due to the conduction losses the energy contained in Lm is not totally preserved and as depicted in FIG. 6B is decaying in amplitude. During this time the voltage in A is maintained at Vin level. Without the circuit formed by D1 and SWaux in the switching node A we will have the natural ringing depicted in FIG. 6B with dotted line, ringing which will also attenuate due to the losses in Lm and SWaux.

When SWaux is turned off the current flowing through Lm, Im will start discharging the capacitor Ceq as depicted in FIG. 6B. The voltage across Ceq would be discharged to the first valley level if the losses in D1 and SWaux are negligible. In reality the voltage in A will decay to a voltage higher than the first valley level. This technique it is described in the Patent application "Resonant Transition Controlled Flyback", application No. 61/821,884. In addition to this the patent application does described also a method of energy injection into he resonant circuit with initial conditions by using push back current technique wherein the synchronous rectifier is held on after the current reaches zero. This concept it is also described in different implementation also in the US Patent and US Patent.

In our application we do consider this concept as Prior Art. The prior art described in FIGS. 6A and 6B does have several drawbacks. One major drawback is the fact that the energy which is intended to be preserved by turning on SWaux is considerable dissipated for larger conduction time of SWaux. In addition to that it does not offer a method of energy injection in the resonant circuit with initial condition to preserve the original level of energy or even better to assure that the voltage in switching node A does reach zero even if the natural ringing in A would never be able to reach zero. Neglecting the losses in the resonant circuit with initial conditions the voltage in A can reach zero during the ringing if Vr is twice Vin level. In application wherein Vr is smaller than twice Vin, zero voltage switching will never be obtained in the Prior Art.

The present invention does offer several solutions wherein the voltage in A will reach zero regardless of the value of Vin and Vr.

One embodiment of this invention is described in FIG. 7A and FIG. 7B. The circuit placed across Lm is composed by a voltage source Vinj, a diode D1 and a controlled switching element SWaux. The diode D1 may not be necessary if by sensing and control SWaux will conduct in only one direction.

The controlled switching element SWaux is turned on prior the resonant transition which starts at the time t1. Ay time t1 the resonant transition starts and the voltage in switch node A starts to decay in a resonant manner. During this resonant transition the energy from Ceq is transferred to Lm, and the current through Lm is increasing accordingly. At t2, the voltage in the switching node A reaches Vin+Vinj level and the current through Lm reaches the I ring(t2) level as described in FIG. 7B. The voltage in A cannot decrease under the level of Vin+Vinj because the SWaux is already on and the voltage in A is clamped to Vin+Vinj level. The voltage across Lm is held at Vinj level. This voltage applied across Lm will generate a current above the Iring (t2) level, additional current which is described by the Iring (t) equation in FIG. 7B. For example if the Vinj level would be the same as the voltage drop on D1 and the voltage drop across SWaux due to its impedance, then the Iring (t) will have a constant amplitude. That means that the energy contained in the resonant circuit with initial conditions at time t2 will be perfectly preserved regardless of the losses in D1, SWaux and Lm.

At t3 when the SWaux is turned off the voltage in A will tart decaying in a resonant manner. In the event Vinj is tailored to be equal to the voltage drop across D1 and the voltage across SWaux, the voltage in A will decay to the level of the first valley of the natural ringing which will occur if the circuit composed by Vin, D1, and SWaux would not be placed across Lm. However, in many applications the goal is to inject additional energy in the resonant circuit with initial conditions to obtain lower voltage in A at t4, preferable zero voltage level.

In order to accomplish zero voltage across SW at t4, the Vinj is tailored accordingly. This circuit offers a very high degree of flexibility to allow the voltage at t4 to reach the desired level. This is a big difference from the Prior Art circuit wherein the voltage in the switching node A will reach the lowest level in the ideal condition equal with the first valley of the natural ringing. In many applications that level is not satisfactory and creates only limited performance enhancement.

In addition this embodiment of this invention does offer a very high degree of flexibility in controlling the voltage in A at t4 to reach any desired voltage level, regardless of the transition between Vr and Vin, or the value of the Lm and Ceq or the losses in the resonant circuit with initial conditions and the auxiliary circuit formed by Vin, D1 and SWaux.

The idealized implementation depicted in FIG. 7A may be difficult due to the presence of a floating switch SWaux. However, there is other simple way of implementing this concept without deviating from its core concept. Such an implementation is depicted in FIG. 8. In FIG. 8 we employ an auxiliary winding Laux coupled with the main winding Lm. The additional circuit formed by D1, SWaux and Vinj is placed across this winding.

In FIG. 9A we present an implementation of the embodiment depicted in FIG. 7A. The implementation it is in a flyback topology operating in discontinuous mode. The transformer Tr1 has a primary winding L1, a secondary winding L2 through which the power is delivered to the load connected across Vo. In addition to that there is another winding L3, in the primary side, which is responsible to provide the bias power. The resonant circuit with initial conditions is formed by Vin, L1 and M1 controlled by the control signal VCM1, and the parasitic capacitance reflected across M1. The bias circuit is formed by the bias winding L3, the bias rectifier means M3 controlled by the control signal VCM3 and the bias capacitor C bias.

The secondary power circuit is formed by the secondary winding L2, the output capacitor Co and the secondary rectifier means M2 controlled by the control signal VCM2.

The additional circuit which is added to this conventional flyback circuit is formed by SWinj, the diode D1 and the Vinj. This additional circuit is placed across the bias winding. It has to be noted that this additional circuit can be placed on any additional winding in the transformer or across secondary winding L2 or primary winding L1. The SWinj can be implemented by an N channel Mosfet driven from the ground level as described in FIG. 32, by the driving circuit Db2, Cb1 and Rb1.

In FIG. 9B are presented the key waveforms associated with the circuit depicted in FIG. 9A. In FIG. 9B are depicted VcM1, which is the control signal for the main switch, VcM2 which is the control signal for the secondary rectifier means M2, VcSWinj which is the control signal for SWinj, Vds(M1) which represents the voltage across the main switch M1, which is the same as the voltage in the switching node A, Imag(Tr1) which is the magnetizing current through the transformer and I(M1) which is the current through the main switch, M1.

Between to and t1, the main switch M1 is turned on. The magnetizing current will built up during this time accumulating energy in the transformer. The current will build up through the main switch as well.

At t1 the main switch turns off. The magnetizing current will be transferred to the secondary winding and the energy accumulated in the transformer during the t0 to t1 is starts to be transferred to the output.

At t2 the resonant transition starts and the voltage across M1 will start decaying from Vin+Vo(N1/N2) towards Vin+Vinj*(N3/N1).

At t2, the voltage across M1 reaches the level of Vin+Vinj*(N3/N1). The switching device SWinj is already turned on and the voltage in A is clamped to Vin+Vinj*(N3/N1).

Between t3 and t4 the current through the magnetizing current is further build up by the Vinj reaching the amplitude of Iring (t4) at t4.

At t4 SWinj is turned off and the Imag(t4) will start discharging the parasitic capacitance reflected across M1 towards zero.

At t5 the voltage across M1 reaches zero. During t4 to t5 the current through M1 is negative discharging the parasitic capacitance across M1.

In this patent embodiment, zero voltage switching conditions across M1 can be achieved in any operating conditions regardless of the parasitic capacitance reflected across the primary switch.

In this patent application we will present several efficient methods of producing the Vinj.

In FIG. 10 is presented such a concept wherein the energy is taken form an additional winding Linj through a Cinj Charger circuit.

In FIG. 11A is presented such a Cinj Charger circuit. The energy for the Vinj is taking during the on time of the main switch M1 in a forward mode.

In FIG. 11B are depicted several key waveforms of this circuit, V3, which represents the voltage across the Vinj winding, the current through the Lo (inj) inductor element, the voltage across the Cinj capacitor and the injection current I (D1).

Between t0 to t1 which is the time when the main switch M1 is on the current builds up through the Lo(inj) as depicted in 11B. The peak current reached at t1 is function of the input voltage reflected in the Linj winding, the value of the inductance and the on time of the main switch M1. At t1 a certain amount of energy is stored in Lo(inj).

At t1 the voltage across the Linj winding, V3 changes its polarity and the current through D(inj) will start decaying until reaches zero current level at t2.

At t3, the magnetizing current flowing towards the secondary winding L2 reaches zero and M2 is turned off. The voltage V3, across Linj winding becomes zero.

The injection current produced by Vinj starts at t3 and ends at t4

At t4 the primary switch M1 is turned on and the cycle repeats. The average current through Lo(inj) which controls the Vinj level is function of the input voltage and the on time of the primary switch. Though the proportionality with Vin is desired, the proportionality with on time of the main switch conduction time is not desirable. because the on time is larger at high line and lower at high line makes the Vinj voltage level less dependent of the Vin and makes the Vinj also dependent on the power level which is not one of the goals. The main goal is to make the Vinj proportional with the input voltage and independent of the power level. That is because we want to increase the energy injection into the resonant circuit with initial conditions at higher input voltage where the energy requited to discharge the parasitic capacitance is higher.

In FIG. 12A is presented another embodiment of this invention wherein the voltage across Cinj, which represents Vinj is proportional with the input voltage and independent of the power level. That is accomplished by using a quasiresonant circuit formed by Lr and Cr. The circuit functionality is described by the key waveforms depicted in FIG. 12B The key waveforms depicted in FIG. 12B are the voltage across the Linj winding, V3, the quasi-resonant current I(Lr), the voltage across Cr, V(Cr) and the current through D1, I(D1).

During the conduction time of the primary switch M1, a voltage is applied to the Linj winding which has amplitude of Vin*(N4/N1). The resonant inductor Lr and the resonant capacitor Cr will resonate creating a resonant current I(Lr) with an amplitude described by the formula from FIG. 12B. The current has the half sinusoidal shape because the presence of the diode Dr1 which does not allow the current to flow in reverse. The resonant current will reach a peak at t1 and becomes zero at t2. The voltage across the resonant capacitor reaches amplitude of Vin*(N4/N1) at t1 and twice that amplitude at t2. At t2, the energy transfer to the resonant circuit ends and the energy is stored in Cr at t2. That energy is further transferred to the Cinj by the current flowing through Lo(inj) which acts as a current source discharging the voltage across the Cr in between t2 to t4. At each cycle a quantum of energy is transferred from the input source Vin, in a forward mode to the resonant capacitor Cr. The energy stored in Cr is proportional with the value of Cr and proportional with the square of the input voltage Vin. The energy contained in the parasitic capacitance reflected across M1 it is also proportional with the square of the input voltage. It means that by choosing the proper value for the N4, Lr, and Cr the energy injection it is automatically adjusted over the input voltage range to discharge the parasitic capacitance reflected across M1 to zero. Though this circuit it is more complex does have the advantage that the energy injection to obtain zero voltage switching across M1 it is automatically adjusted over the input voltage range.

At t4, the voltage across Cr reaches zero which means that the entire quantum of energy transferred to the resonant circuit formed by Cr and Lr is transferred to the current source Lo(inj).

At t5, the voltage across Linj becomes zero until t6 when the cycle will repeat again.

The current injected into the magnetizing inductance is depicted in I(D1) and the slope of that current is function of the voltage, Vinj and the value of the magnetizing inductance.

In FIG. 13 is presented another implementation of this concept wherein the additional winding Linj is replaced by a small transformer Tr2 which is connected to the bias winding via a capacitor Cc. This concept has the advantage that the voltage applied to the resonant circuit formed by Cr and Lr can be easily tailored by the turn ratio of the transfer Tr2, N21/N22. In many applications the leakage inductance between L21 and L22 will be forming the resonant inductor Lr. In application wherein this leakage inductance it is not sufficient and additional resonant inductor Lr' is added as per FIG. 13. The additional transformer can be implemented on a small toroid. This solution it is simpler from manufacturing perspective than adding another winding on the main transformer Tr1.

The energy injection method claimed in this patent application does also apply to buck topology as the one described in FIG. 14A. The simple buck topology has an input voltage source, Vin, two switching devices, M1 and M2, and inductive element Lo and an output capacitor Co. The additional circuit for energy injection is composed by a diode D1, a voltage source, Vinj, and a switching element SW1.

In FIG. 14B are depicted the key waveforms of the topology presented in FIG. 14A. The key waveforms are: VcM1 which is the driving signal of M1, VcM2 which is the driving signal of M2, VcSW1 which is the driving signal of SW1, the voltage in switching node A, V(A), and the current through Lo, I(Lo).

Between t0 to t1, M1 is conducting and in the event Vin>Vo the current I(Lo) is building up through Lo forced by the voltage (Vin−Vo) applied to Lo, as depicted in FIG. 14B.

At t1, M1 turns off. The current through Lo continue to flow. For a short period of time between t1 to t2 the current will flow through the body diode of M2. This time interval has to be as small as possible in order to maximize the efficiency because the large voltage drop on the body diode in comparison with the voltage drop across M2 while M2 is on. This interval it is necessary in order to avoid cross conduction between M1 and M2.

At t2, M2 is turned on and the current will continue the conduction through M2.

The voltage across Lo it is (−Vo) and the current will ramp it down reaching zero level at t3.

After t3, the voltage in A start ramping up reaching the level of (Vo−Vinj) at t4. Without the presence of the energy injection circuit formed by D1, Vinj and SW1, there would be a natural ringing as described by the dotted line ringing in FIG. 14B.

At t4, the current through Lo becomes Io(Lo) t4, through at t3 the current through Lo was zero. The current I(Lo)t4 flowing through Lo in the direction from Vo towards A, is the expression of the energy contained in the parasitic capacitance between A and ground, at t3. That energy is transferred into the energy of the magnetic field stored in Lo.

Between and t4 and t5 the current through Lo will be ramping up reaching the level of I(Lo)t5 at t5. The difference between the current I(Lo)t5 and I(Lo)t4 is produced by the energy injected by Vinj which is placed across Lo. Without the presence of Vinj the I(Lo)t5 would be smaller than I(Lo)t4 due to the losses in D1, SW1 and Lo.

At t5 SW1 is turned off and the current flowing through Lo will start charging the voltage in A until reaches Vin and when will turn on the body diode of M1 creating zero voltage switching condition for M1 at turn on.

The energy injection circuit not only that eliminated the natural ringing in A but adds more energy in Lo to be able to create zero voltage switching conditions for M1.

The resonant circuit with initial conditions is also presented in the two transistor forward topology as presented in FIG. 15A. The methodology claimed in the patent referred to as "energy injection in a resonant circuit with initial conditions" does apply also to this topology as depicted in FIG. 15A. The additional circuit for the energy injection it is placed across an additional winding L3. It can be also placed across L1 or L2.

The two transistor forward topology depicted in FIG. 15A is composed by a transformer Tr1 with a primary winding L1, a secondary winding L2, two primary switchers M1 and M2 and two reset diodes, Dr1 and Dr2. In the secondary we have the forward rectifier means SR1, the freewheeling diode means SR2, the output inductor Lo and the output capacitor Co.

Across additional winding L3 is placed the energy injection circuit formed by D1, SWinj and Vinj(Vin).

The key waveforms depicted in FIG. 15B are: VcM1 and VcM2, which are the control signals for M1 and M2. The control signals for M1 and M2 are the same in this topology. The other key waveforms depicted in FIG. 15B are, VcSR1, which is the control signal for SR1, VcSR2 which is the control signal for SR2, Vc(SWinj) which is the control signal for SWinj, IM which represents the magnetizing current and the voltage across M2, Vds(M2).

Between t0 to t1 both M1 and M2 are on. The magnetizing current will build up as is depicted in FIG. 15B by IM.

At t1 the primary switchers M1 and M2 are turned off and the magnetizing current will turn on the reset diode Dr1 and Dr2 starting the reset cycle of the transformer which ends at t2.

At t2 the resonant circuit with initial conditions starts the resonant transitions. The resonant circuit is composed by the primary inductance L1 and the parasitic capacities reflected across M1 and M2. The initial condition is the voltage across the parasitic capacitances reflected across M1 and M2 which is Vin.

The energy contained in the parasitic capacitances reflected across M1 and M2 starts to be transferred in the energy stored in L1 by the creation of a negative IM.

At t3 the negative magnetizing current is IM(t3). From, t3 to t4 the negative magnetizing current is built up from IM(t3) to IM(t4) by the voltage source Vinj (Vin) placed across L3.

This mode of operation does occur only of the current through Lo at t3 it is smaller than IM(t3).

At t4, SWinj is turned off and the magnetizing current IM(t4) will start discharging the parasitic capacitance reflected across M1 and M2.

For the right value of IM (t4) the voltage across M1 and M2 will reach zero at t5. The right value of IM(t4) is reached by controlling the Vinj(Vin). The Injection voltage has to be proportionate with the input voltage, which means that at higher Vin, the injection voltage has to be higher. Such a circuit was described in FIG. 12A and and FIG. 13.

The resonant circuit with initial condition it is also part of the boost topology operating in discontinuous mode circuit described in FIGS. 3A and B.

In FIG. 16A is depicted a boost converter with the energy injection circuit. The basic boost converter is composed by an inductive element L1, M1, M2 and the output capacitor Co.

In addition to the standard boost converter in FIG. 16A is implemented the energy injection circuit composed by M3, D1 and Vinj. The energy injection circuit is placed across the auxiliary winding L2.

The key waveforms of the circuit depicted in 16A are presented in FIG. 16B. These waveforms are: the control signal for M1, VcM1, the control signal for M2, Vc M2, the control signal for M3, VcM3, the voltage in the switching node A, the magnetizing current through T1, Imag(T1), and the current through M, I(M1).

Between t0 to t1 M1 is on and the current will flow from Vin, through L1, building up its amplitude as depicted in FIG. 16B.

At t1, M1 turns off and the current continue to flow initially through the body diode of M2 until M2 turned on at t2. For higher efficiency the time interval between t1 and t2 shall be as small as possible, due to the body diode larger voltage drop by comparison with the voltage drop across M2 during the time M2 is on.

Between t2 to t3, M2 is on and the magnetizing current start decaying towards zero as depicted in FIG. 16B. During this time interval the energy stored in L1 is transferred to the output, Vo, flowing through Co and the load placed across Vo.

At t3, the resonant transition is initiated by the resonant circuit with initial conditions. The voltage in switching node A start decaying in a resonant manner. During this time the energy stored in the parasitic capacitance between A and ground, which contains the parasitic capacitance across M1, M2 and L1, is discharging and that energy and transferred to T1 by building up the magnetizing current in T1 from zero to Imag(T1)t4. M3 was turned on sometime in between t2 and t3.

At t4 the voltage in A reaches the value of Vin+Vinj(M1/N2) and the value of the magnetizing current through T1 becomes Imag(T1)t4.

Between t4 to t5 the magnetizing current through T1 will increase from IM(T1)t4 to IM(T1)t5 This increase is due to the energy injection in T1 when the Vinj which is placed across the auxiliary winding L2.

At t5 M3 is turned off and the magnetizing current in T1, now becoming the current through L1 will start discharging the parasitic capacitance between A and the ground as previously described.

At t6 the voltage in A will reach zero creating zero voltage switching conditions for M1.

In this invention we eliminate the natural ringing in the boost converter, natural ringing depicted in FIG. 3B and also we ensure zero voltage switching across M1 at turn on in any conditions by properly tailoring the Vinj.

In FIG. 17 is presented a bridgeless PFC implementation using one of the embodiments of this invention. To ensure that the natural ringing is eliminated and to make sure that both switch devices M1 and M2 do turn on at zero voltage switching conditions the windings L21 and L22 are coupled with the main inductor L1. The voltage injection which is tailored to ensure zero voltage switching is placed in series with D1. M3 and M4 will control the energy injection on both phases of the AC line. In FIG. 17 GaNs switchers are used for M1 and M2. In FIG. 18 it is used regular silicon Mosfet and the diodes D4, D5, D6 and D7 are used to prevent the body conduction of M2 and M1. However, by design the operation of the boost topology in FIG. 18 can be done only in discontinuous mode and only in extremes to the boundary conditions. In such a case the diodes D4, D5, D6 and D7 may not be necessary to be placed in the circuit.

The low frequency diodes, DLF1 and DLF2 can be replaced by active synchronous rectifiers to further improve the efficiency as depicted in FIG. 17 and FIG. 18.

Though in many publications the totem pole bridgeless PFC as depicted in FIGS. 17 and 18 are operating in critical conduction time to obtain zero voltage switching, in this invention the bridgeless PFC can operate in discontinuous mode and critical conduction as well. In this way the frequency variation it is much narrower than in the operation in critical conduction only.

In FIG. 19A is presented a resonant circuit with initial conditions formed by the input voltage source Vin, an inductive element Lm, a switching element SW, a capacitor Ceq and the initial condition is the voltage Vr across Ceq.

In addition to this resonant circuit with initial conditions there is a current source Iinj across Lm.

In FIG. 19B are described the key waveforms such as the control of the switching element SW, VcSW, the voltage in the switching node A, and the current injection Iinj. The voltage in switching node A depicts the natural ringing due to the resonance between Lm and Ceq. The current source Iinj, which is presented as a half sinusoidal shape is applied just before Vcsw is on with some overlapping with VcSW. The current source Iinj, which can be shaped in any form, such as triangle, trapezoidal to rectangular shape, though the easiest implementation and described in details in this patent application, is half sinusoidal.

In FIG. 20 is presented the same concept described in FIG. 19A but the current source, Iinj it is placed on the separate winding coupled with the main winding which is part of the resonant circuit with initial conditions. Placing the current source Iinj in a separate winding does offer some key advantages in simplicity.

In FIG. 21A is presented a circuit which employs the energy injection circuit previously presented in this patent and formed by Vinj, D1 and SWaux together with the Iinj circuit. This combination does have several advantages. First of all as described in FIG. 21B the voltage in the switching node A does not have the natural ringing as the circuit in FIG. 19A. In addition to this the energy contained in the natural ringing it is harvested and additional energy is further injected in the resonant circuit with initial conditions between t3 to t4 as depicted in FIG. 21B.

The resonant circuit with initial condition has as initial voltage across Ceq which is Vr. At to the resonant transition starts and the voltage across Ceq is decaying in a resonant manner until the voltage in A reaches Vin+Vinj level which is occurs at t1. At t1 the current through Lm which was zero at t0 also reaches the level of Im(t1). In between t1 to t2 the Vinj is injecting additional energy into the Lm, and at t2 the current through Lm reaches the level of Im(t1) as per equation of Im(t) presented in FIG. 21B. This mode of energy injection was previously described in this patent application and it is one of the key embodiments of this patent application. At t2, SWaux is turned off and the current flowing through Lm, which at that time is Im(t2) will discharge the parasitic capacitance of Ceq towards zero. That energy may not be enough to discharge the parasitic capacitance Ceq to zero level and at t3, the current source, Iinj is activated. The current source reaches its peak at t4 and becomes zero again at t5.

The current source Iinj will further discharge the parasitic capacitance reflected across SW towards zero reaching zero level at t4.

The switching element SW is turned on by VcSW at t4 when the voltage across SW is zero.

There is an overlapping between Iinj and VcSW, overlapping controlled by a phase shift which may be controlled for performance optimization such as efficiency optimization. The voltage in A may reach zero sometime between t3 to t5. For simplicity is FIG. 21B is presented to reach zero at t4

In FIG. 22 is presented the flyback topology wherein the concept depicted in FIG. 21A is utilised.

The energy injection circuit formed by SWinj,D1 and Vinj is placed across the auxiliary winding L3. In addition to that we have a resonant circuit formed by M4, Lr and Cr which is designed to generate the Iinj as per FIG. 21 and FIG. 20.

Another implementation of the circuit described in FIG. 22 is presented in FIG. 23. The resonant circuit which generates the Iinj shaped in a half sinusoidal shape is generated by Lr', Cr and the control switch M4. The leakage inductance between the primary winding L1 and the auxiliary winding L4 is part of the resonant circuit in series with Lr', which is placed in the event that the leakage inductance value it is not adequate as depicted in FIG. 23.

Another advantage of the implementation of FIG. 23 besides that the leakage inductance between L1 and L4 which can be used as a resonant inductor is the fact that the driving of M4 is done form the ground level which simplifies greatly the circuit.

The key waveforms for the circuit depicted in FIG. 22 and FIG. 23 are presented in FIG. 24.

The waveforms presented in FIG. 24 are, VcM1, which is the control signal for M1, VcM2 which is the control signal for M2, VcSWinj which is the control signal for SWinj, Vds(M1) which is the voltage across M1, Imag(Tr1) which is the magnetizing current though the transformer Tr1, I(M1) which is the current through M1, Iinj which is the resonant current through the Lr, VcM4 which is the control signal for M4.

Between t0 to t1 the main switch M1 is on and the magnetizing current will build up through the transformer Tr1 storing the energy in the magnetic field of the transformer.

At t1 the primary switch M1 turns off and the magnetizing current starts flowing towards the secondary winding L2, initially through the body diode of M2 until M2 is turned on.

The energy transfer to the secondary will continue between t1 to t2 when the current through M2 will reach zero level and the entire energy stored in the transformer is delivered to the output, to Co and the load placed across Vo.

At t2 the resonant circuit with initial condition formed by L1 and the parasitic capacitance reflected across M1 will start the resonant transition. The initial condition for their resonant circuit it is the voltage across the parasitic capacitance reflected across M1 which is Vin+(N1/N2)*Vo.

The voltage across M1 will start decaying in a resonant manner until reaches the level of Vin+Vinj*(N1/N3). The natural ringing displayed with dotted line will occur if the energy injection circuit formed by SWinj, D1 and Vinj will not be placed across L3. Between t3 to t4 the energy contained in the resonant circuit with initial conditions previously described is preserved and additional energy injected by Vinj will add to the amplitude of the magnetizing current Imag(Tr1) as described in FIG. 24, increasing the magnetizing current from Imag(Tr1)t3 to Imag(Tr1) t4.

At t4 SWinj turns off and the magnetizing current flowing through Tr1 will be transferred in L1 and start discharging the parasitic capacitance reflected across M1 towards zero. The energy contained in the magnetizing current it is not enough in this implementation to discharge the parasitic capacitance reflected across M1 to zero. The voltage across M1 at t5 reaches Vds(M1).

At t5, M4 is turned on and a resonant current Iinj starts flowing through Lr and L3 in FIG. 22 and through Cr and L4 in FIG. 23. The energy is provided by the charge in the resonant capacitor Cr which was charged in the previous cycle.

The resonant current Iinj will be transferred to the primary winding and discharge the parasitic capacitance reflected across M1 towards zero. By design the resonant current Iinj is chosen to be enough to discharge the parasitic capacitance across M1 to zero or slight higher than zero if that would provide the highest efficiency. At t6 the primary switching element M1 turns on at zero voltage switching conditions. The resonant current, Iinj, will reach zero level at t7 and after that the polarity will change and become negative as depicted in FIG. 24.

After t6 the input voltage reflects across L3 with amplitude of Vin*(N3/N1) in FIG. 22. This voltage source is applied across the resonant circuit formed by Lr and Cr and charges Cr in the resonant manner. This energy will be used in the next cycle to discharge the parasitic capacitance reflected across M1.

In FIG. 23, the voltage applied to the resonant circuit formed by Lr' and Cr is Vin*(N4/N1).

The fact that the energy stored in Cr is proportional with Vin it is a major advantage of this circuit. At higher input voltage the energy required to discharge the parasitic capacitance reflected across M1 is higher. In this way the energy stored in Cr to obtain zero voltage switching across M1 is self adjusting.

The Iinj circuit methods of obtaining zero voltage switching can work without the energy injection circuit formed by SWinj, D1 and Vinj. In such a case we will have the natural ringing across M1 but zero voltage switching will be accomplished by the energy stored in Cr. The Iinj methodology can work with more traditional flyback topologies such as the ones using valley detection circuit wherein the main switch turns on at the lowest point of the valley to minimize the switching losses.

The energy injection method and the Iinj method can work very well together with the energy injection circuit as described in FIGS. 22, 23 and 24. In some applications the energy injection circuit formed by SWinj, D1 and Vinj may not be as efficient in injecting the necessary energy for zero voltage switching and the Iinj circuit will add to it helping in getting zero voltage switching. In addition to this the energy injection circuit has the disadvantage that the energy injection it is function of the dead time period which is the time interval between t3 to t4. That means that at high line and lower power wherein the frequency is lower in order to maximize the efficiency the energy injection it is higher even more than the energy required for zero voltage switching. That may negatively impact the efficiency at light load. For that reason the energy injection may be kept lower in such conditions and use the Iinj to achieve the final zero voltage transition.

The on time of M4 it is difficult to tailor to be exactly the duration of a full cycle of the resonant circuit formed by Lr and Cr. The on time of M4 can be smaller than the full cycle because the current of negative polarity of Iinj can also flow through the body diode of M4, as a result the VcM4 can end sometime between t7 to t8.

The engineers with the skills in the art will optimize the balance of energy injection and Iinj for best efficiency or any other design goals. The Iinj circuit it is much simpler to implement and the energy is extracted from the primary during the on time of M1 in a very efficient way. The energy injection circuit has the advantage of harvesting the energy contained in the resonant circuit with initial conditions. Both circuits will work quite well together for maximum efficiency though will add somewhat to the complexity.

In FIG. 25 is presented a boost converter with energy injection circuit formed by D1, Vinj and M3, all in series and placed across the L2 winding coupled with the main inductor L1. In addition to it there is an Iinj current source also placed across the L2 winding.

In FIG. 26A is presented the same circuit as FIG. 25 with the difference that there is a proposed circuit to implement Iinj.

The Iinj current source is implemented by a resonant inductor Lr, a resonant capacitor Cr and a control Mosfet M4. There are many other forms of implementation for Iinj wherein a current source of a given duration, amplitude and phase shift in report to M1 can be constructed. The resonant implementation it is just one of it described in details in FIG. 26A. The Iinj circuit can be placed across the L2 winding as per FIG. 26A or it can be placed on another independent winding in a way that M4 can be easily driven from the ground as per FIG. 23.

In FIG. 26B are depicted the key waveforms of the circuit presented in FIG. 26A. The key waveforms are: VcM1, which is the control signal for M1, VcM2 which is the control signal for M2, VcM3 which is the control signal for M3, the voltage in the switching node A, V(A), the magnetizing current through T1, Imag(Tr1), the current through M1, Id(M1), the Iinj flowing through Lr and the control signal from M4, VcM4.

Between t0 to t1, M1 is on and the magnetizing current is building up through T1. That is also reflected in the current through M1.

At t1, M1 is turned off and the current will continue to flow through L1 initially through the body diode of M2 and after that through M2, after M2 is turned on.

Sometime between t1 and t2 the energy injection switch M3 is turned on. At t2 the M2 is turned off when the current through it reaches zero or slight negative.

At that time the resonant circuit with initial conditions formed by L1, and the parasitic capacitance reflected between switching node A and ground starts the resonant transition. The initial condition for the resonant circuit wilt initial conditions previously presented is the voltage across the parasitic capacitance reflected between switch node A and ground, which is Vo.

The voltage in A starts decaying in a resonant manner until reached the level of Vin+Vinj(N1/N2). When the voltage in A reaches Vin+Vinj(N1/N2), then the magnetizing current will reach Imag(T1)t3. The magnetizing current started from zero at t2. The Vinj source will build up the magnetizing current to Imag(T1)t4, at t4. At t4 the M3 is turned off. The magnetizing current in T1 will transfer to L1 winding and start discharging the parasitic capacitance reflected between switching node A and ground. This parasitic capacitance it is the summation of the parasitic capacitance across M1 and M2, and also the parasitic capacitance across L1 winding in parallel with the parasitic capacitance across L2, reflected to the primary across L1.

As can be seen in FIG. 26B the voltage at t5 does not reach zero. At t5 the voltage in A is V(A)t5.

At t5 the resonant circuit formed by Lr and Cr is activated by turning on M4. The resonant capacitor Cr was charged from the previous cycle. The current start building up through Lr in a sinusoidal shape reaching a peak level at t6 and after that decaying toward zero at t7. This current will reflect in the primary through L1 and start discharging the parasitic capacitance reflected between A and ground. At t6 the voltage in A reaches zero. Zero voltage in A can be reached anywhere between t5 to t7, function of the amplitude o Iinj, and the parasitic capacitance reflected between A and ground. For simplicity in FIG. 26B the voltage in A reaches zero at t6. The resonant current through Lr will become negative between t7 to t8. During this time the resonant capacitor Cr gets charged in a resonant way from the input voltage reflected across L2. This energy will be used in the next cycle to discharge the parasitic capacitance reflected between A and ground.

In conclusion, between t5 to t7, the resonant current created by Lr, Cr and energized by the charge in Cr will discharge the parasitic capacitance reflected between A and ground and between t7 to t8, the resonant capacitor Cr is charged again from Vin in a forward mode in a resonant manner.

As mentioned before the resonant current Iinj is reflected in the primary as can be seen in the current though M1.

Between t4 to t5, the current through M1 is negative reflecting the magnetizing current in the primary Imag(T1) t4*(N2/N1)

In between t5 to t7, the resonant current through Lr is reflected in the primary further discharging the parasitic capacitance reflected between A and ground.

Between t7 to t8 Cr is charging from Vin in a resonant manner and the current through M1 has an overshoot as depicted in FIG. 26B. This is the time wherein the energy is transferred in a resonant way from the source Vin to Cr. This charge in Cr is preserved until the next cycle. The energy stored in Cr energy will be used to discharge the parasitic capacitance reflected between A and ground creating zero voltage switching conditions across M1.

The energy transferred from Vin to Cr is proportionate with Vin, which is desirable because the energy in the reflected parasitic capacitance between A and ground which has to be discharged is also proportional with the input voltage.

The Iinj methodology wherein a narrow pulse of current is used to discharge the reflected parasitic capacitance between A an ground has an advantage over the energy injection method described in the first part of the patent due to the fact that the cycle of energy extraction form the Vin and the discharging cycle of the parasitic capacitance it is very short and very efficient. This method will also work in the event the boost topology, buck topology, sepic topology or the flyback topology and also the two transistor forward topology and all other topologies which contain a resonant circuit with initial condition as described in FIG. 1A, do operate in continuous mode. For example the boost converter can operate in continuous mode wherein the M1 will turn on when M2 is conducting. In such case the Iinj is activated like in discontinuous mode operation prior to the turn on of M1. The peak resonant current through Lr reflected in the primary shall be larger than the current flowing through M2. The resonant current injected will overwhelmed the current through M2 and it will create zero current condition for M2 to turn off. Further, the injected resonant current will discharge the parasitic capacitance between A and ground and will create zero voltage switching conditions for M1 at turn on.

In this patent using resonant current injection for Iinj we can convert a boost topology and this will apply for the rest of topologies, in zero voltage switching topologies regardless of the fact that the operation is in discontinues or continuous mode.

This resonant current injection technology will work very well in conjunction with the energy injection method when the operation is done in discontinuous mode. In many application when the boost, buck, flyback, sepic, two transistor forward and others operates in continuous mode the resonant current injection will be used and when these topologies operate in discontinuous mode, the energy injection technology will be activated in order to harvest the energy contained in the resonant circuit with initial conditions which otherwise will create natural ringing and that energy will be dissipated. During the time the energy injection circuit is activate the resonant current injection may still operate or it can be deactivated function of the design targets.

In patent application "Partial Time Active Clamp Flyback", application # 62/075,518, a clamp circuit is used as an active clamp with the purpose of recycling the leakage inductance energy and to eliminate the spikes across the main switching element due to the leakage inductance. In application a clamp circuit is used as an active clamp with the clamp circuit driven by a controller from the ground level via a driving transformer circuit. This method does add complexity and cost. In application such as AC-DC adapters the additional cost may be prohibitive due to tremendous price pressure in the consumer market where these adapters are used.

One of the key embodiments in this patent is offering a very simple solution in driving the clamp.

In FIG. 27 is presented a circuit using this embodiment. The drive circuit is connected to a driving winding in the main transformer and the clamp switch is self driven in this way from the main transformer. This concept it is very simple and very low cost comparative with the solution proposed in the patent application "Partial Time Active Clamp Flyback", application # 62/075,518.

There are some challenges in designing such a driving circuit for self driven clamp switch. The input voltage Vin in AC-DC adapter application will vary to a range of almost 4:1. The output voltage in the latest generation of adapters has to comply with the Power Delivery Specification version 2.0 for at least two USB 3.1 ports. The output voltage will vary between 5V to 20V This will allow power supplies complying with the new specification to be used universally, which promotes reuse and reduces waste. The old USB standard has been used in this way and has been mandated in several countries, the new specification expands on this universal use by allowing multiple voltages on the USB bus. This is needed since most laptop computers consume more than 10 W which is what the old USB standard allowed. By allowing higher voltage more power can be delivered on the new 3 A rated cable and connector.

In FIG. 28A is presented such a circuit. It is a simple circuit using a resistor divider R1 and R2 in order to minimize the reverse voltage in gate of M1 during the on time of M1. A diode D1 across R1 will apply the full voltage reflected from the secondary which is proportionate with the output voltage in the range from 5V to 20V. In addition to that there is an additional capacitor C1 aimed in turning off M3 faster prior to the dead time of the flyback topology operating in discontinuous mode.

In FIG. 28B are presented the key waveforms of this drive circuit described in FIGS. 27 and 28A. The waveforms depicted are: VcM1, which is the control signal for M1, VcM2, which is the control signal for M2, Vds(M1) which is the voltage in drain of M1, the voltage in the switching node A and the voltage in the switching node B as presented in FIG. 28A, and the current through the clamp switch M3.

Between to t1 the primary switch M1 is on and the energy is stored in the transformer Tr1.

During the time interval t0 to t1 the voltage in the switching node A is negative and has an amplitude of Vin (N3/N1). The voltage in the switching node B is lower due to the voltage divider and it is Vin(N3/N1)*(R2/(R1+R2)). By design R1 and R2 will be chosen to ensure that the voltage in gate in the worst case, which is the highest input voltage, will not exceed the gate to source rating of M3.

At t1 the main switch turns off and the magnetizing current will start flowing into the secondary through the rectifier means M2. In the primary the energy stored in the leakage inductance will flow initially through the body diode of M3 and the capacitor Cc. The capacitor is charged to Vo(N1/N2) which represents the output voltage reflected in the primary. In the first part of the interval t1 to t2 the leakage inductance energy will charge Cc and in the second part of that interval the current will flow in the opposite direction as depicted in FIG. 28B. This mode of operation it is described in details in the patent application "Partial Time Active Clamp Flyback", application # 62/075,518.

At t2 the current through the synchronous rectifier M2 will reach zero and M2 is turned off. The voltage in A becomes zero but the gate capacitor of M3 it is still charged and the resistors R1 and R2 are too large to discharge the gate to source capacitor rapidly. The R1 and R2 are chosen to be large in order to minimize the power dissipation in the gate drive circuit. After t2 when the voltage in switching node A is zero C1 is paralleled with the gate to source capacitance of M3. C1 is chosen to be larger than the gate to source capacitance and as result after the charge is redistributed the voltage in B will fall fast by ΔV. After t2 the gate to source capacitance will further discharge until reached the gate threshold when M3 turns off. That will occur at t3.

Between t3 to t4 the voltage in gate of M3, which is also the voltage in the switching node B will further decay, the gate to source capacitance being discharged by R1 and R2.

The circuit depicted in FIG. 28A does have some key advantages as simplicity but does have several limitations. One of the limitations is the fact that M3 is still on for the time interval t2 to t3 until the voltage in B decreases under the threshold level. At lower input voltage wherein the time interval between t2 to t4 is shorter than the time interval between t2 to t3, M3 may be on when the main switch M1 will turn on. Though when that will happen the voltage in B will collapse rapidly there may be still risk of cross conduction.

In implementation wherein energy injection is used the voltage during the dead time it is not zero but positive. If the voltage during the dead time is close to the threshold voltage that will increase the risk of cross-conduction. The circuit presented in FIG. 29A does address these concerns. The key waveforms are the same as those presented in FIG. 28B.

In between t0 to t1 the main switch M1 is on and the energy from Vin is stored in the transformer Tr1 in magnetic field energy. At t1 the main switch M1 turns off and the magnetizing current will flow towards the secondary through synchronized rectifier M1. At t2 the energy stored in the magnetic field of Tr1 is totally transferred to the secondary and M2 is turned off. Like in the previous circuit once the voltage in the switching node A collapses the voltage in B will start collapsing by ΔV due to the redistribution of charges between the gate to source capacitor and C1. That will happen in at t2. The circuit depicted in 29A is designed to react to the ΔV collapsed in the gate of M3 and ensure that the voltage in B becomes zero.

In the circuit of FIG. 29A the circuit formed by D2 and C2 is designed to work as peak detector which memorized the voltage in A during the time interval t1 to t2. The circuit formed by Q1, R3 and R4 act as a ΔV detection. When the voltage in B becomes lower than the voltage prior of t2, Q1 turns on and turns on M1 which will discharge the gate to source to zero. As in FIG. 29B the voltage in gate of M3 is zero during the dead time period. This circuit will also work in the event that there is an additional dc voltage in A due to the energy injection circuit.

There are many other ways to implement the gate drive circuit. The key feature of this circuit is that it reacts to a ΔV decay in the gate of M3 because the charge redistribution between the gate to source capacitor and C1. That ΔV sensor can be implemented in many other ways not deviating from the spirit of this invention, wherein we use a winding in the transformer to turn on and off the clamp switch M3 and that we ensure a proper off for M3 by sensing the voltage decay ΔV in the gate after t2.

In the case of Power Delivery Specification version 2.0 the output voltage will vary between 5V to 20V. The bias circuit in flyback topology the bias is obtained using a bias winding in the transformer and a diode of a small synchronous rectifier to generate a voltage proportional with the output voltage. In FIG. 31A is presented such an example wherein the Vbias1 is proportionate with Vo, Vbias1=Vo (N4/N2). In application with Power Delivery Specification version 2 when the output voltage varies in a very large range from 5V to 20V the bias supply in the primary becomes a challenge. The bias power has to be also obtained in a very efficient way especially at light loads to meet the demanding specification for efficiently.

In FIG. 30A is presented a concept of deriving the bias power using active regulator. The regulator is formed by a diode Db, an inductive element Lb, and a controlled switching device Mb1. To drive Mb1 from the ground level a level shifter is utilized, formed by D1, Cb1 and Rb1.

The key waveforms are depicted in FIG. 30B. The key waveforms are: VcM1, the control signal for M1, VcM2, the control signal for M2, Vd(M1) the voltage across M1, V(A) the voltage in the switching node A, VcMb1 the control signal for Mb1 and the current through Lb, I(Lb).

At t0, M1 is turned on. The magnetizing current will build up in the transformer Tr1 storing energy. The voltage in the switching node A is Vin*(N4/N1). Between t0 to t1 Mb1 is off.

As t1 Mb1 is tuned on and the current will start ramping up through Lb with a slope proportional with the value of Lb and the voltage in switching node A. Between t1 and t2 the bias circuit accumulates energy in Lb.

At t2, M1 is turned off and the magnetizing current in the Tr1 is transferred to the output flowing through L2 and M2.

In the bias circuit the voltage in the switching node A becomes negative and the current is ramped down with a slope proportional with Vo*(N4/N2)+Vbias. The current through Lb will reach zero at t3 and the diode Db does not allow conduction in reverse.

Mb1 will turn off later at t4. Ideally Mb1 shall turn off shortly after t3 to prevent ringing between Lb and the parasitic capacitances reflected across Lb.

At t5 the M2 turns off when the current through it becomes zero or slight negative. Between t5 and t6 there is the dead time period.

At each cycle a triangular current I(Lb) is transferred in a forward mode from the input voltage to the Vbias load.

To regulate the Vbias the turn on of Mb1 is delayed accordingly. To decrease the voltage Vbias the turning on of Mb1 is delayed from t1 to t1'. The I(Lb) amplitude is decreased and so is the average current flowing through Lb and as result for the same load the Vbias will decrease.

This bias circuit it is very simple and low cost and the energy is delivered in a forward mode not impacting the flux swing in the transformer and it is not increasing the core loss of Tr1.

In FIG. 31A is depicted a flyback which requires two bias voltages. One bias voltage is Vbias1 is produced through traditional way using a bias winding and a rectifier means Mb1, wherein the Vbias1 is proportional with Vo and Vbias=Vo*(N4/N2).

The second bias voltage is obtained using the method described in FIGS. 30A and 30B.

In FIG. 31B are presented the key waveforms associated with the circuit form FIG. 32.

The waveforms are very similar with the waveforms from FIG. 30B. The main difference is the voltage in A which is Vin*(N4/N1)+Vbias1.

The regulation mode is the same as FIG. 30B wherein the peak current through Lb is controlled by controlling the delay between t0 and the time Mb2 is turned on. For example to increase the average current through Lb de delay from t0 will be smaller like d1, and to decrease the average current through Lb the delay should be larger like d2.

In FIG. 32 is presented a preferred implementation for the bias supply in the case the output voltage ranges in a large range like 5V to 20V.

If the output voltage is set at the high end like 20V the traditional bias circuit employing a bias winding and a synchronized rectifier synchronized with M2 is utilized.

If the output voltage is set at a lower voltage than that highest level let's say at 5V the additional bias power circuit is activated and the bias circuit using Db1, Lb, Mb2 will be activated and controlled in a such way that the Vbias is properly regulated. This additional bias circuit is designed to inject additional current in Vbias to regulate the desired voltage. This circuit will inject more current if Vo is lower and if the Vo is set at the highest level presently 20V the circuit will not be activated.

Figures 1A, 1B:
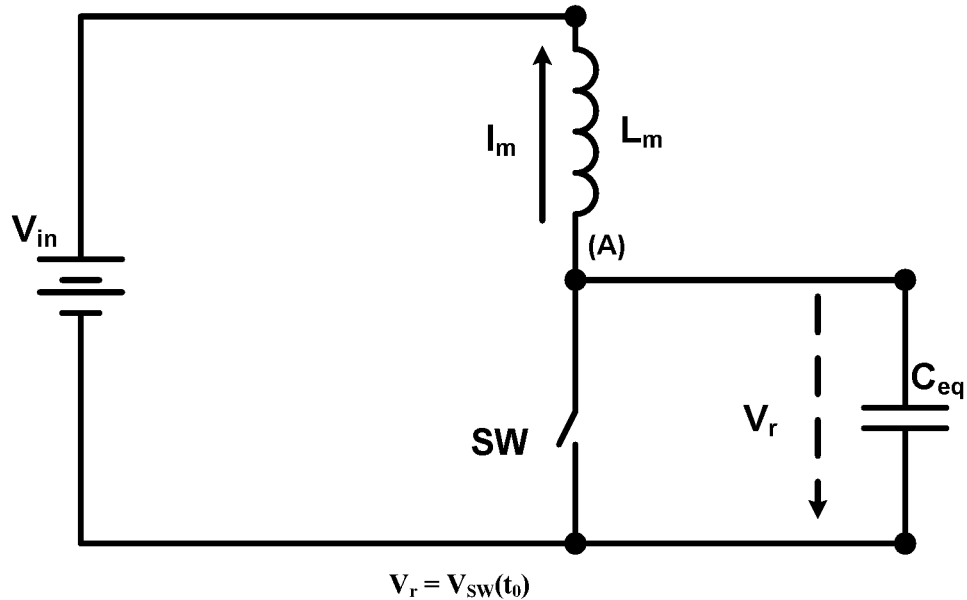
FIG. 1A depicts the resonant circuit with initial conditions.
FIG. 1B depicts the key equations associated with the resonant circuit with initial conditions.
Figure 1C:
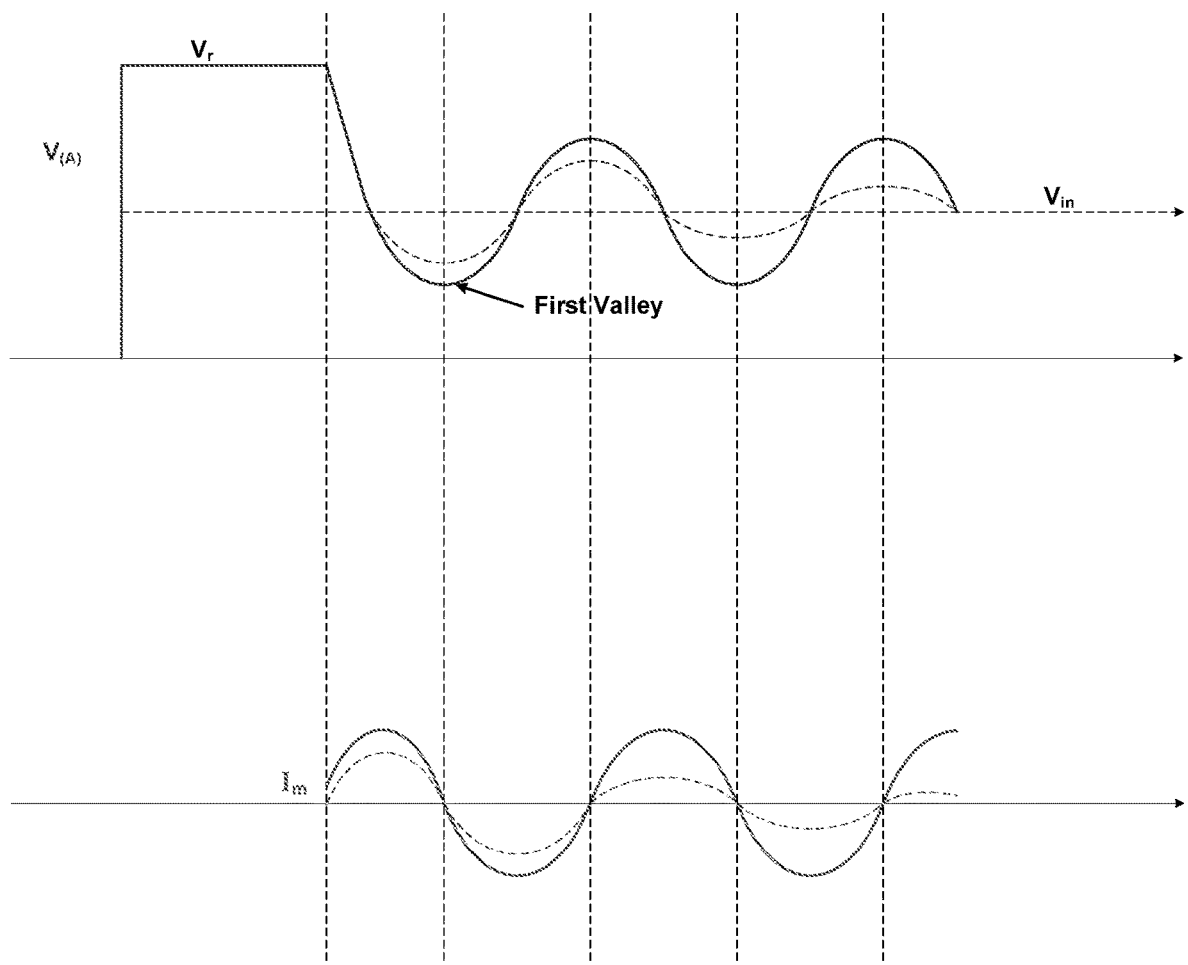
FIG. 1C depicts the voltage and the current in the resonant circuit with initial conditions.
Figure 2A:
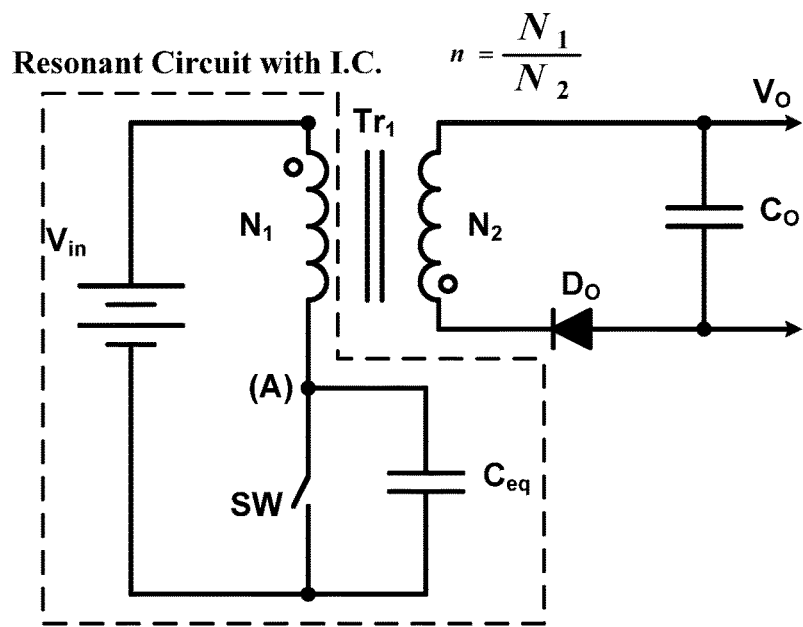
FIG. 2A presents the resonant circuit with initial conditions a part of a flyback topology
Figure 2B:
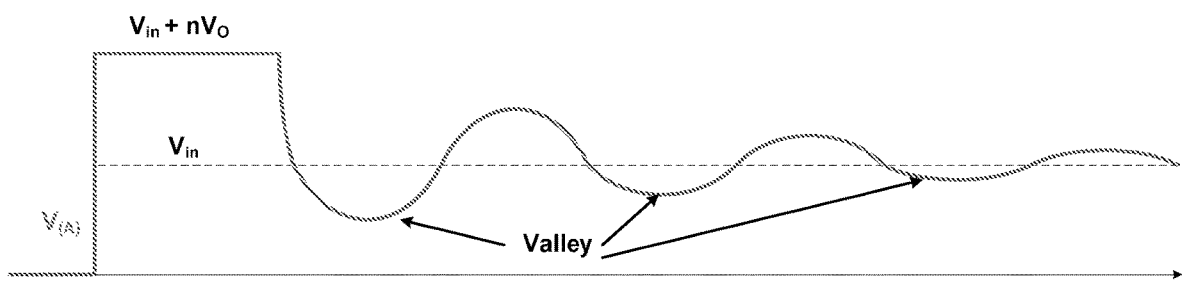
FIG. 2B depicts the natural ringing associated with the circuit from FIG. 2A.
Figure 3A:
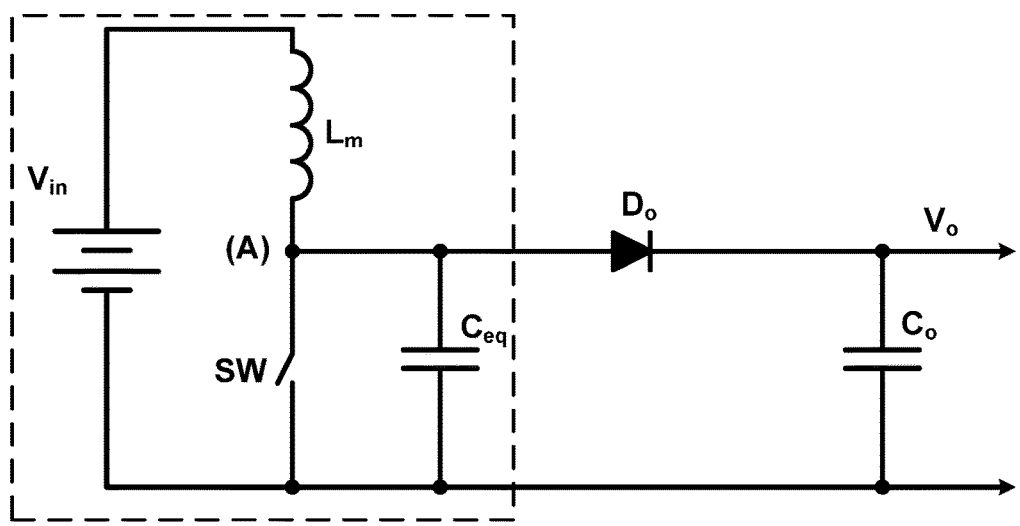
FIG. 3A presents the resonant circuit with initial conditions a part of a boost topology.
Figure 3B:
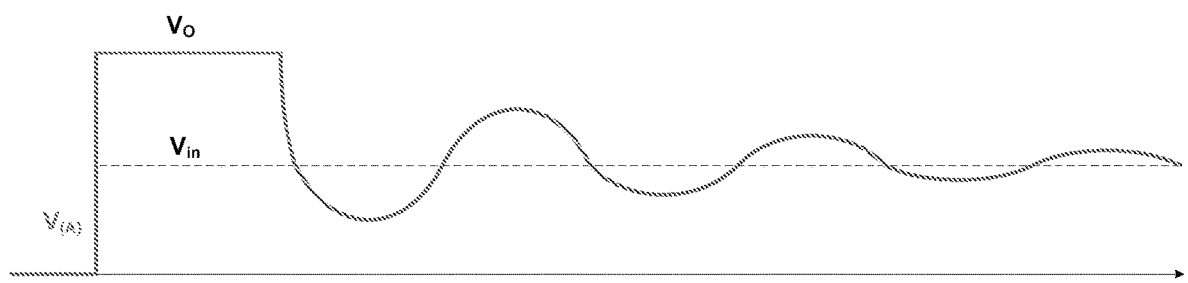
FIG. 3B depicts the natural ringing associated with the circuit from FIG. 3A.
Figure 4A:
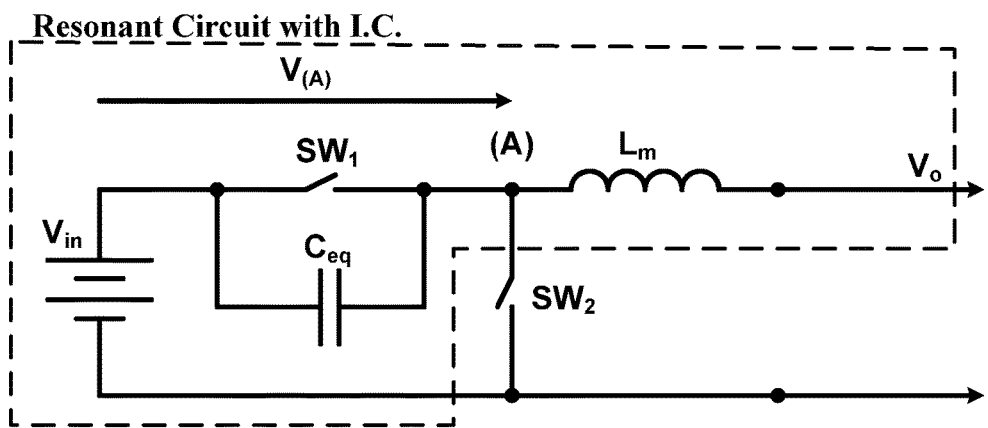
FIG. 4A presents the resonant circuit with initial conditions a part of a buck topology.
Figure 4B:
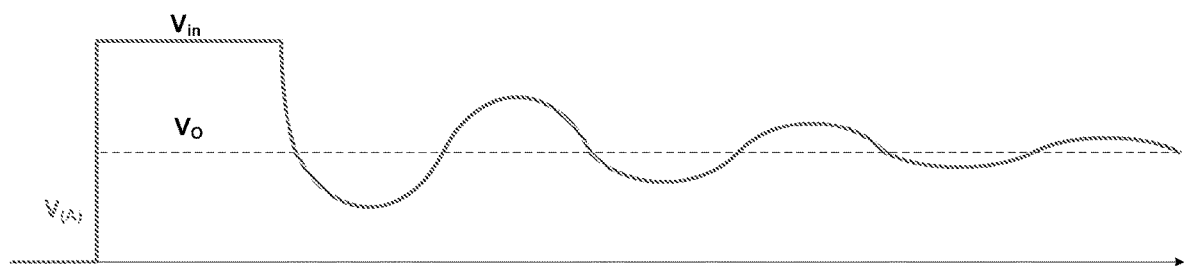
FIG. 4B depicts the natural ringing associated with the circuit from FIG. 4A.
Figure 5A:
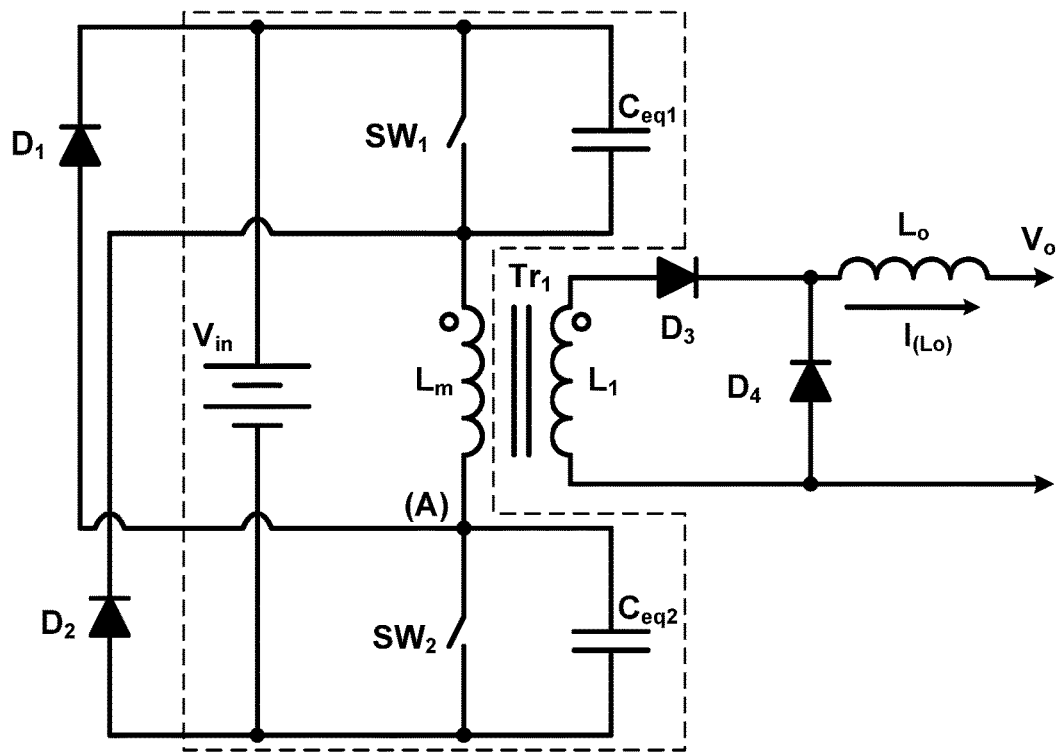
FIG. 5A depicts the resonant circuit with initial conditions as part of the two transistor forward topology.
Figure 5B:
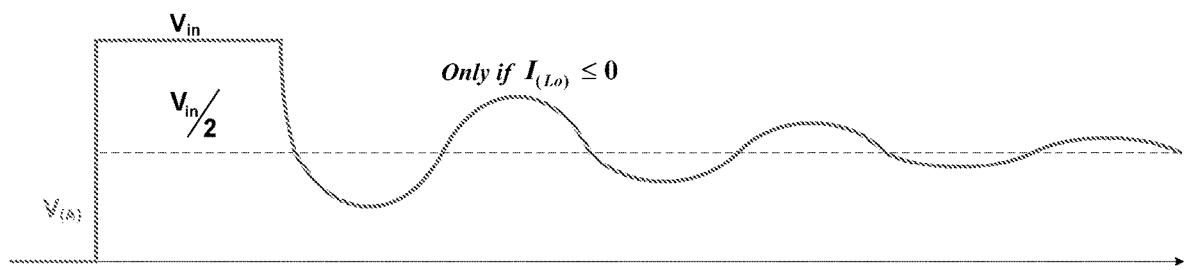
FIG. 5B depicts the natural ringing associated with the circuit from FIG. 5A.
Figure 6A:
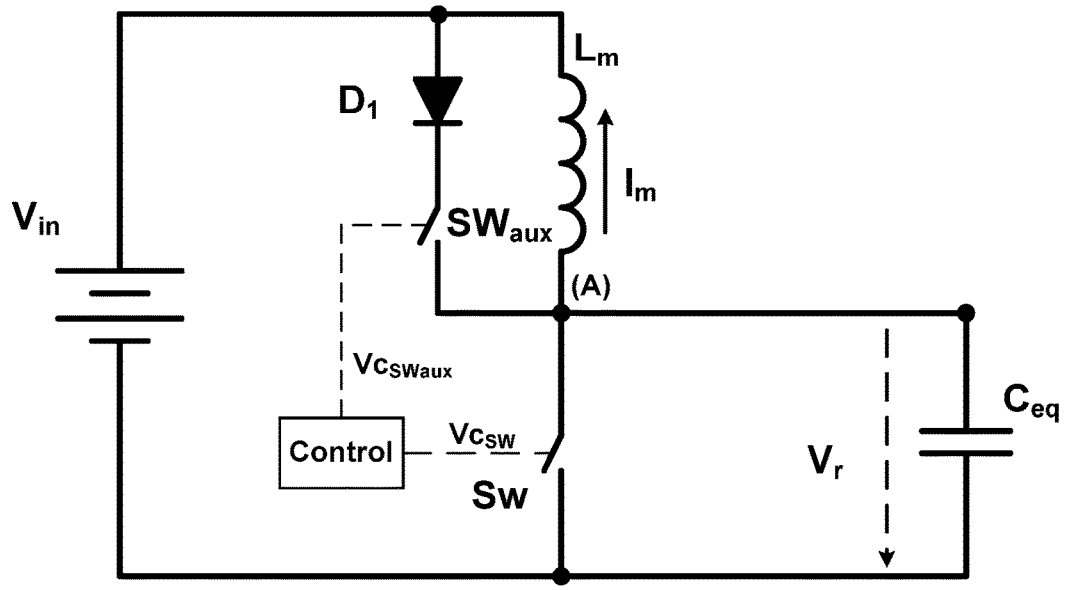
FIG. 6A presents a resonant circuit with initial conditions wherein the energy is preserved by using a shorting switch, which is Prior Art.
Figure 6B:
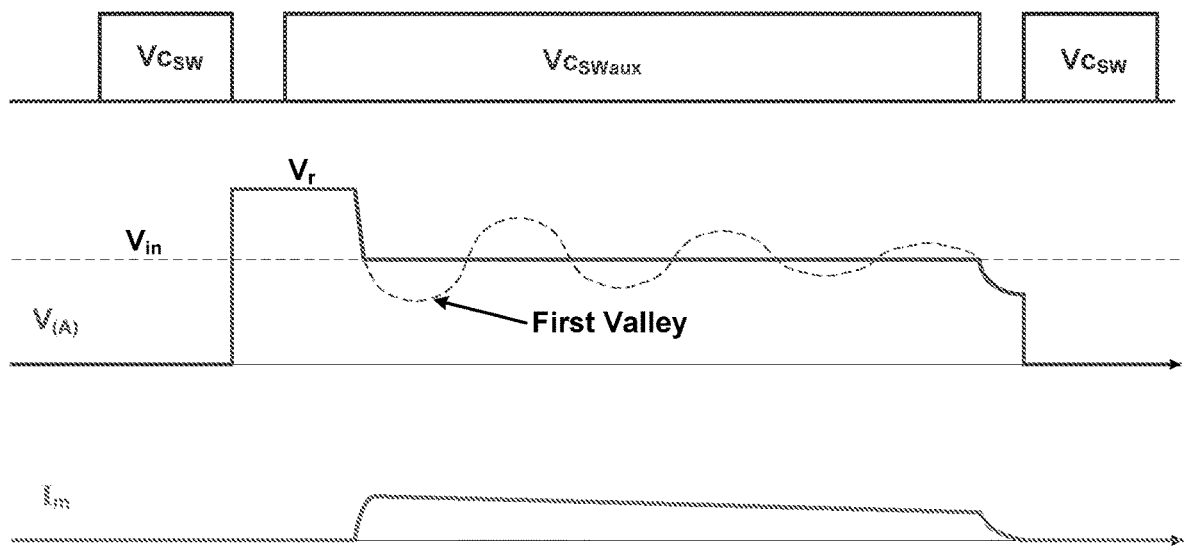
FIG. 6B depicts the key waveforms associated with the circuit from FIG. 6A.
Figure 7A:
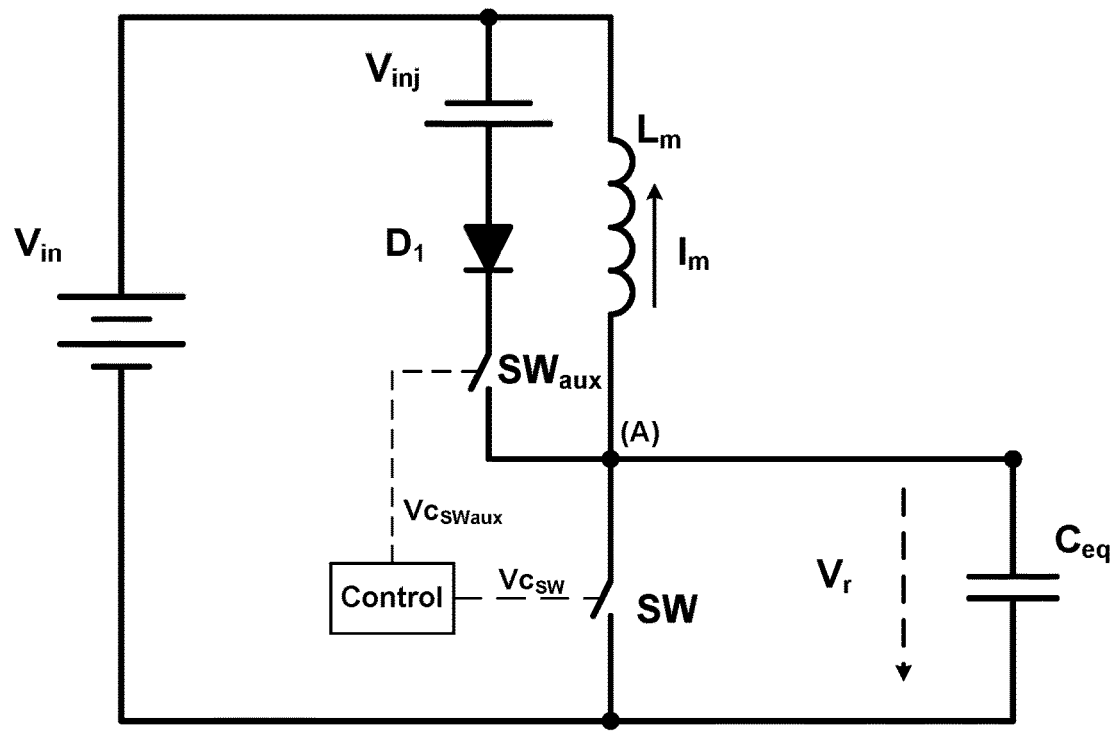
FIG. 7A presents a resonant circuit with initial conditions with the energy injection circuit.
Figure 7B:
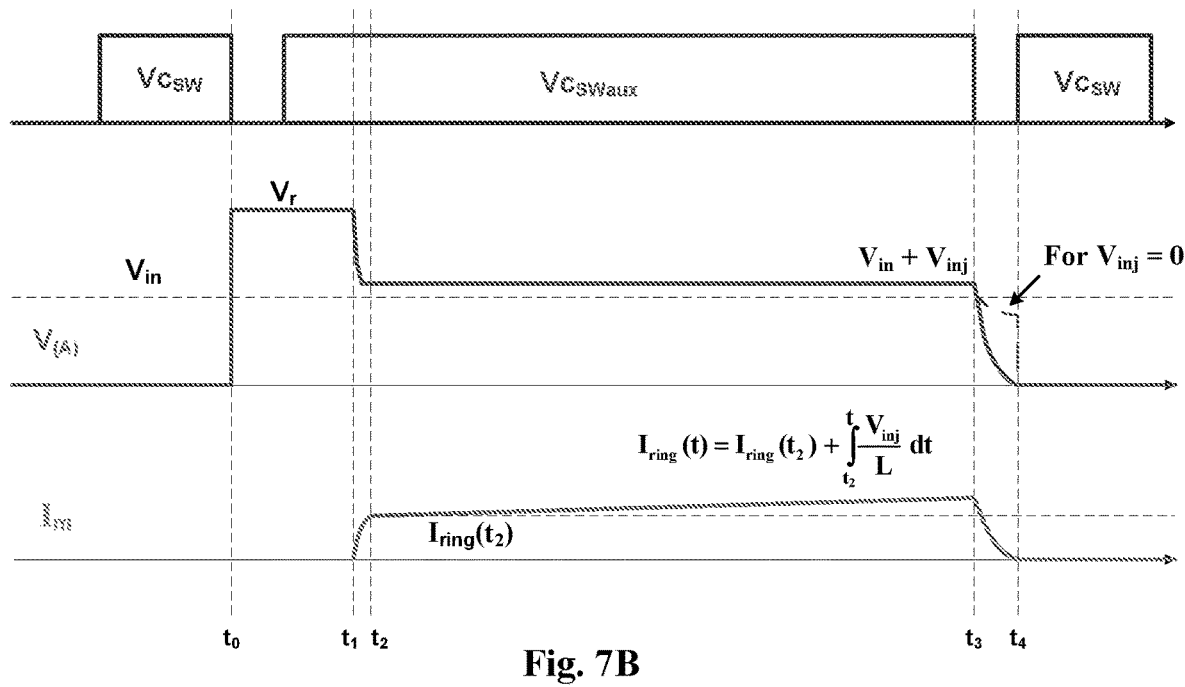
FIG. 7B depicts the key waveforms associated with the circuit in FIG. 7A.
Figure 8:
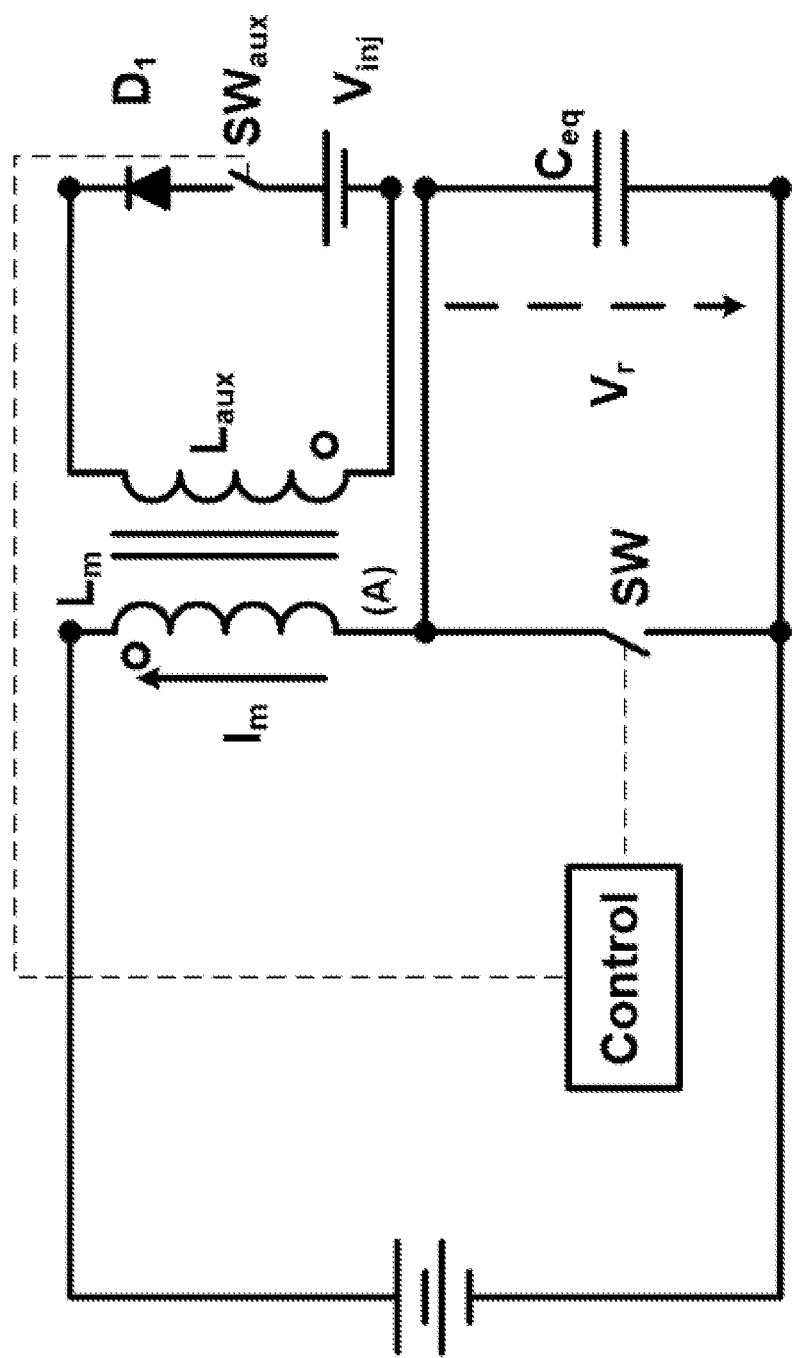
FIG. 8 depicts a practical implementation of the concept from FIG. 7A.
Figure 9A:
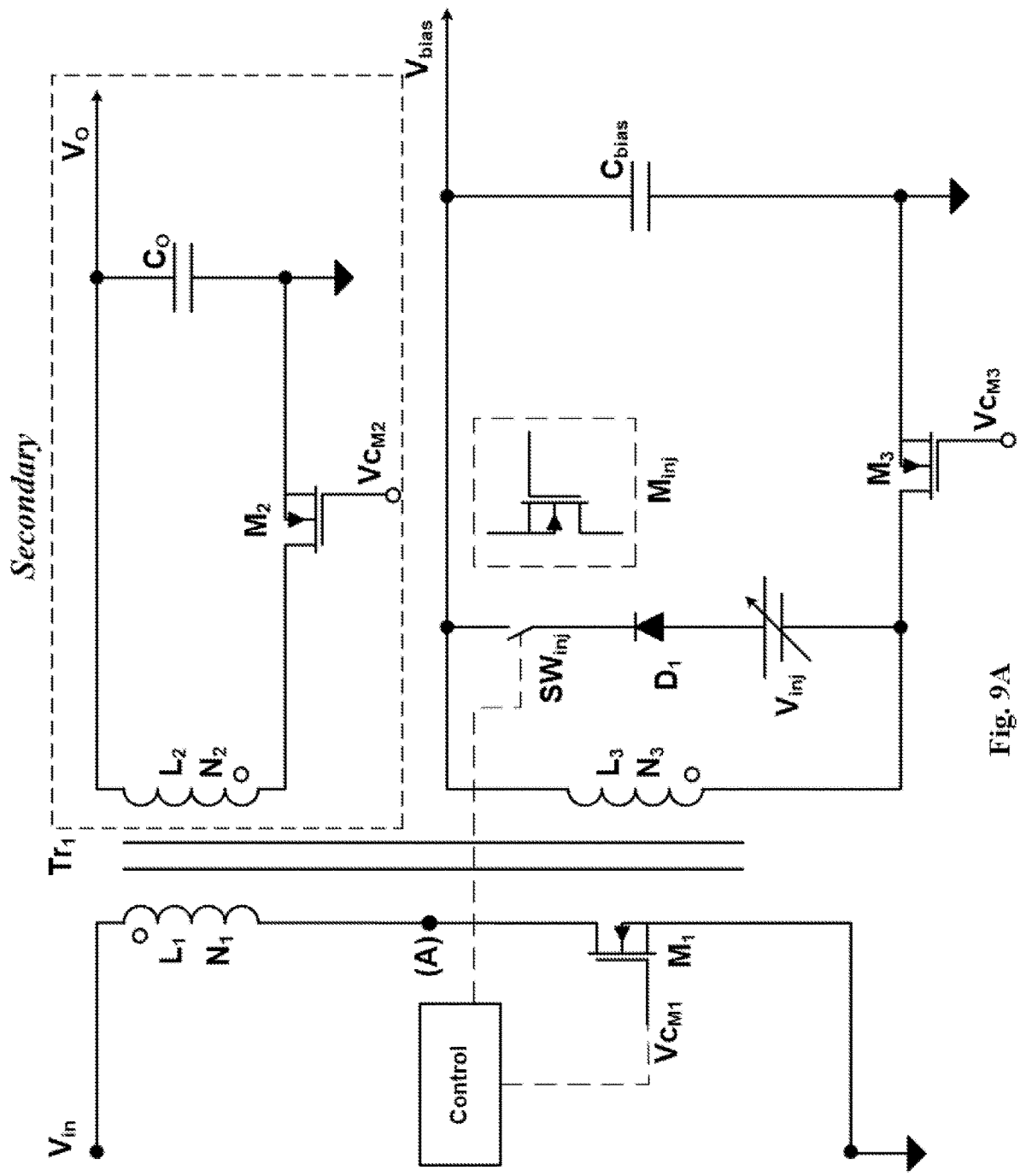
FIG. 9A depicts an implementation of the concept from FIG. 7A in a flyback topology.
Figure 9B:
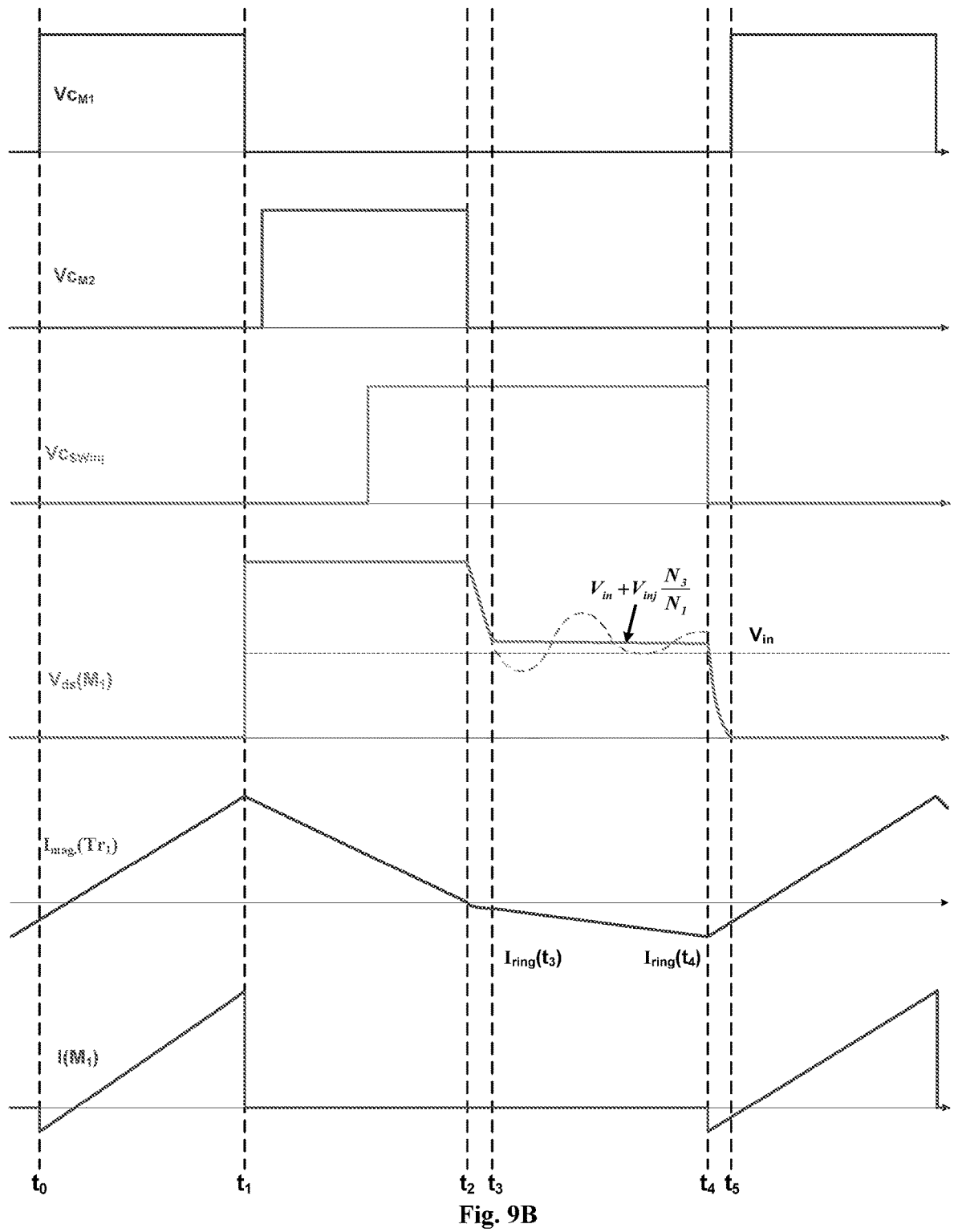
FIG. 9B presents the key waveforms associated with the circuit from FIG. 9A.
Figure 10:
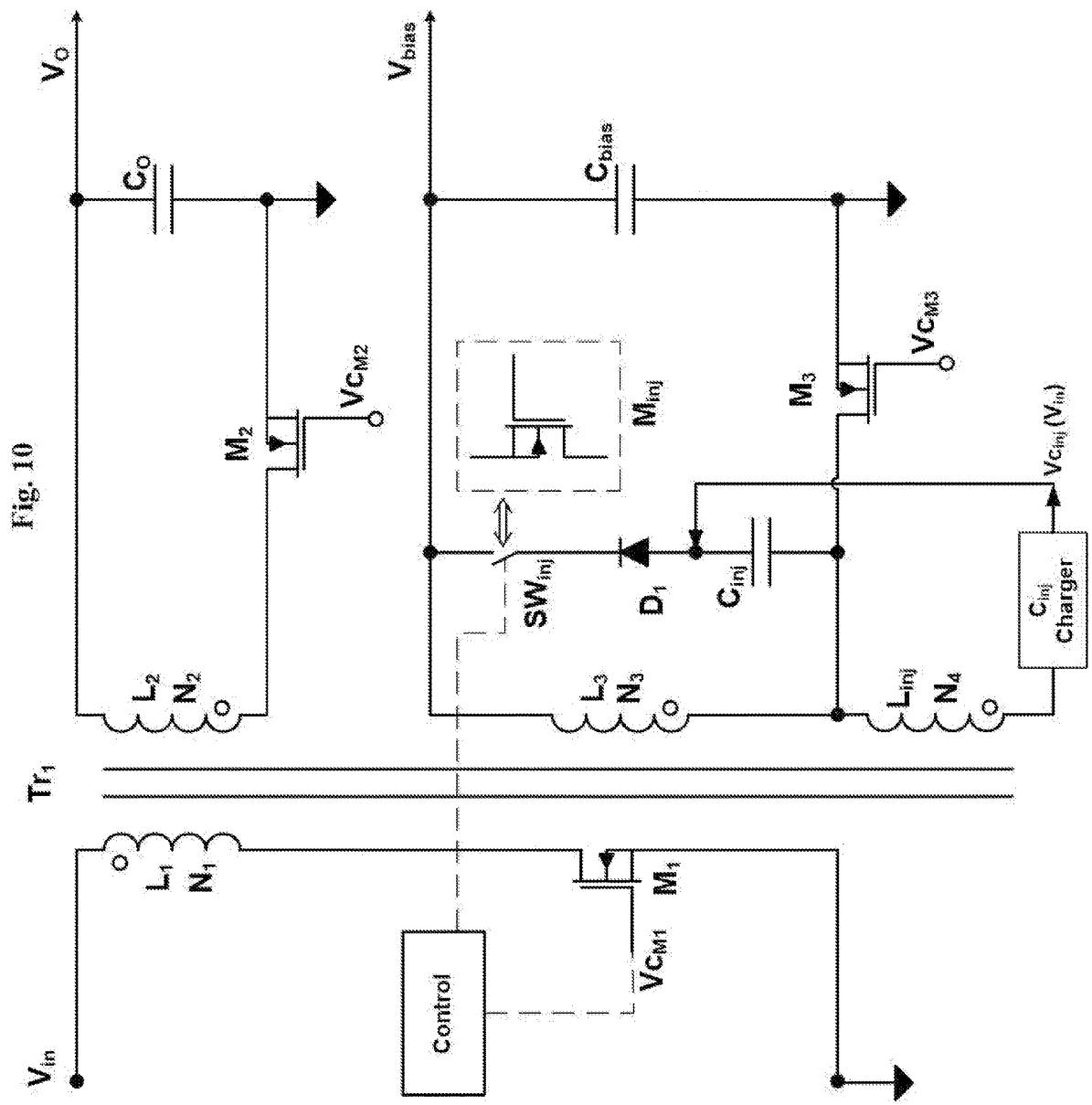
FIG. 10 presents an implementation of the concept presented in FIG. 9A.
Figure 11A:
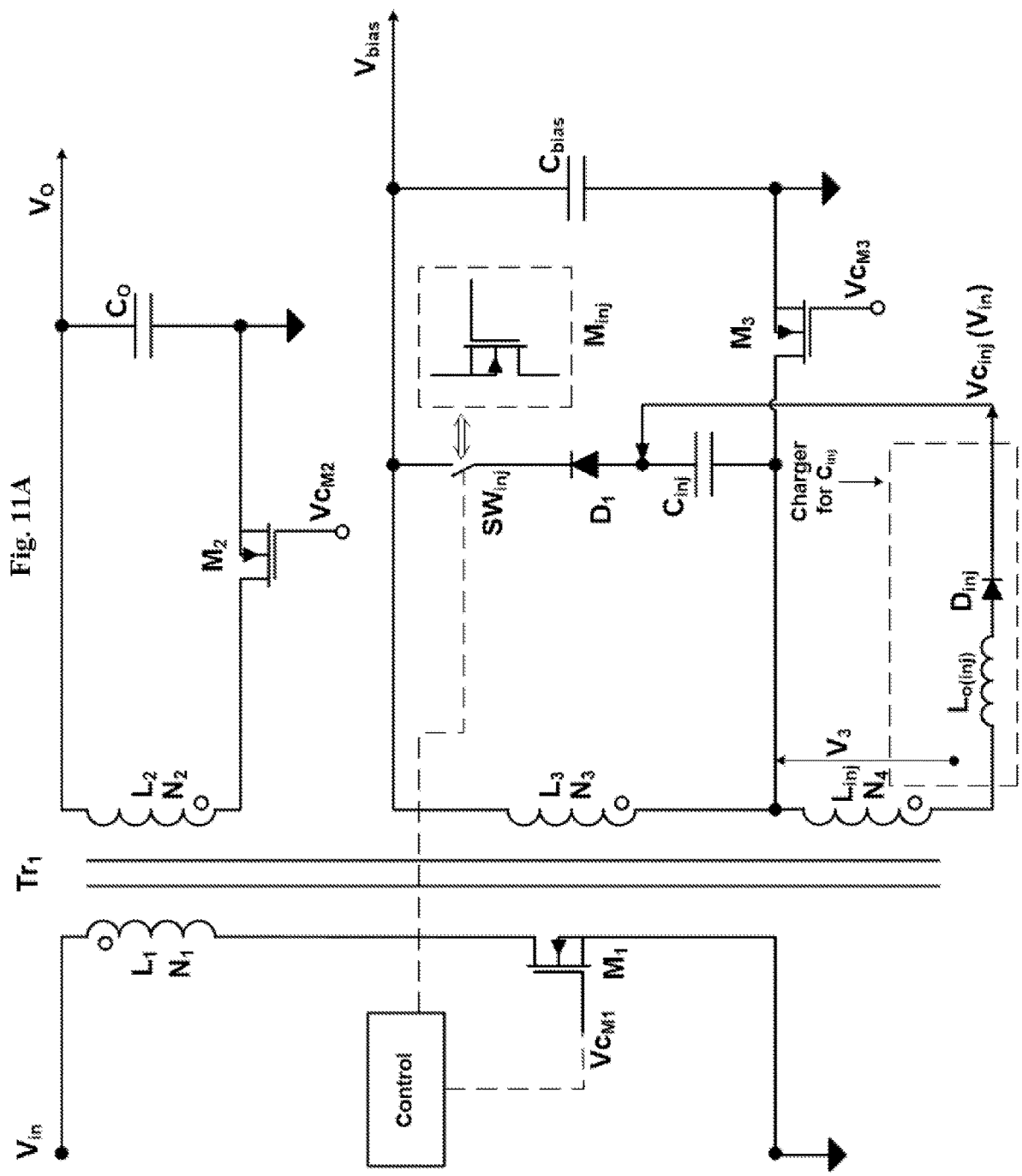
FIG. 11A presents a practical implementation of the concept from FIG. 9A.
Figure 11B:
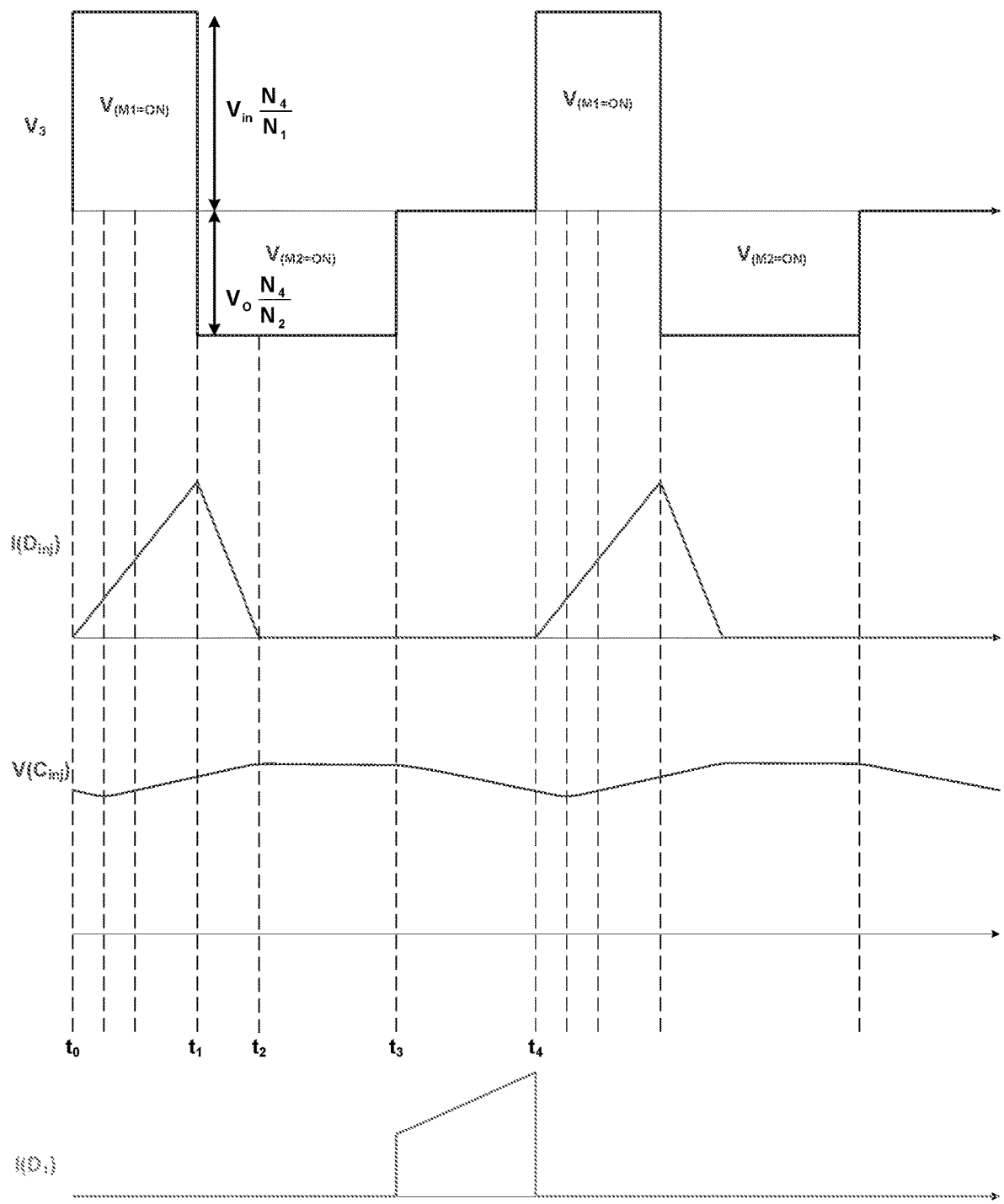
FIG. 11B depicts the key waveforms associated with the circuit from FIG. 11A.
Figure 12A:
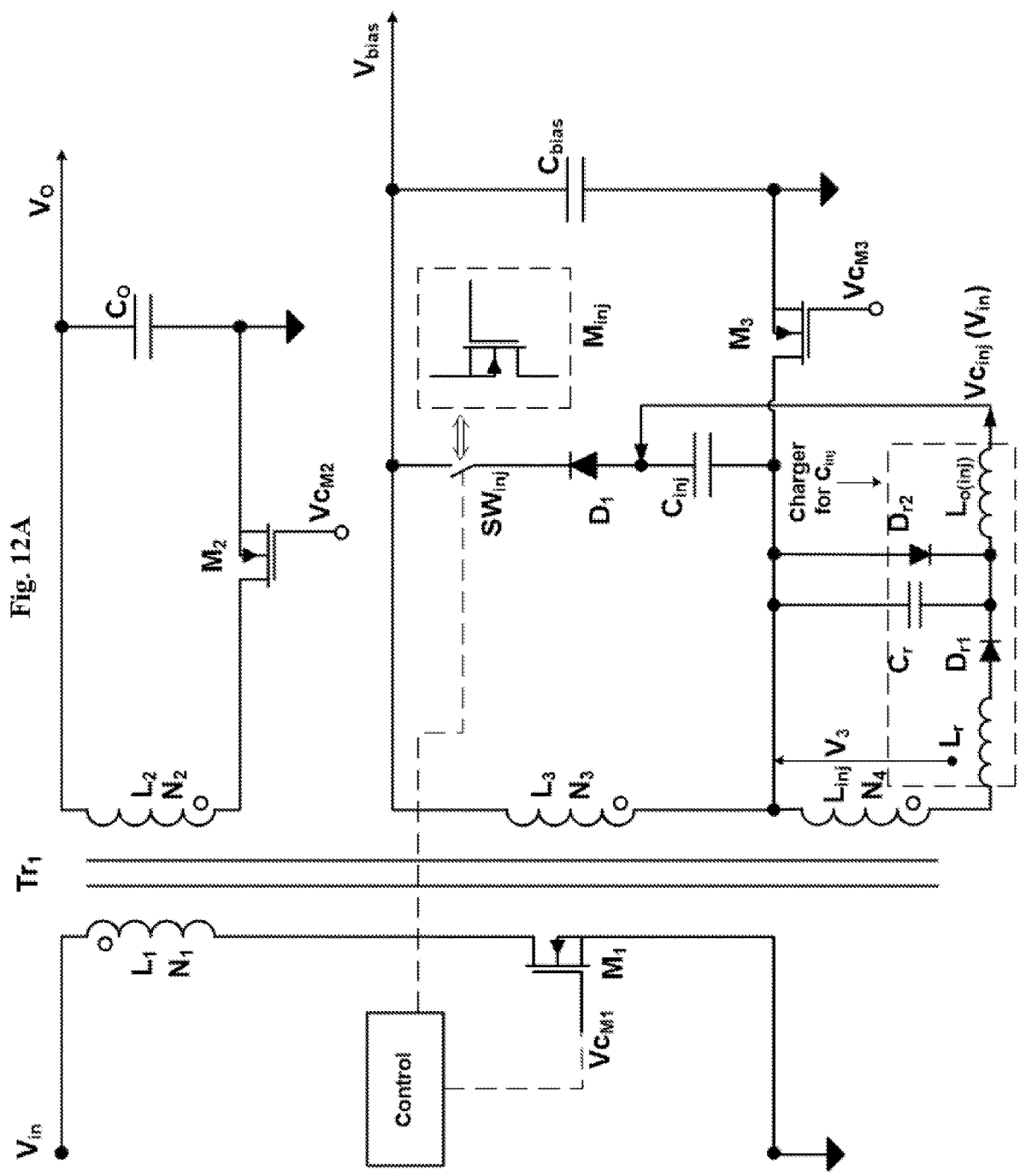
FIG. 12A presents another practical implementation of the concept from FIG. 9A.
Figure 12B:
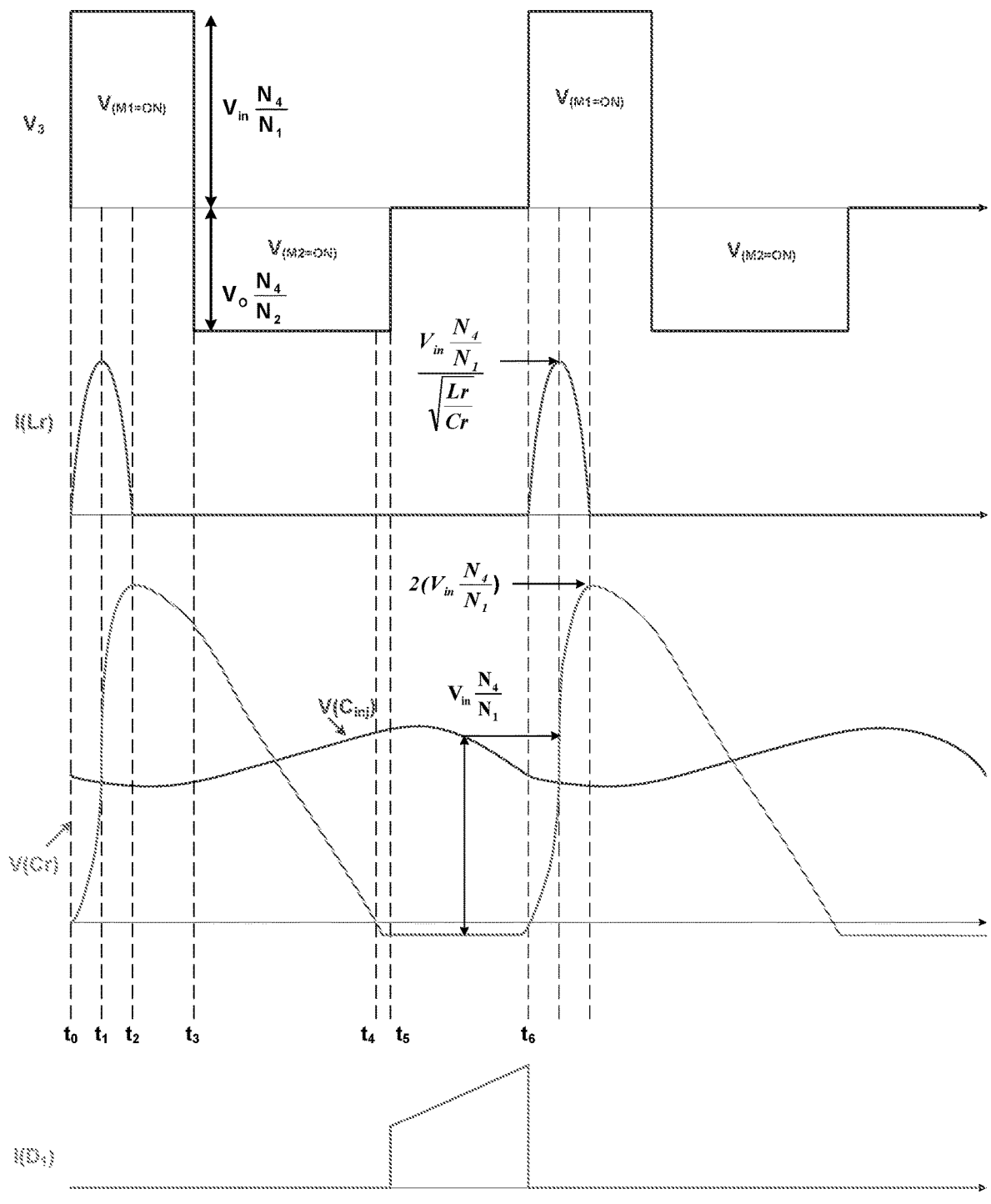
FIG. 12B depicts the key waveforms of the circuit presented in FIG. 12A.
Figure 13:
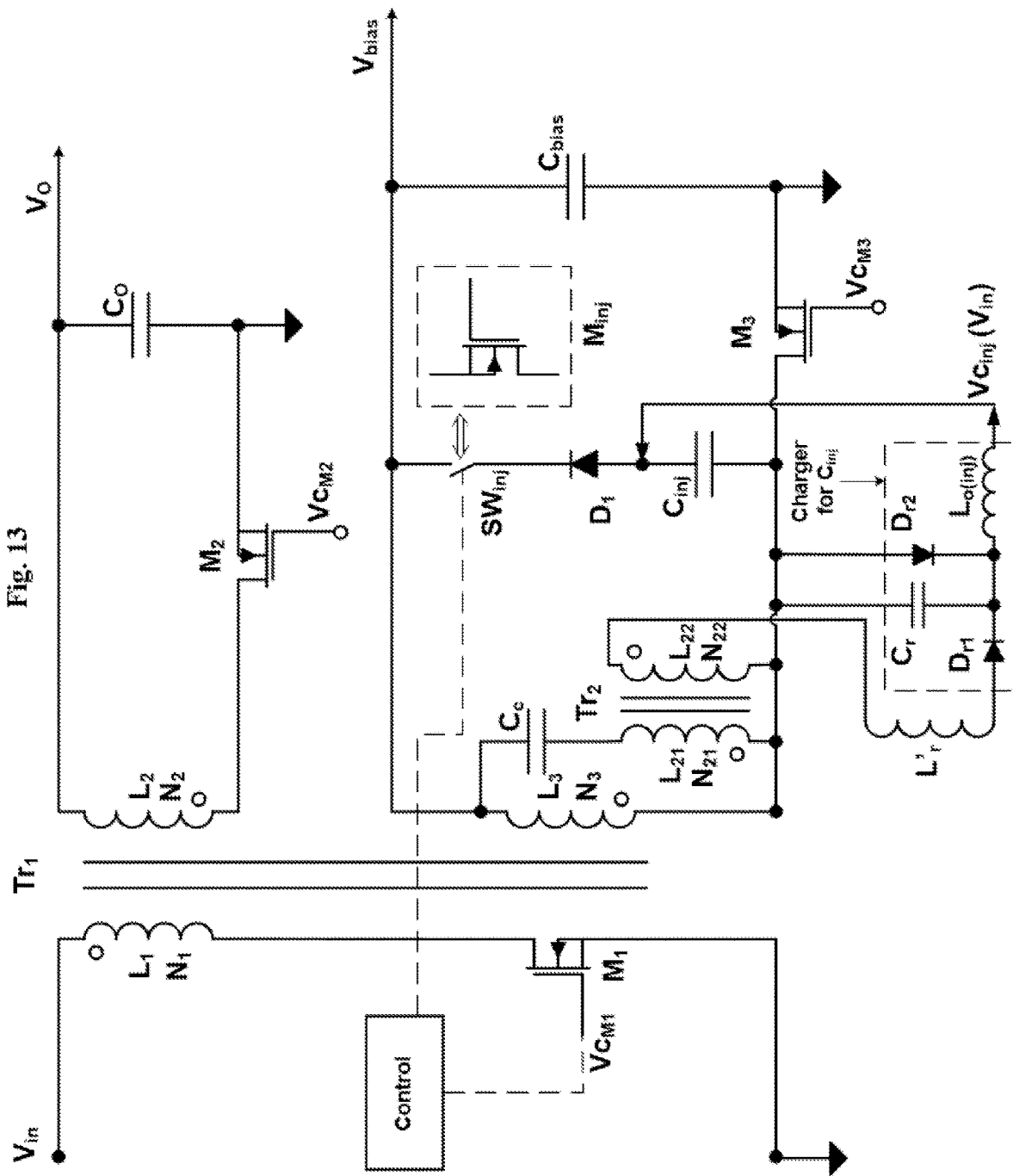
FIG. 13 presents another practical implementation of the concept from FIG. 9A.
Figure 14A:
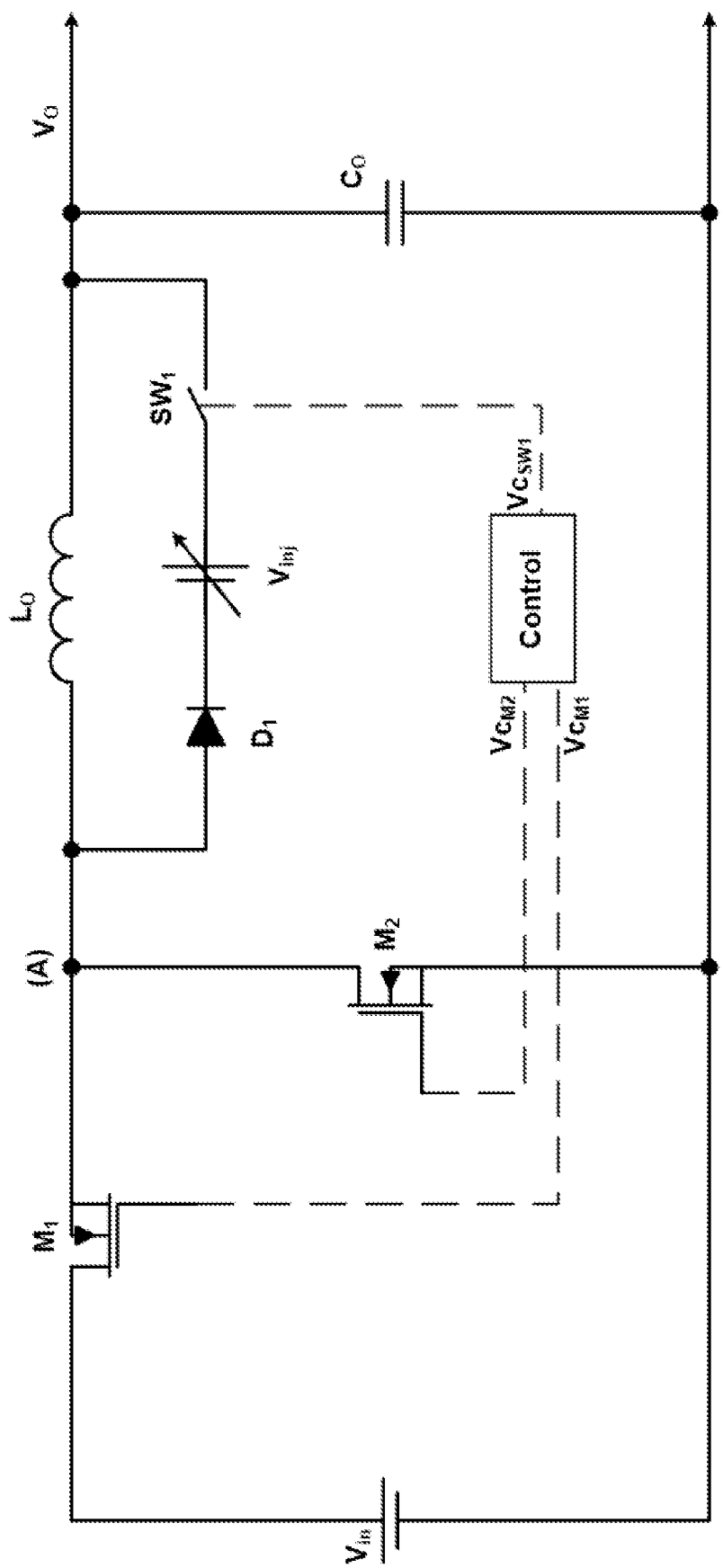
FIG. 14A is presented the buck topology with energy injection circuit.
Figure 14B:
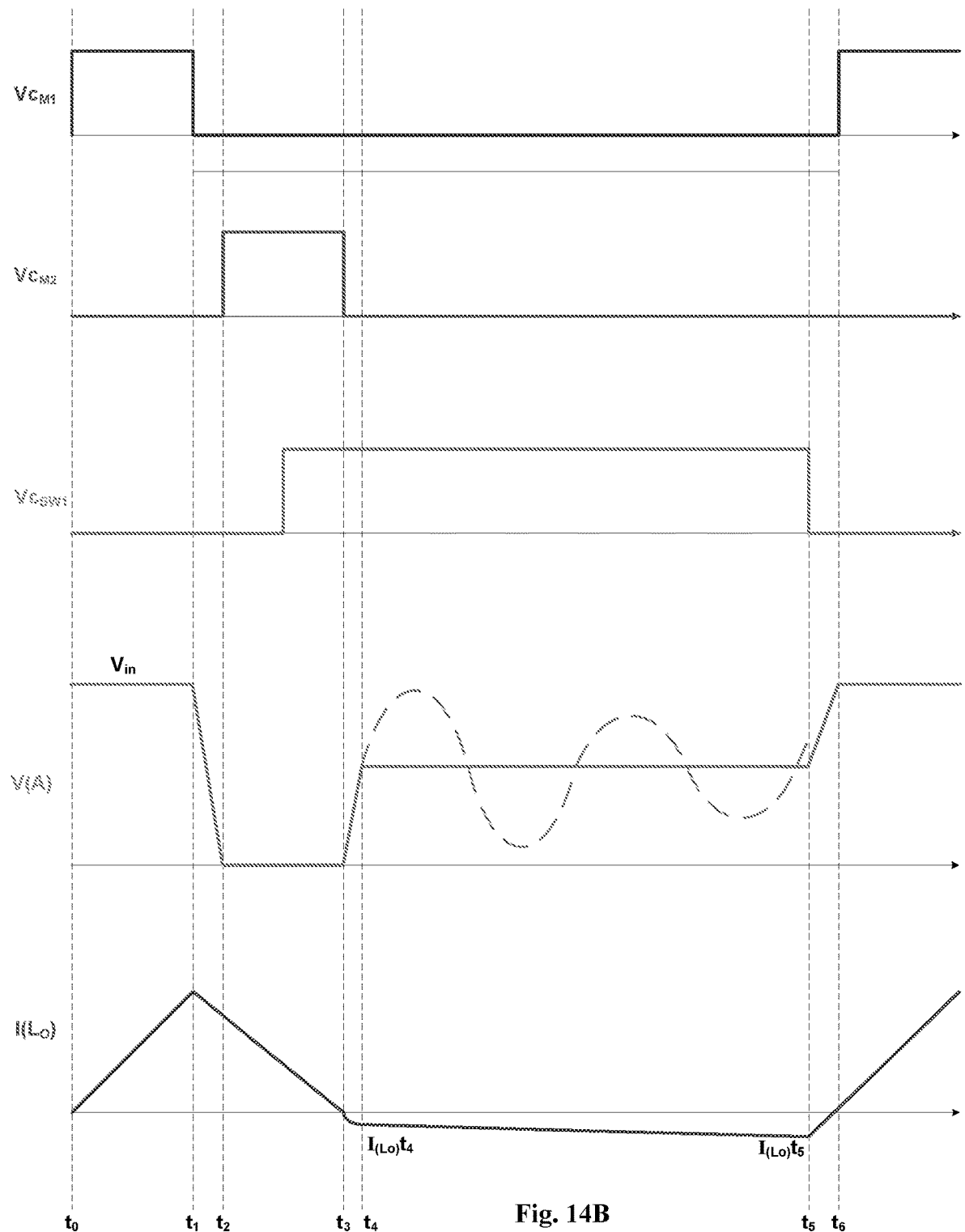
FIG. 14B depicts the key waveforms of the circuit presented in FIG. 14A.
Figure 15A:
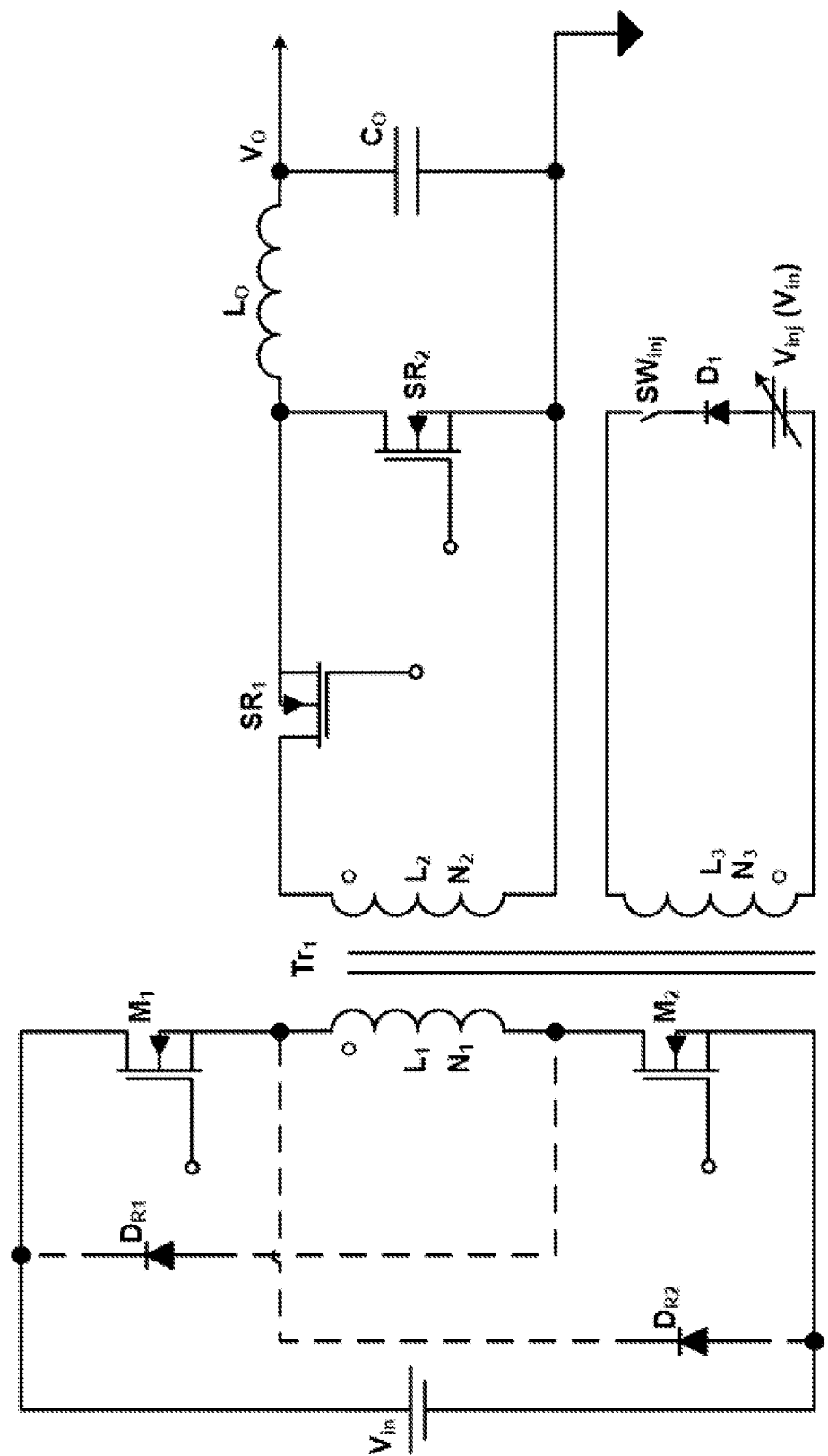
FIG. 15A depicts the two transistor forward topology with the energy injection circuit.
Figure 15B:
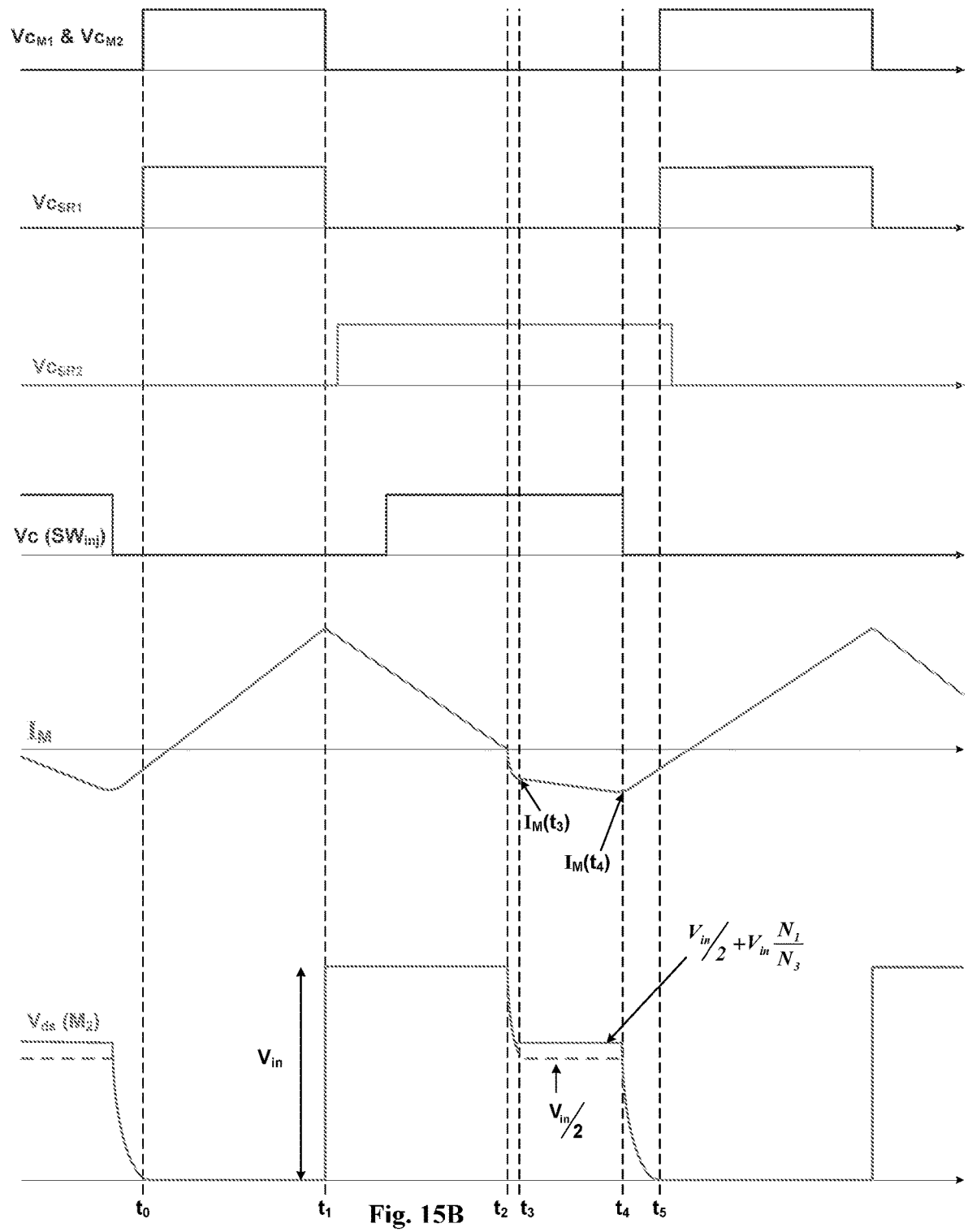
FIG. 15B depicts the key waveforms of the topology depicted in FIG. 15A.
Figure 16A:
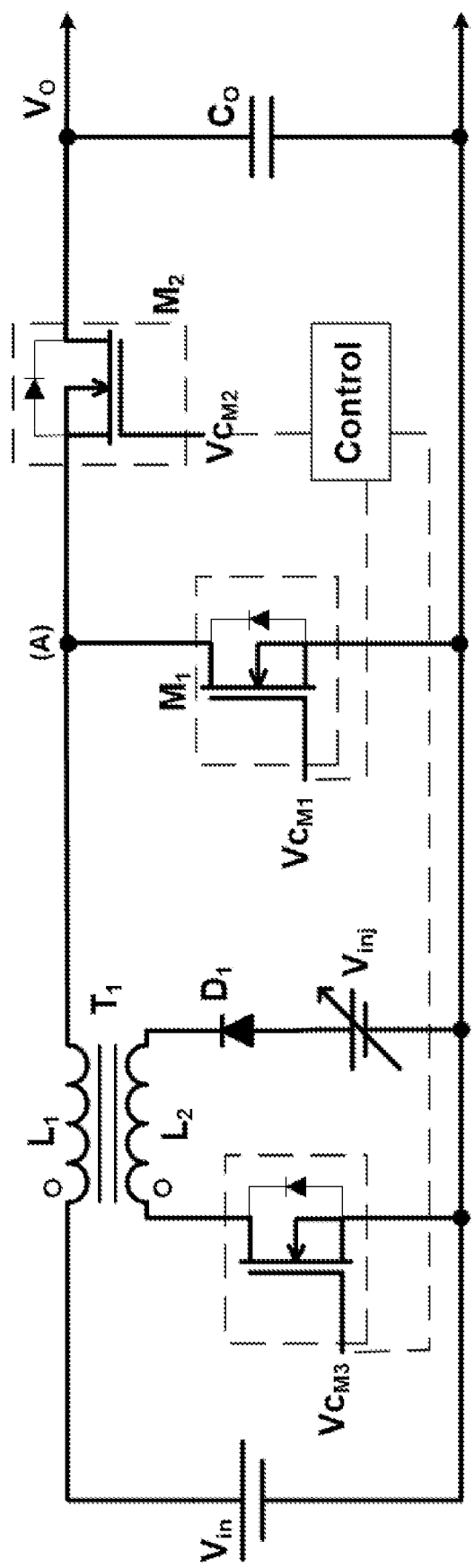
FIG. 16A depicts the boost topology with energy injection circuit.
Figure 16B:
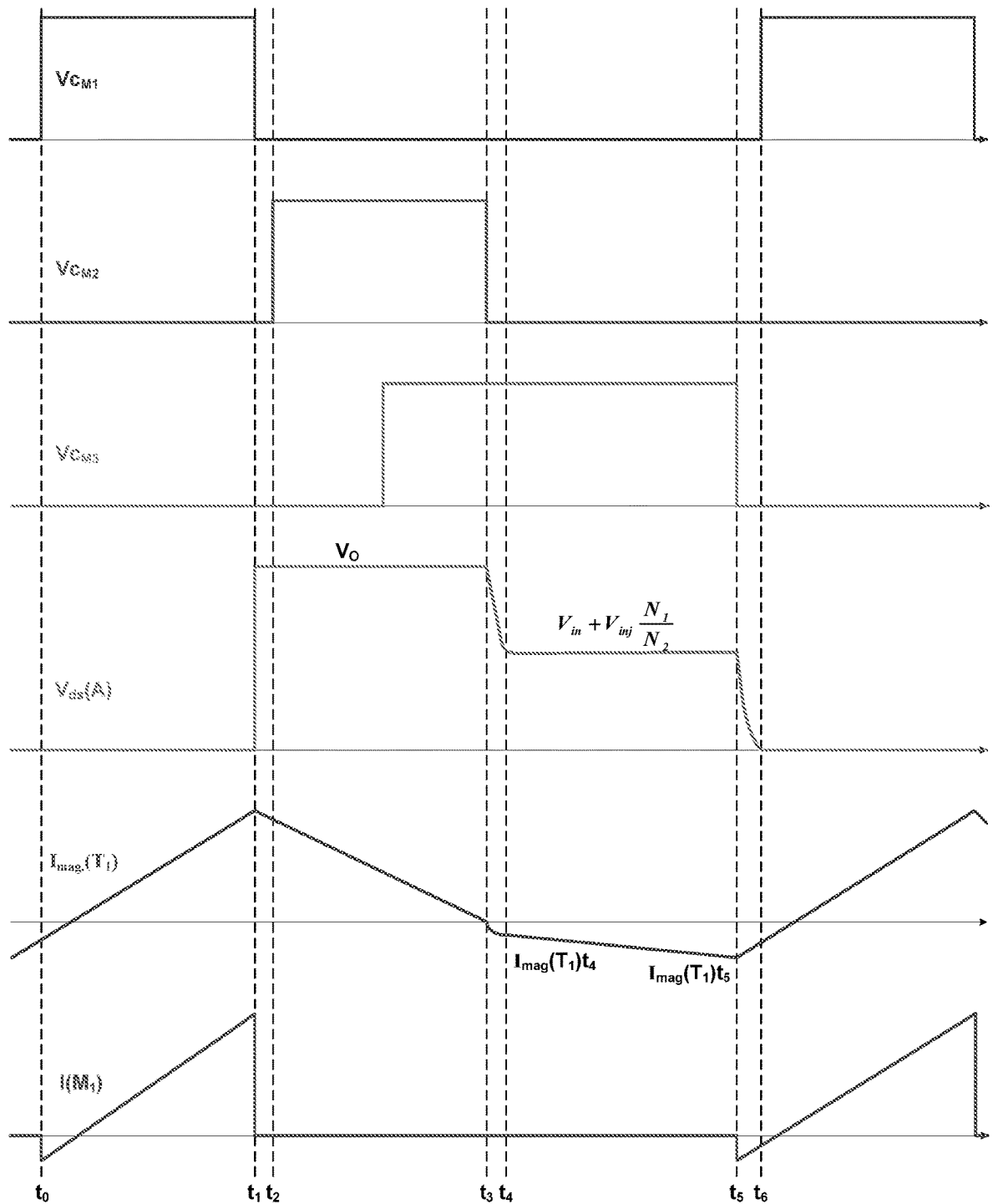
FIG. 16B depicts the key waveforms of the topology depicted in FIG. 16A.
Figure 17:
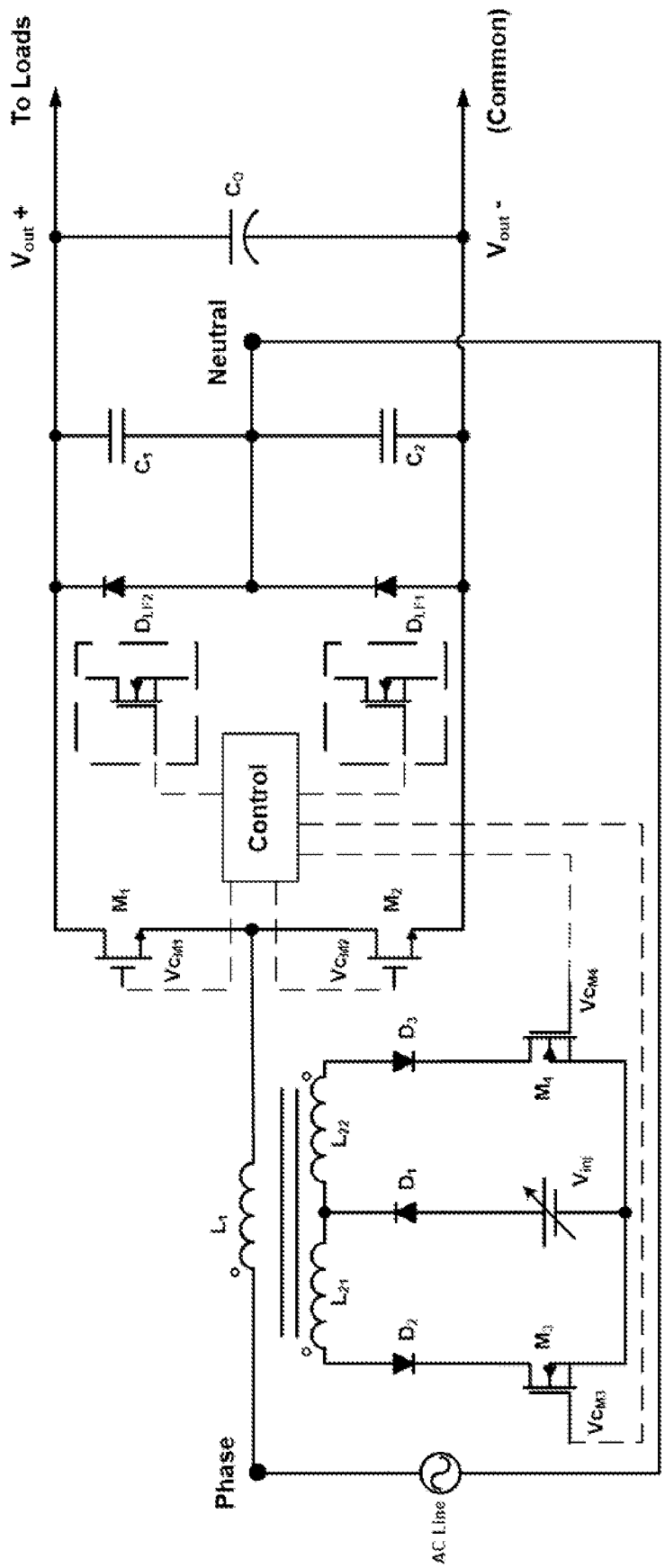
FIG. 17 presents the bridgeless totem pole PFC with the energy injection circuit.
Figure 18:
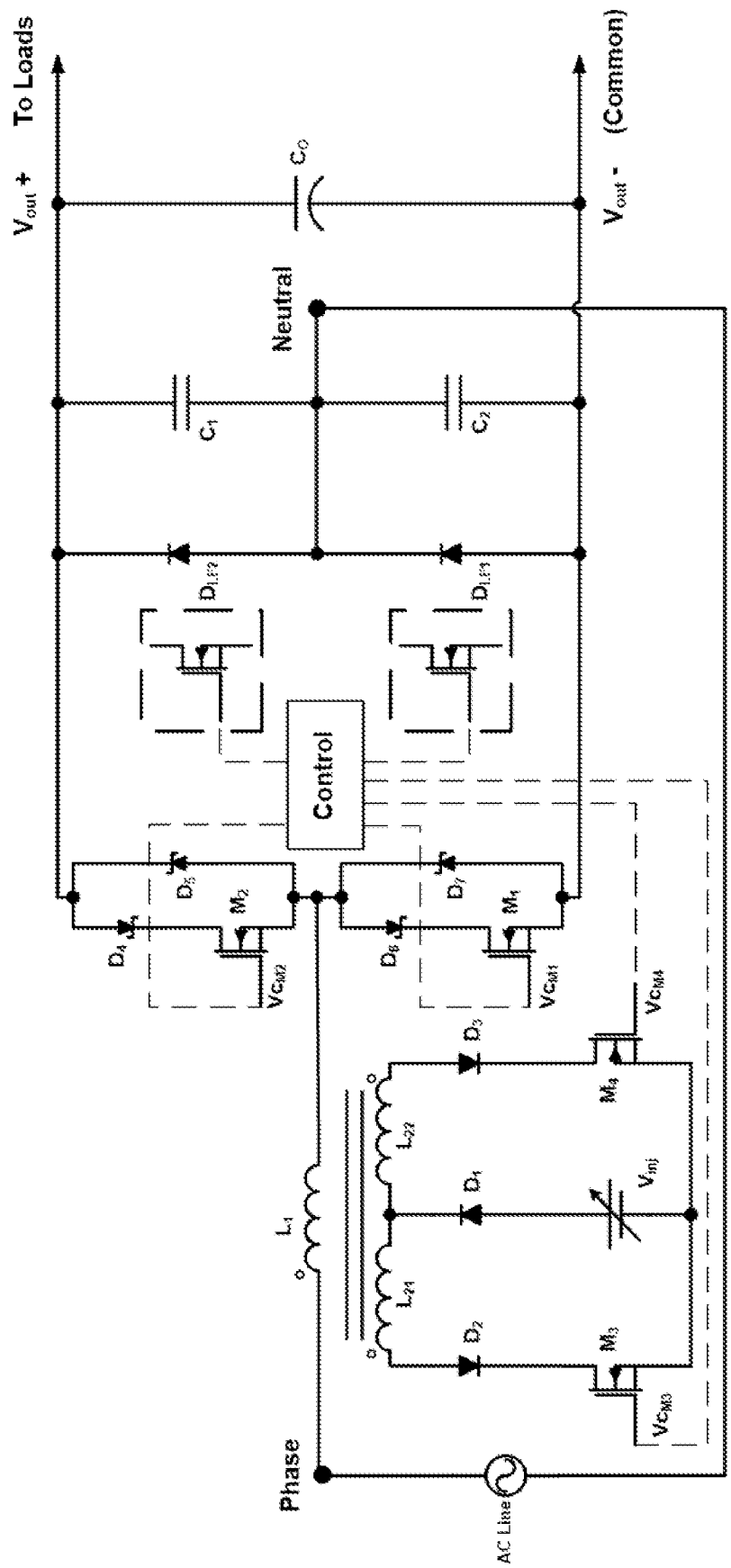
FIG. 18 presents another implementation of the bridgeless totem pole PFC with the energy injection circuit.
Figure 19A:
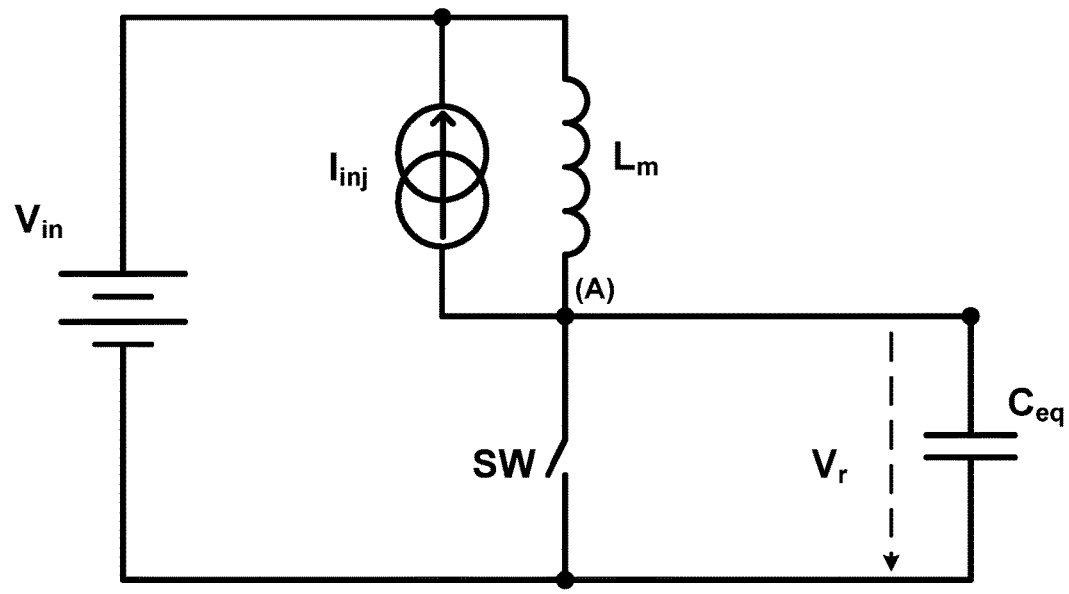
FIG. 19A depicts the resonant circuit with initial conditions with current injection.
Figure 19B:
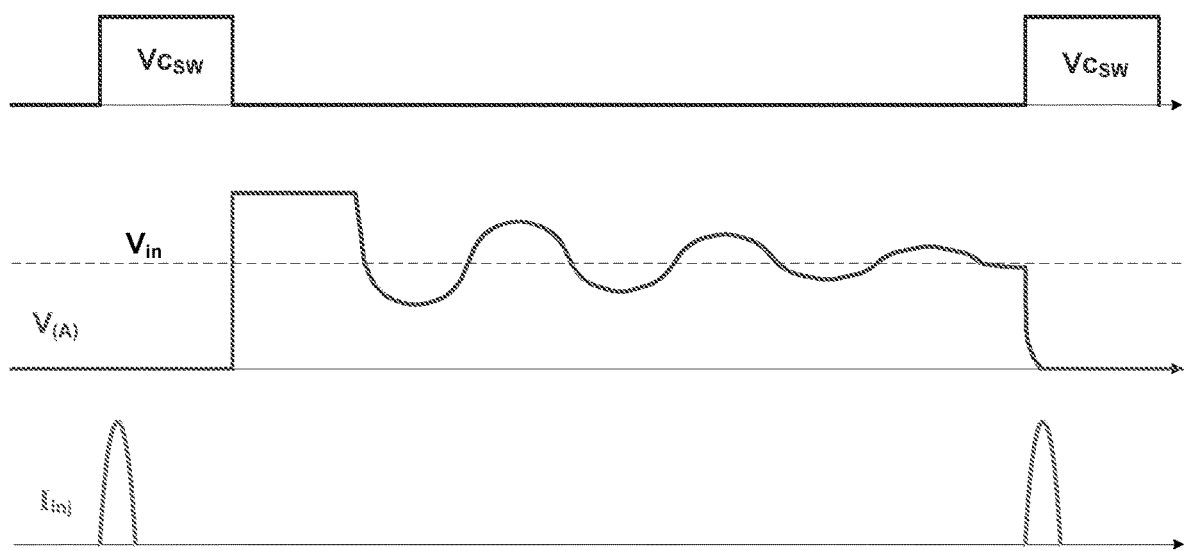
FIG. 19B depicts the key waveforms of the topology depicted in FIG. 19A.
Figure 20:
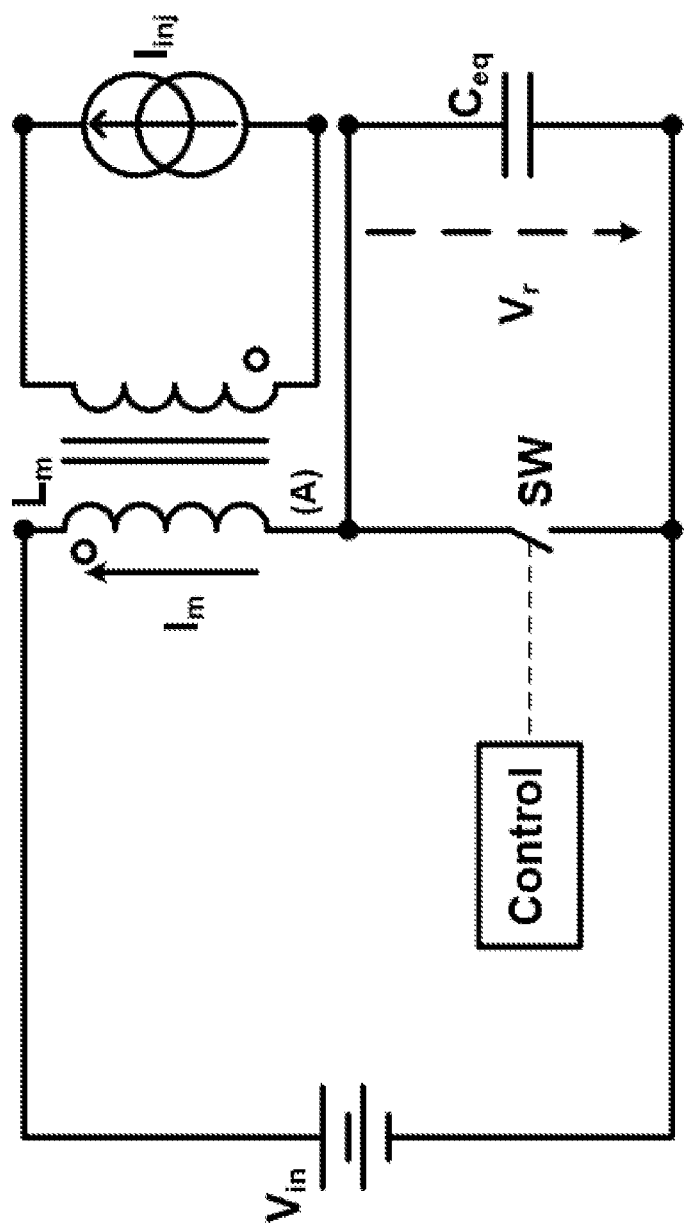
FIG. 20 presents an implementation of the concept depicted in FIG. 19A.
Figure 21A:
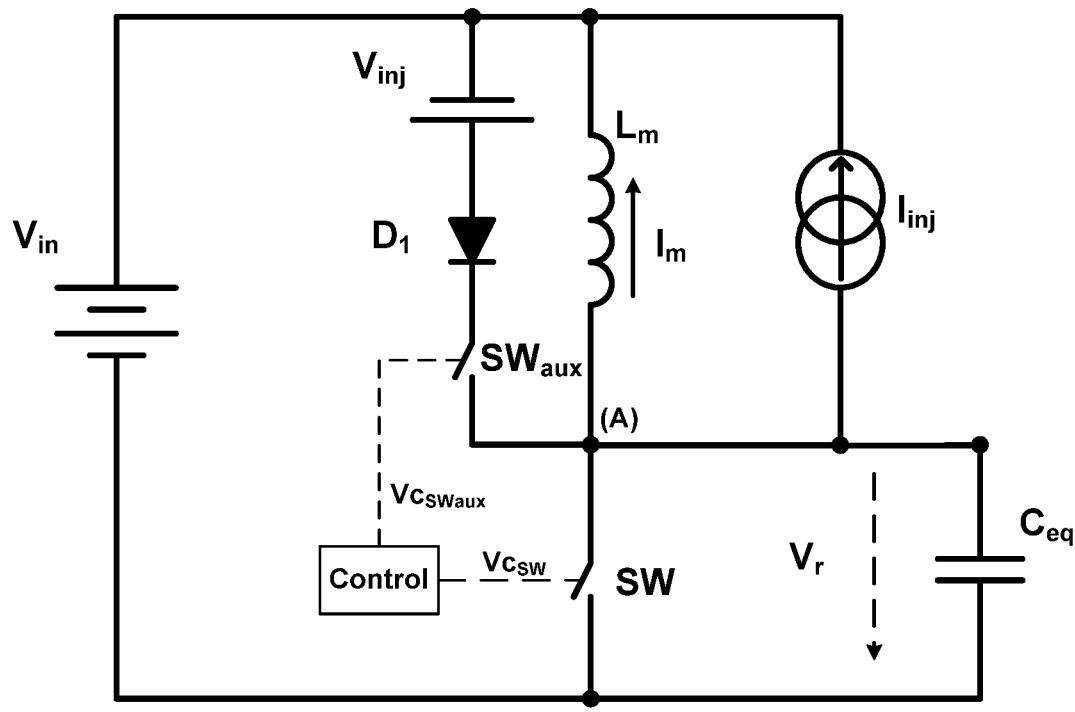
FIG. 21A presents a resonant circuit with initial conditions employing energy injection circuit and current injection circuit.
Figure 21B:
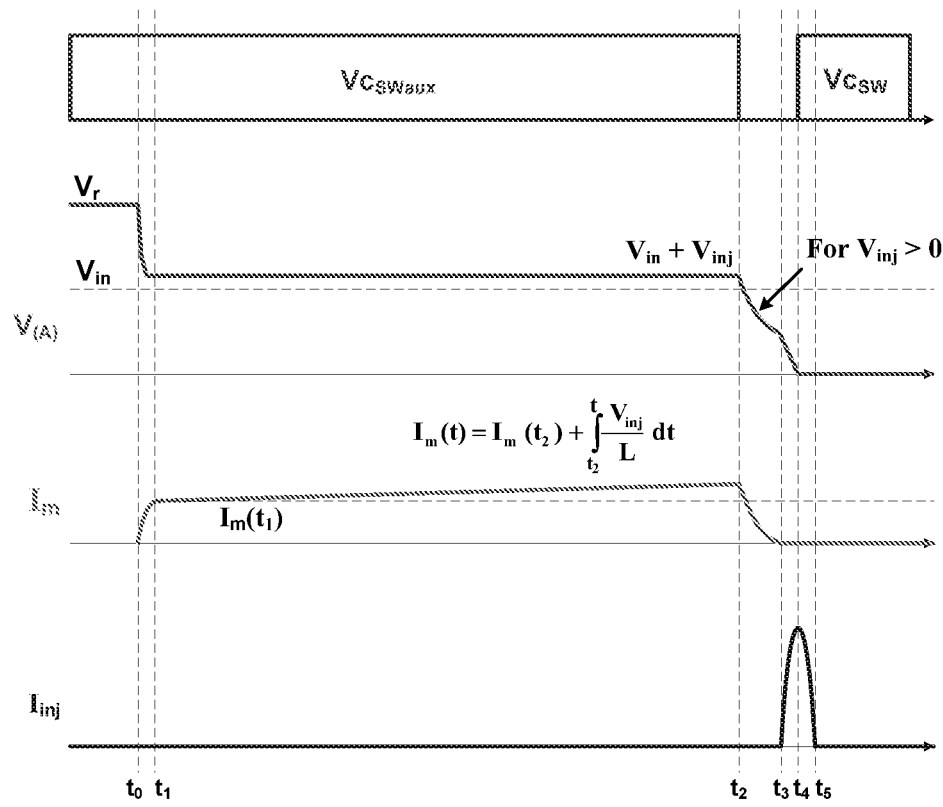
FIG. 21B depicts the key waveforms of the topology depicted in FIG. 21A.
Figure 22:
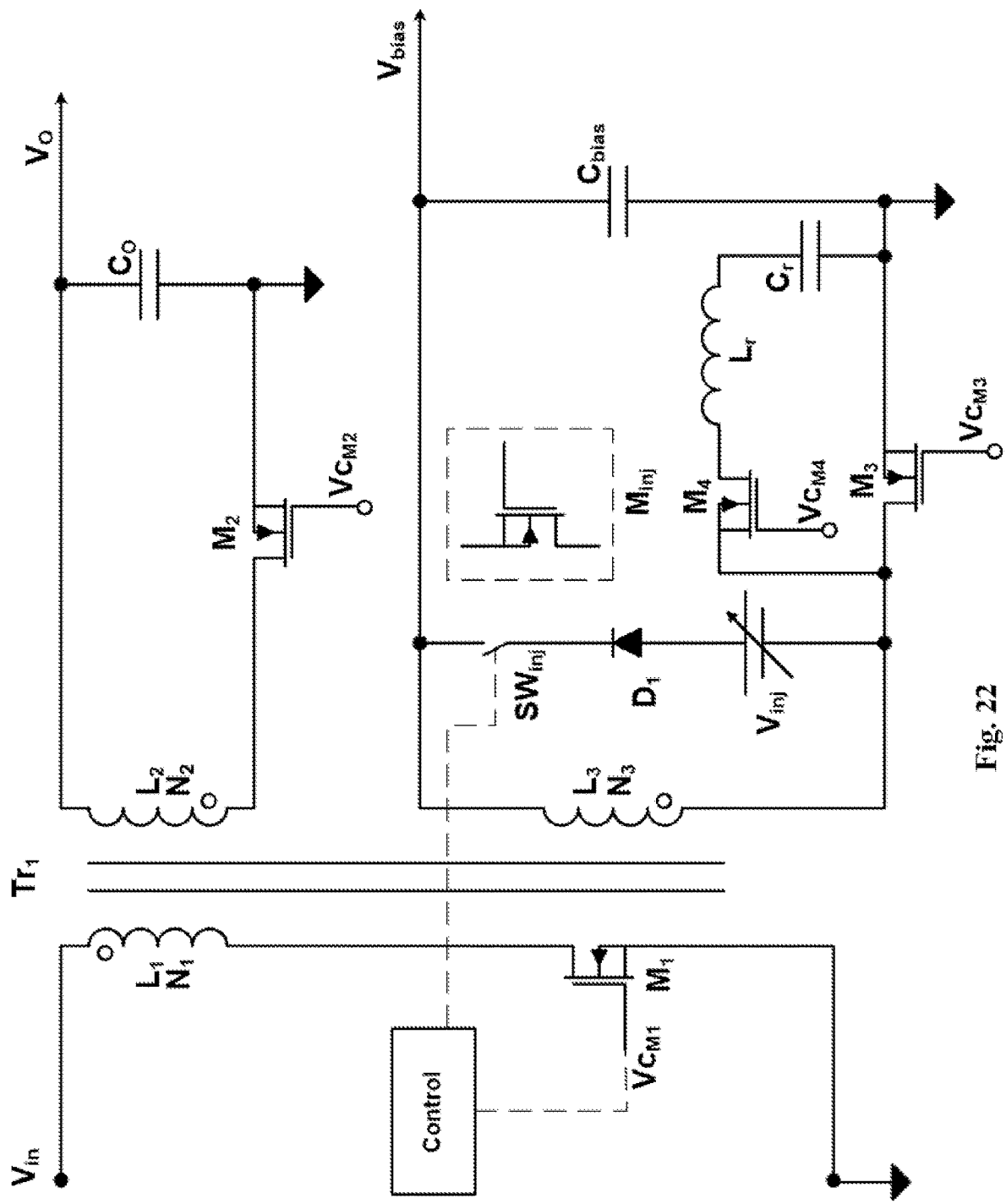
FIG. 22 presents the flyback topology employing the energy injection circuit and current injection.
Figure 23:
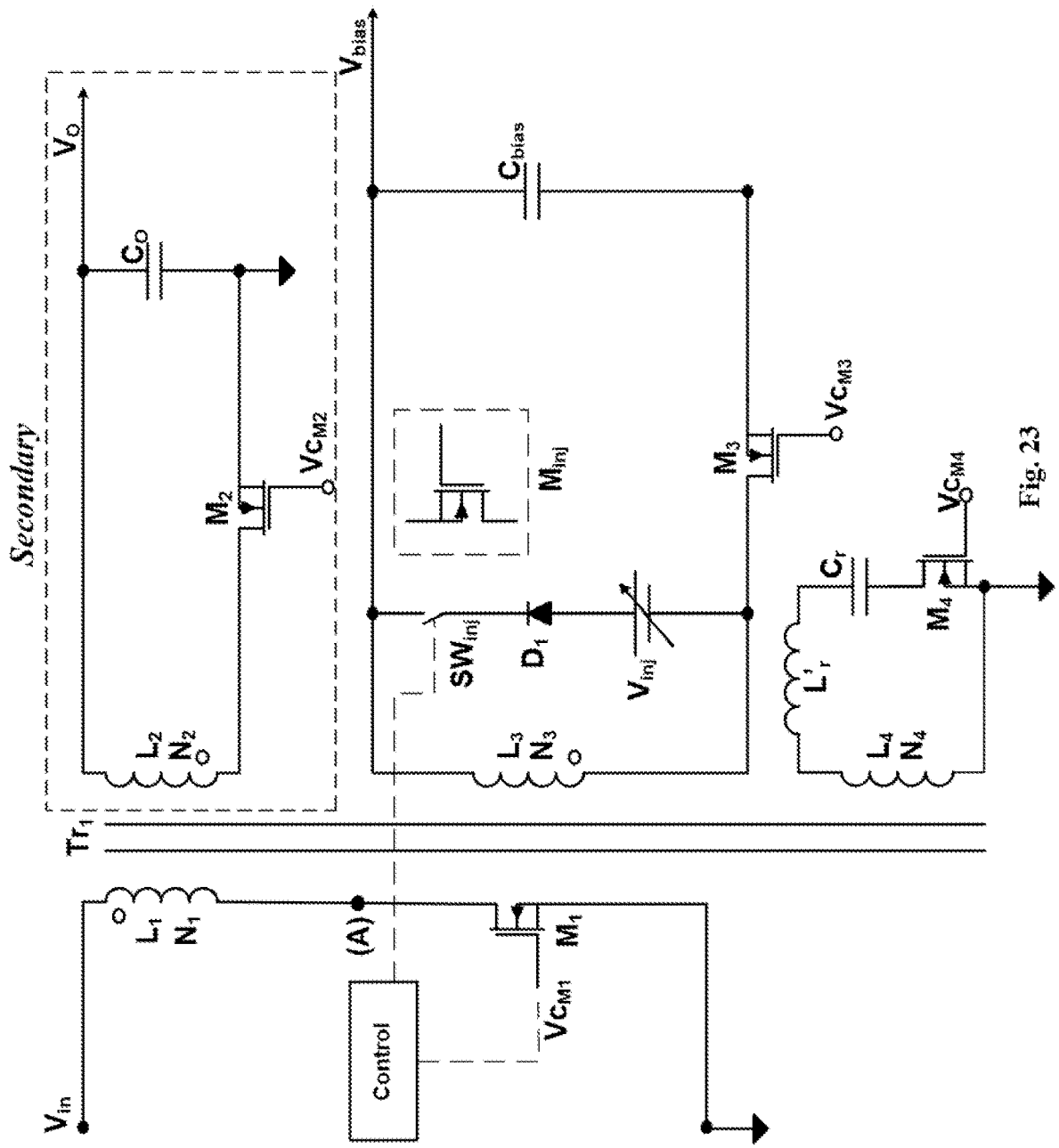
FIG. 23 presents a practical implementation of the flyback topology employing the energy injection circuit and current injection
Figure 24:
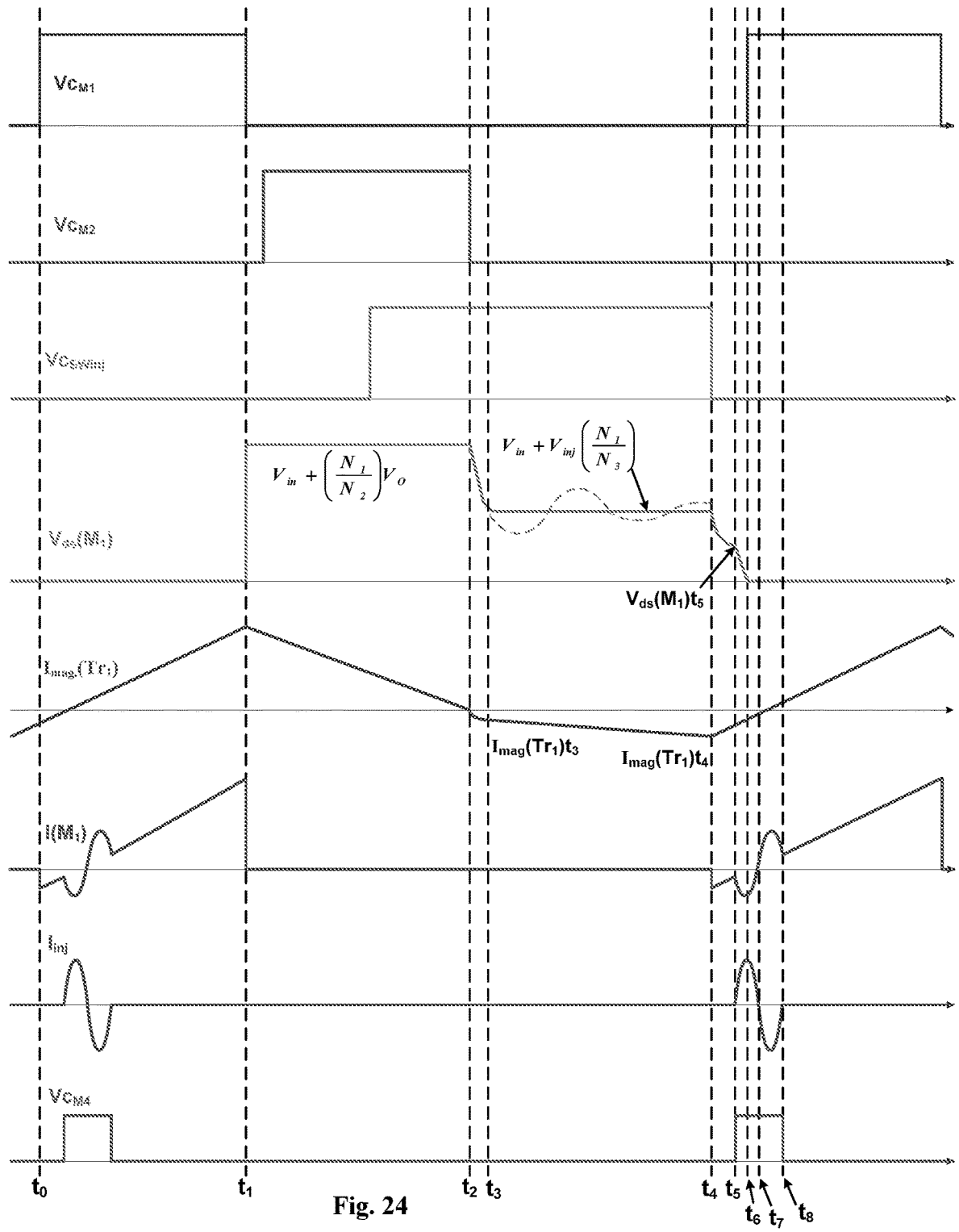
FIG. 24 depicts the key waveforms of the topology depicted in FIG. 23.
Figure 25:
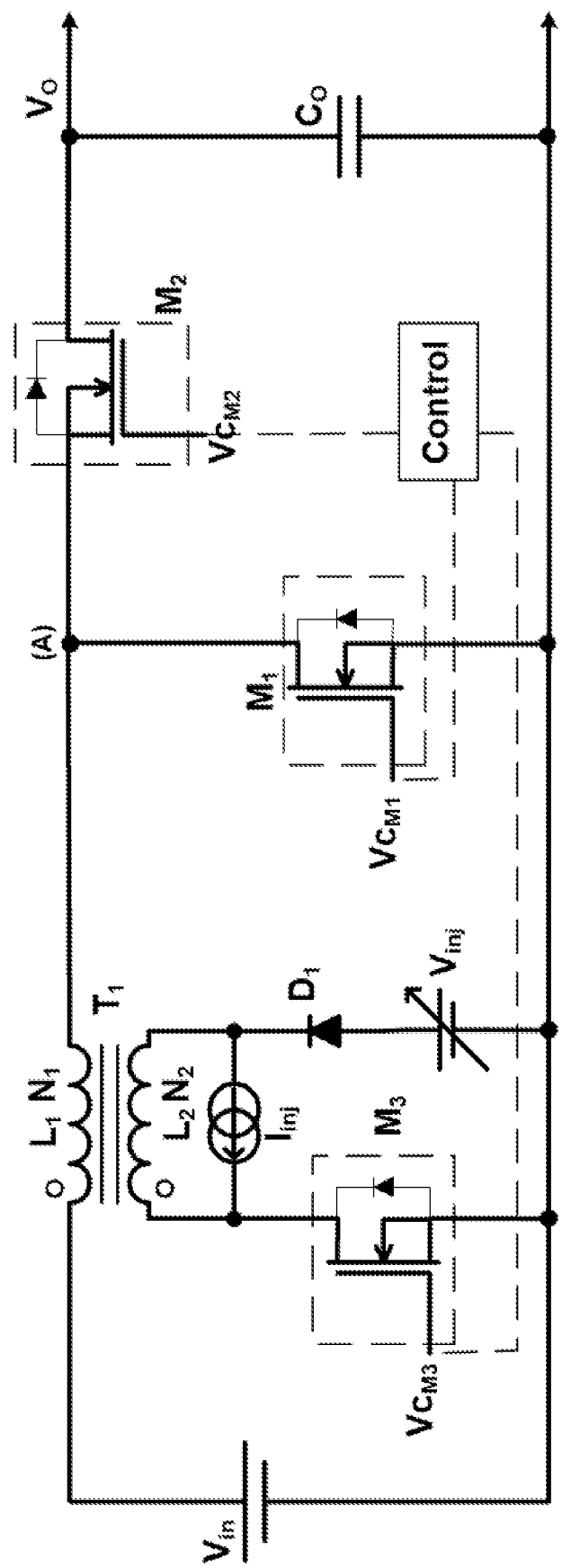
FIG. 25 presents an implementation of the boost topology employing the energy injection circuit and current injection.
Figure 26A:
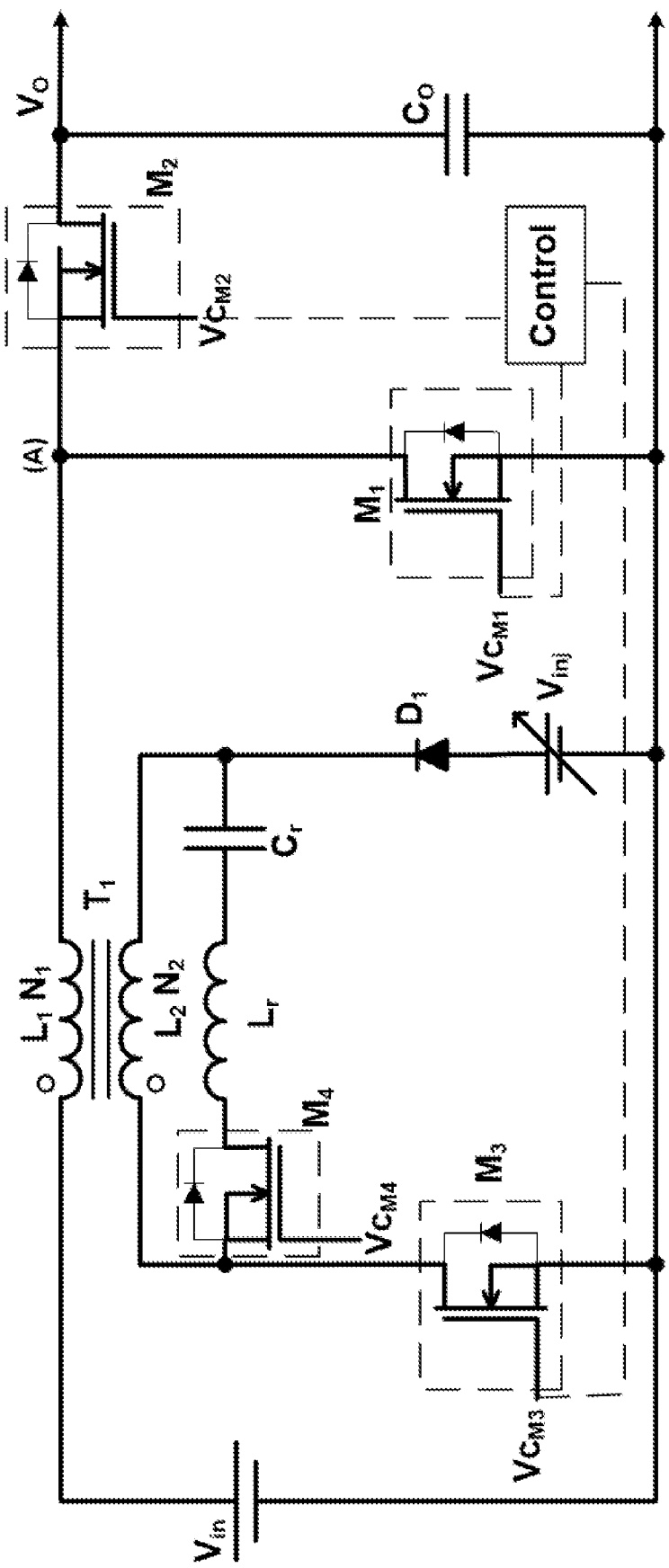
FIG. 26A presents a practical implementation of the boost topology employing the energy injection circuit and current injection.
Figure 26B:
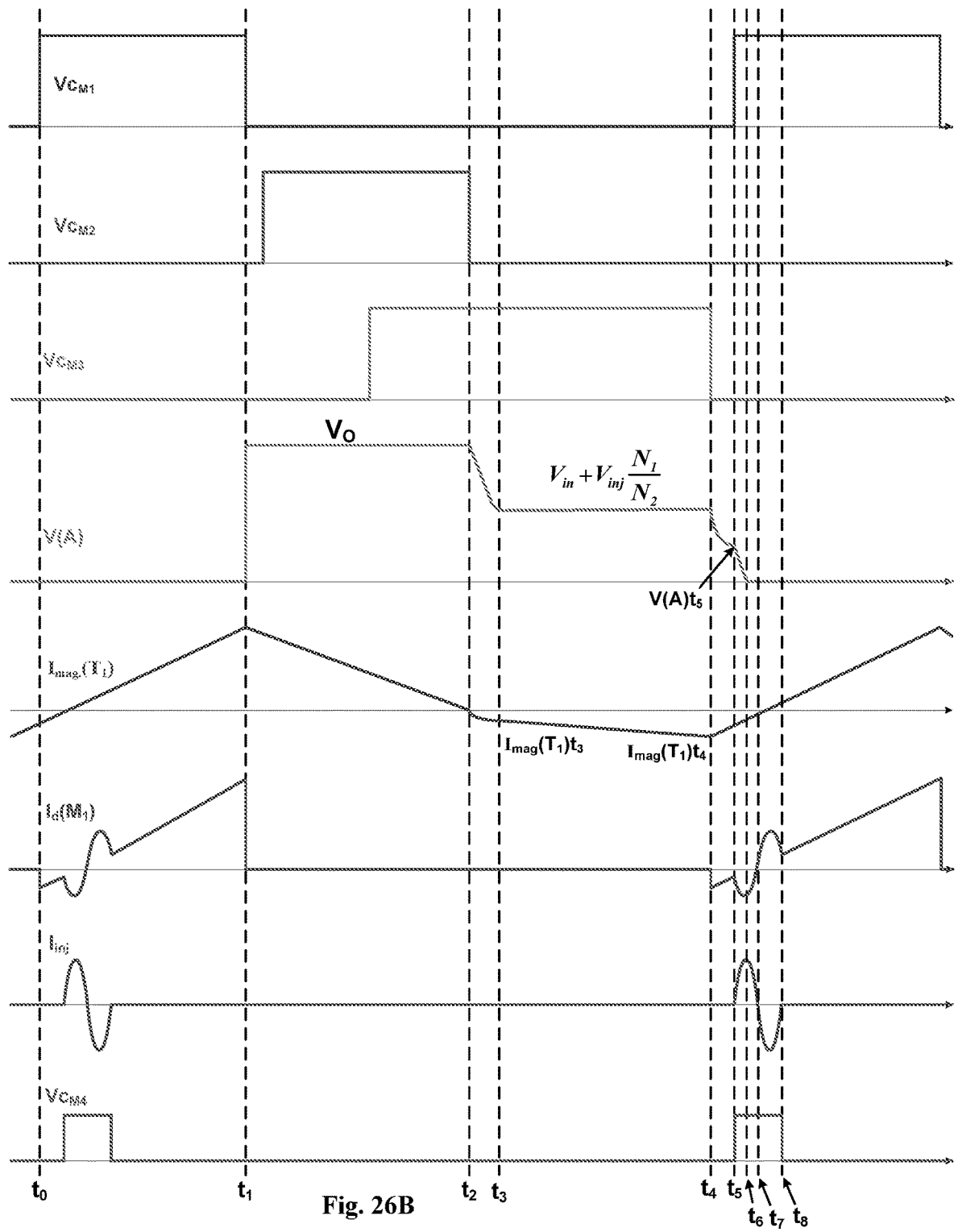
FIG. 26B depicts the key waveforms of the topology depicted in FIG. 26A.
Figure 27:
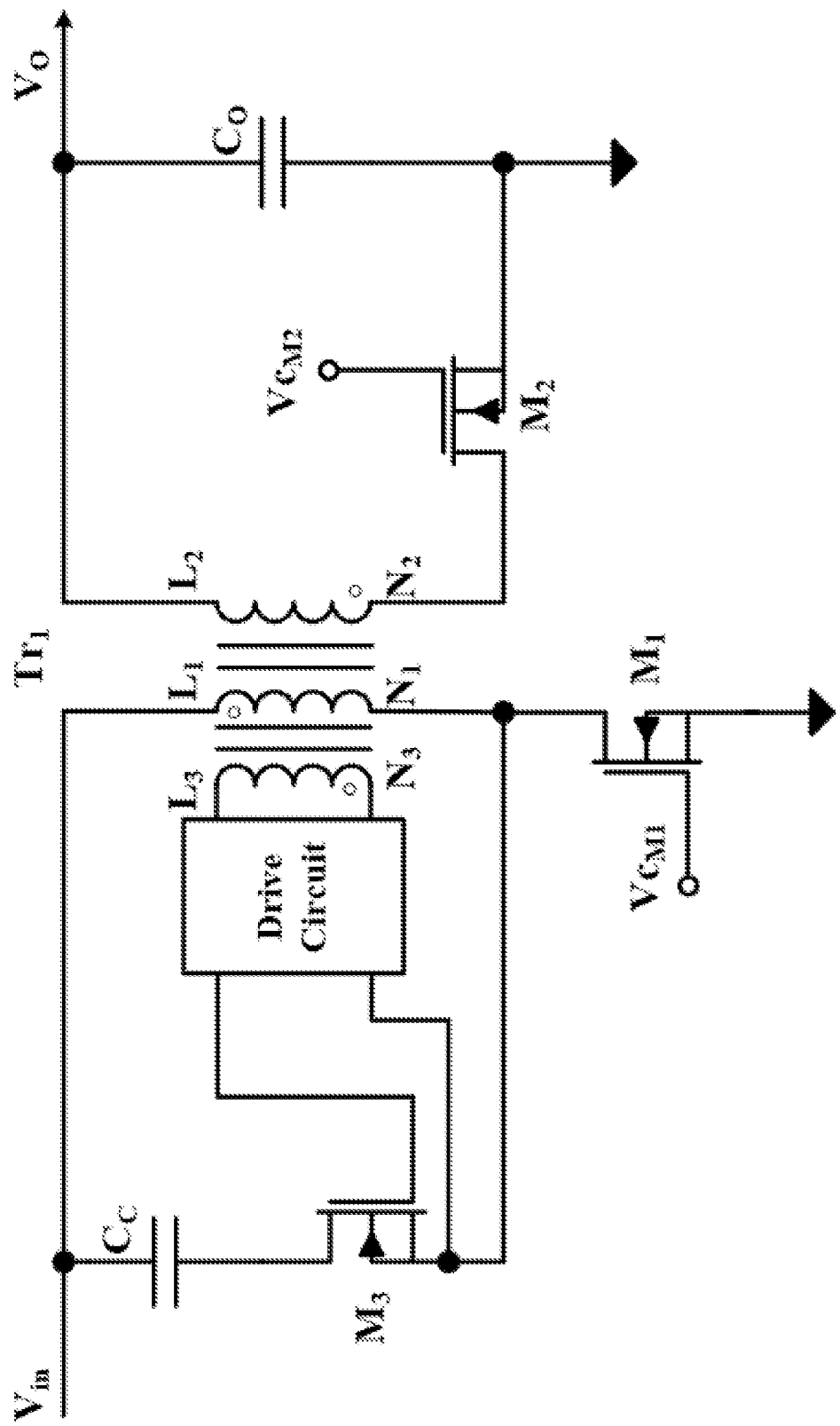
FIG. 27 presents a self-driven driving circuit for the clamp circuit.
Figure 28A:
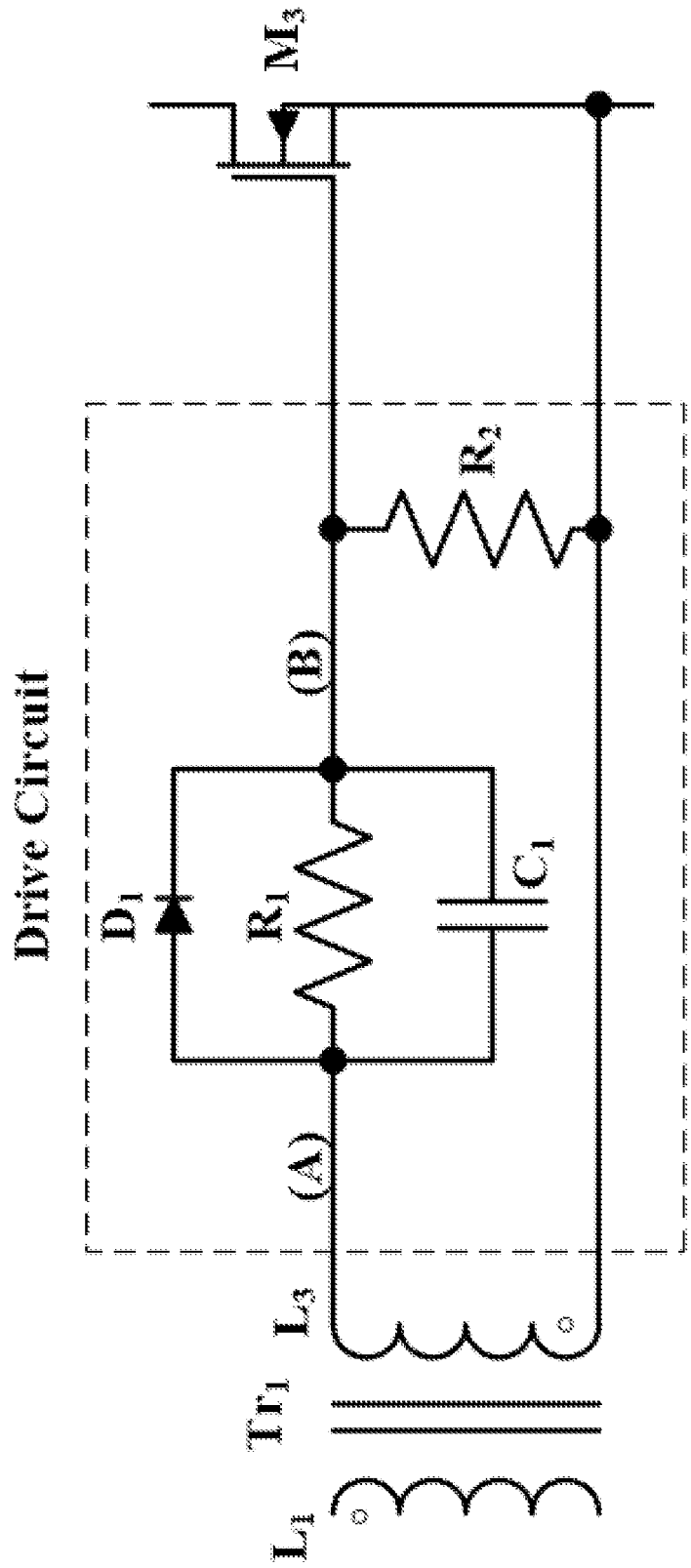
FIG. 28A presents the circuity associated with the drive circuit from FIG. 27.
Figure 28B:
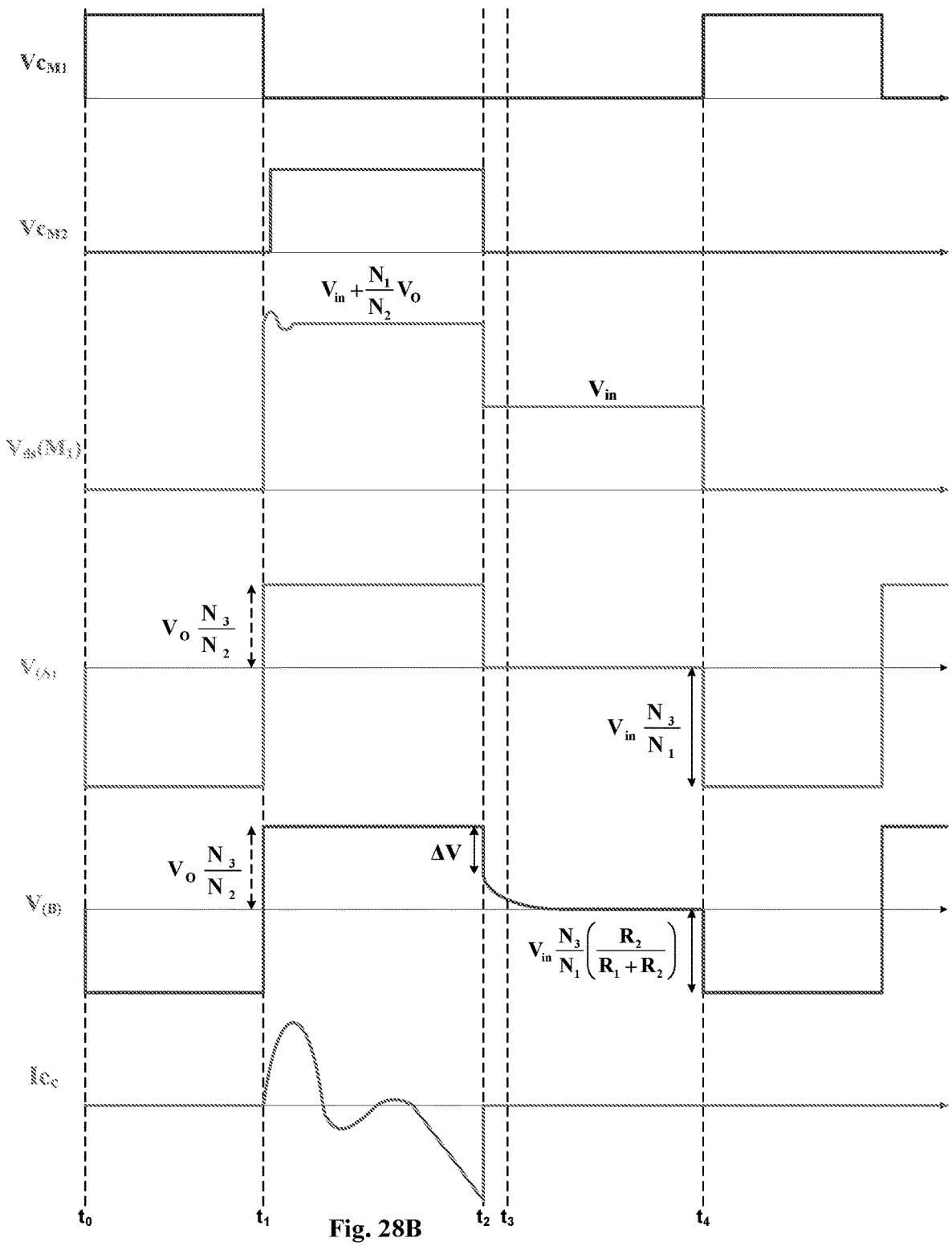
FIG. 28B presents the key waveforms of the circuit depicted in FIG. 28A.
Figure 29A:
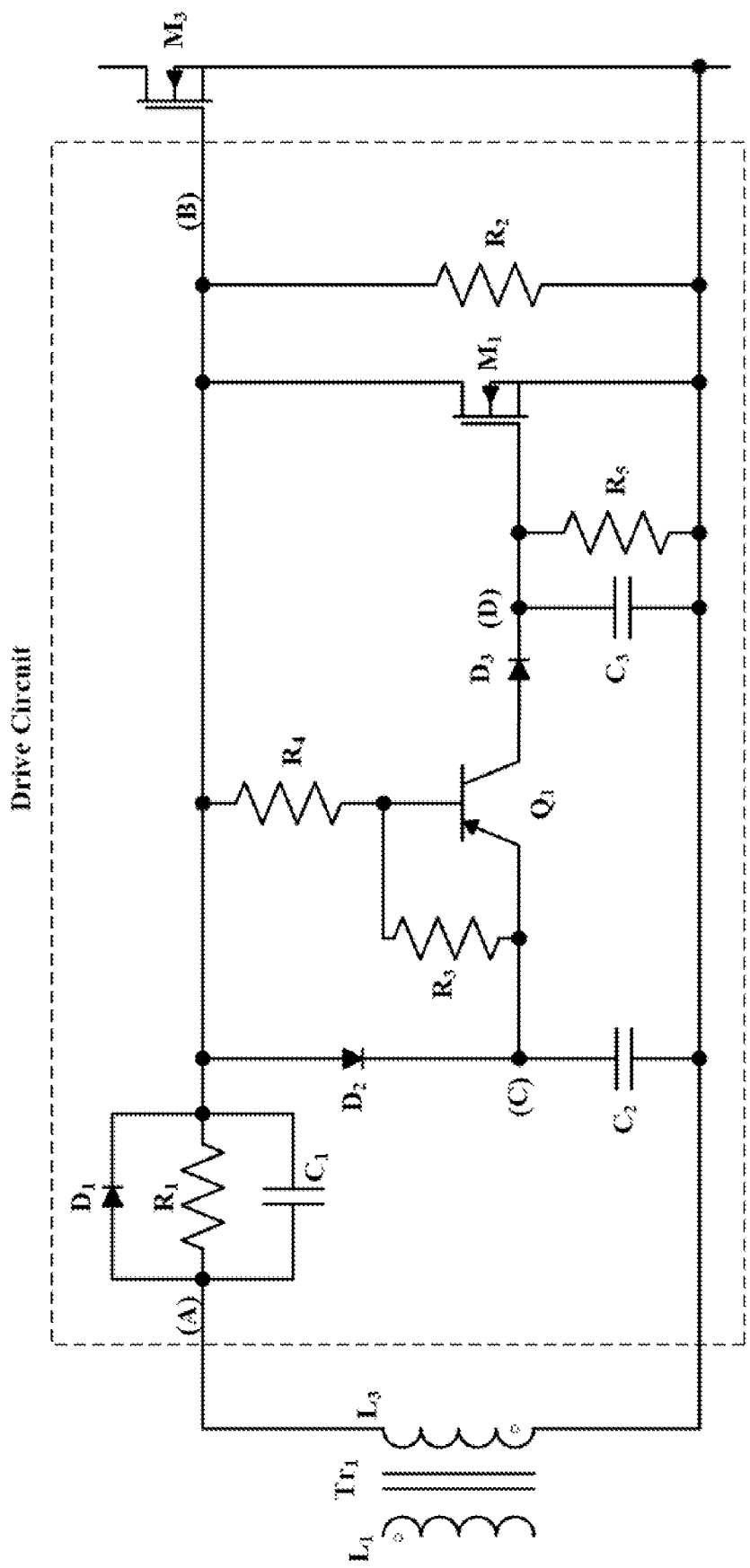
FIG. 29A presents another circuit implementation of the drive circuit from FIG. 27.
Figure 29B:
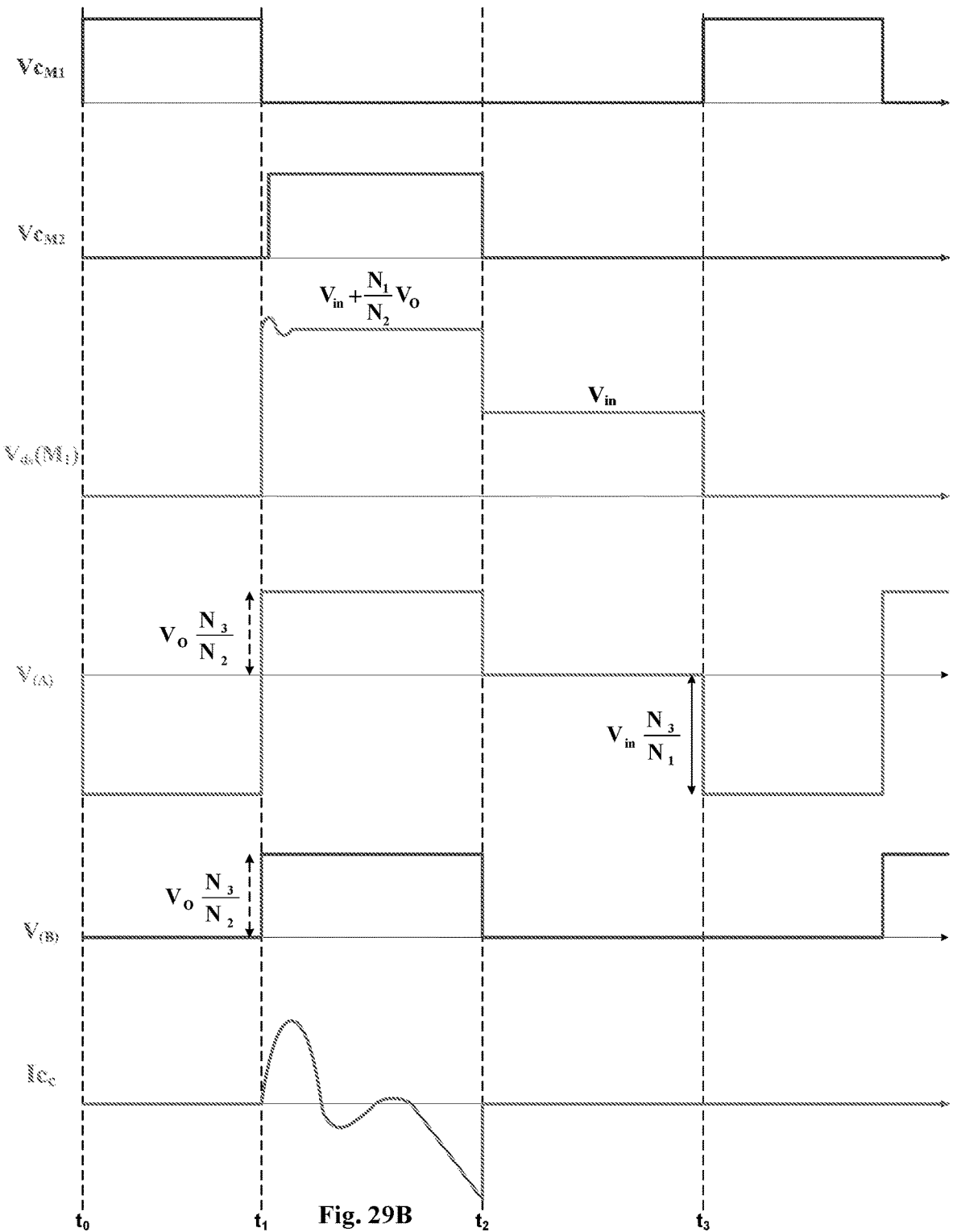
FIG. 29B presents the key waveforms of the circuit depicted in FIG. 29A.
Figure 30A:
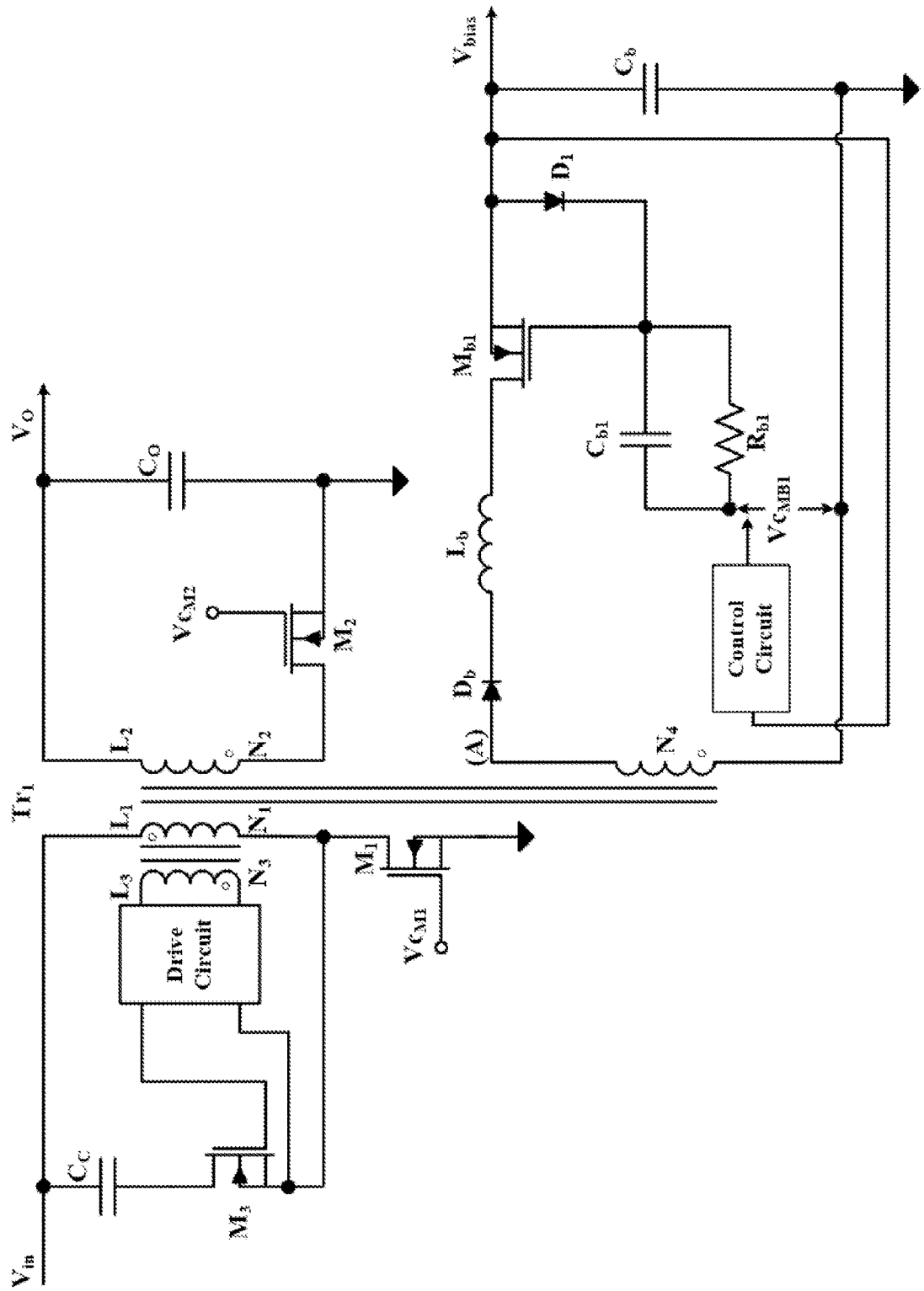
FIG. 30A presents a bias circuit for a flyback topology.
Figure 30B:
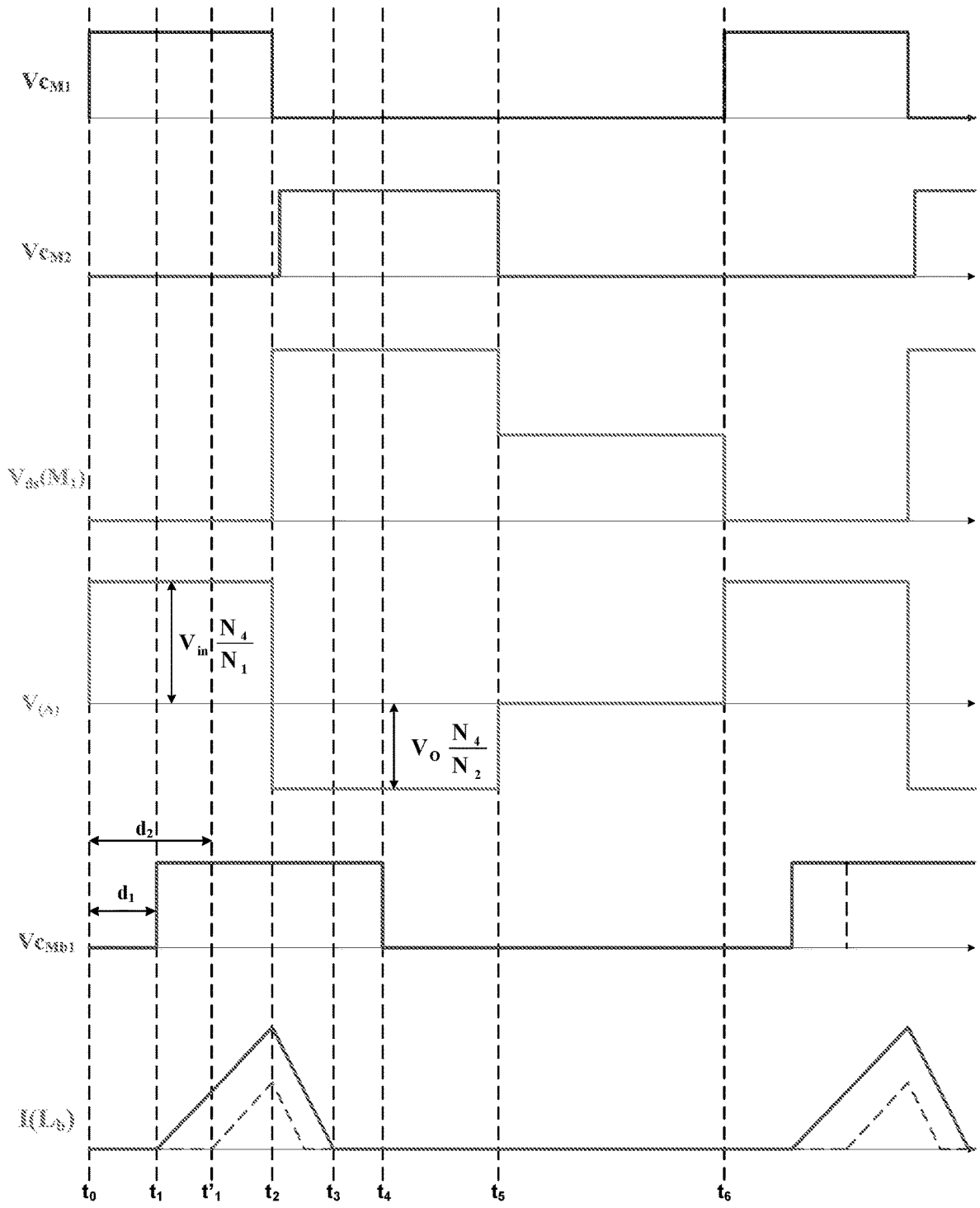
FIG. 30B presents the key waveforms of the circuit depicted in FIG. 30A.
Figure 31A:
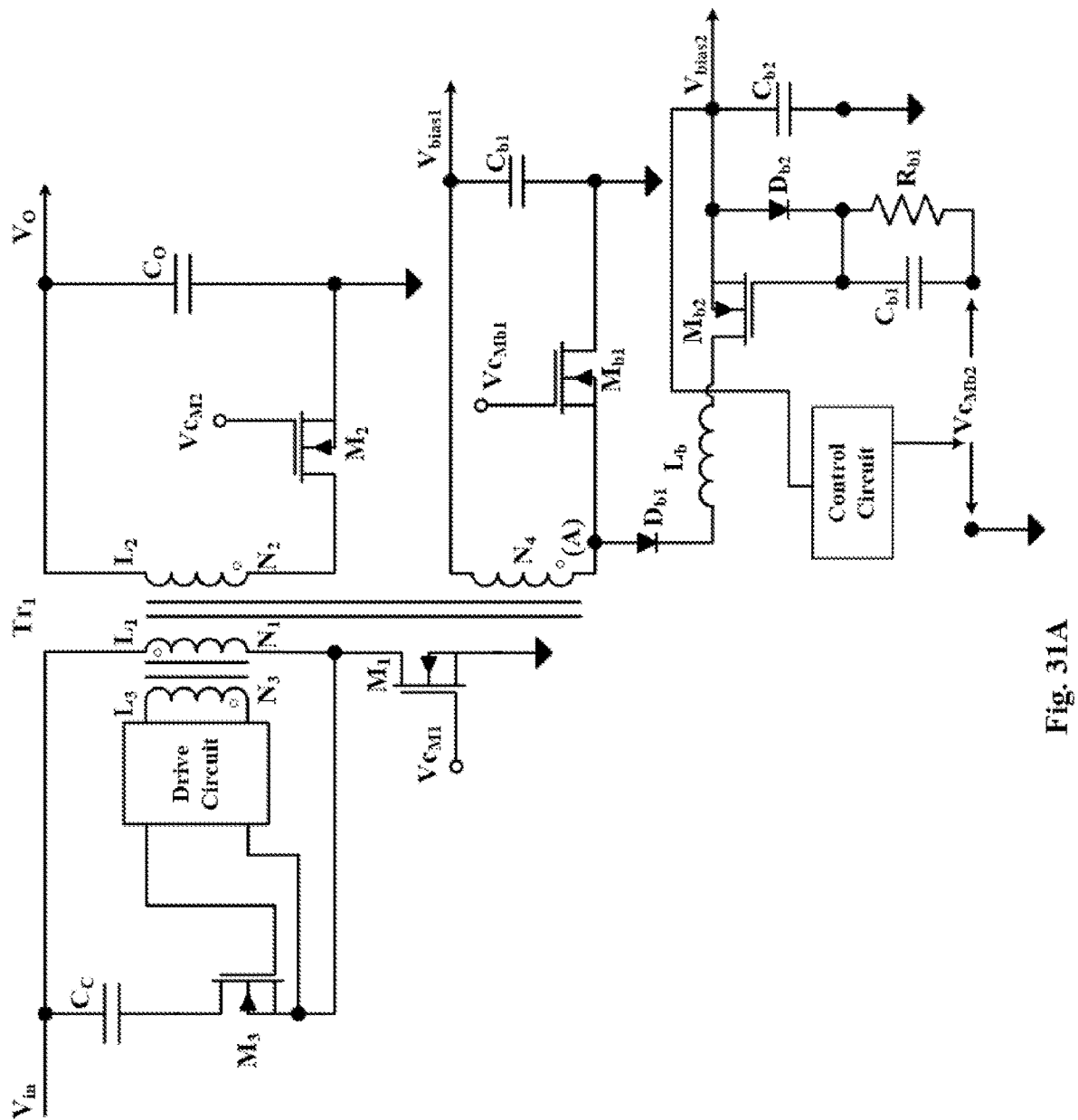
FIG. 31A presents another implementation of a bias circuit for a flyback topology.
Figure 31B:
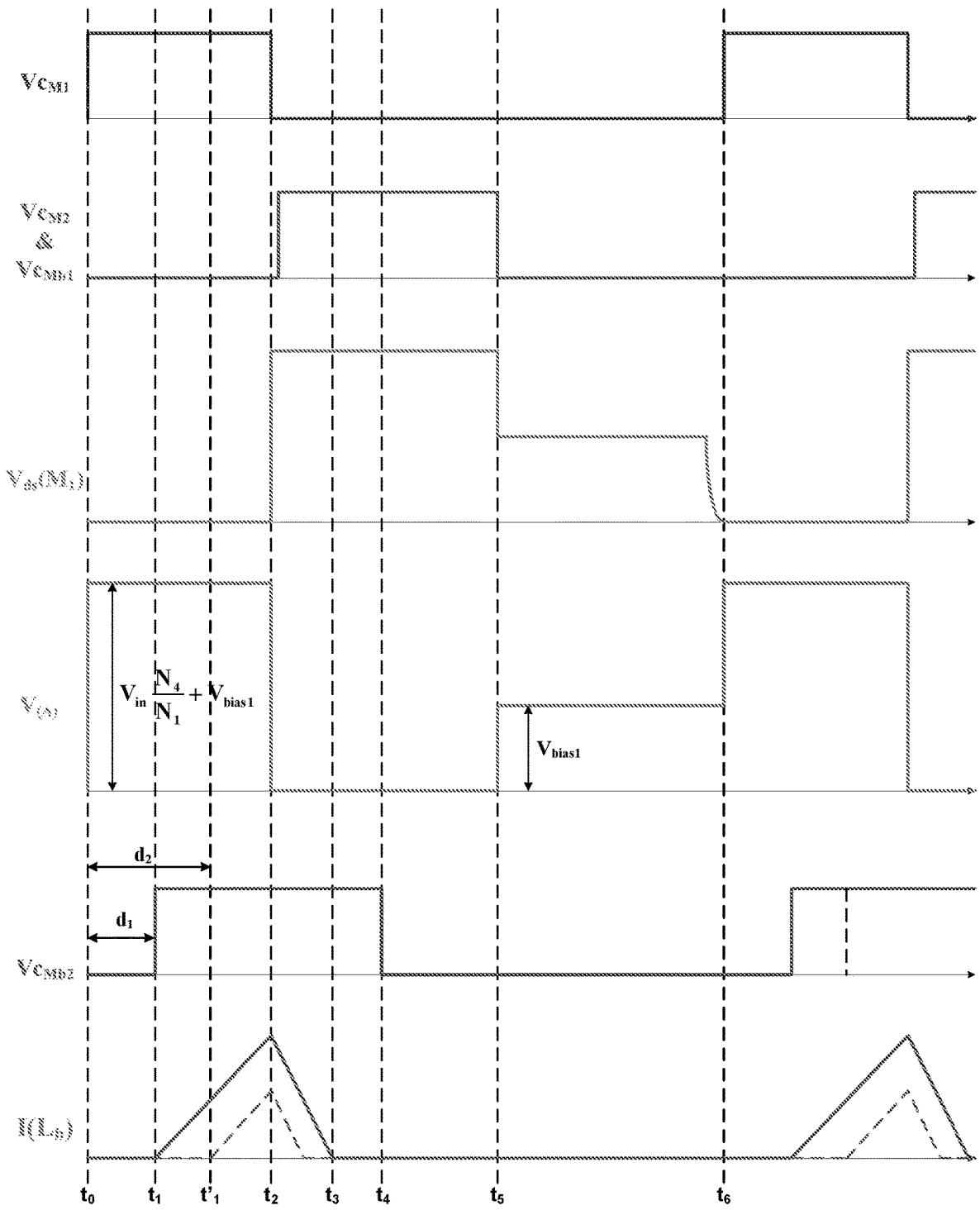
FIG. 31B presents the key waveforms of the circuit depicted in FIG. 31A.
Figure 32:
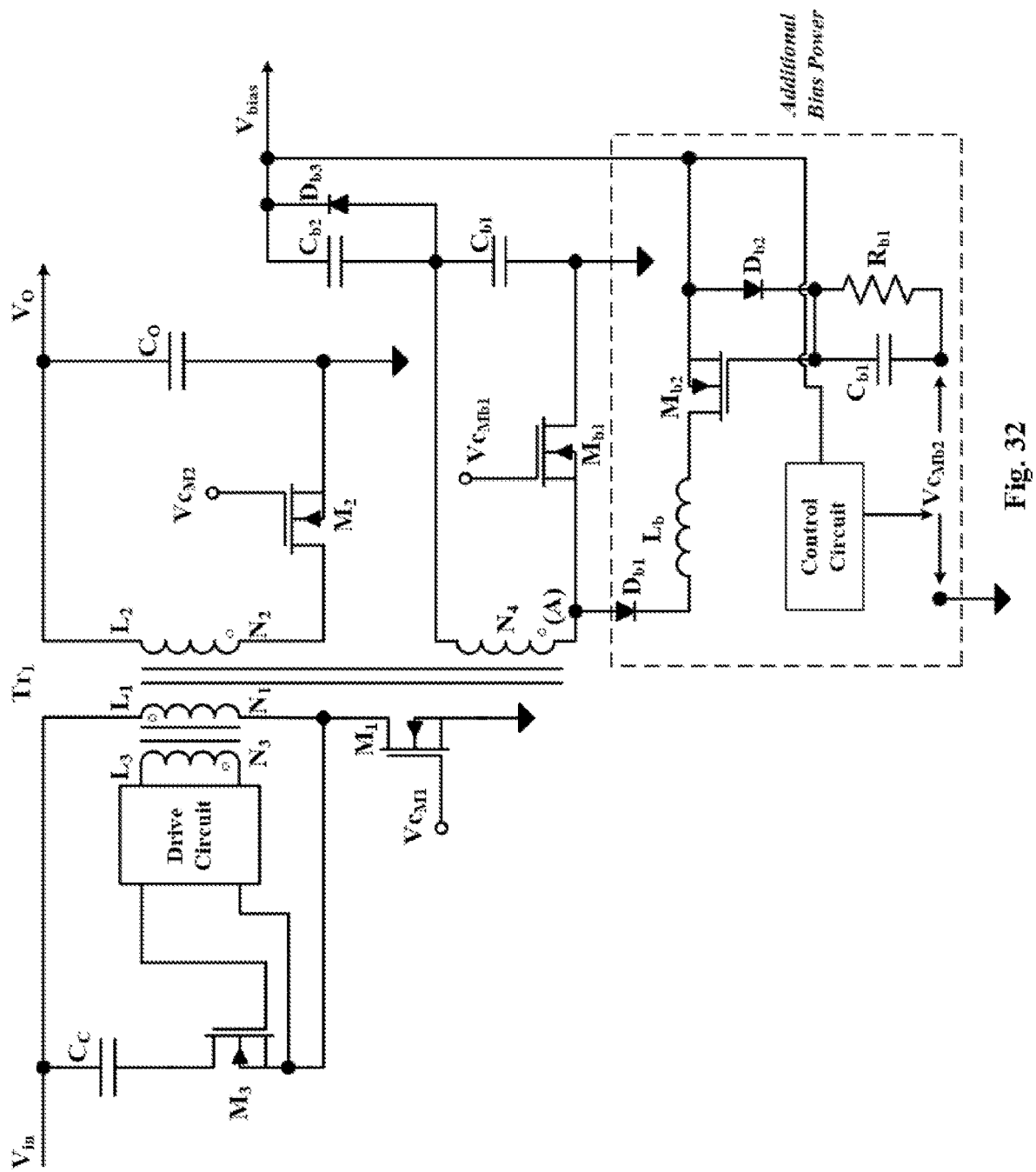
FIG. 32 presents another implementation of a bias circuit for a flyback topology compatible with variable output voltage.

The invention claimed is:

1. A resonant circuit formed in a power converter and comprising:
   an input voltage source;
   an inductive element; and
   a parasitic capacitance across a switching element of said power converter;
   wherein the resonant circuit is characterized by initial conditions, the initial conditions including an initial current through the inductive element and an initial voltage across the parasitic capacitance, and the resonant circuit is configured to receive energy injected from an independent voltage source, wherein said energy is derived from one of: 1) an energy source different than the input voltage source; and 2) the input voltage source but not during a switching cycle while energy injection occurs.

2. The resonant circuit formed in the power converter according to claim 1, wherein the power converter is configured according to a flyback topology, and wherein said voltage injection source is configured to be energized from the input voltage for the power converter in a forward mode.

3. The resonant circuit formed in the power converter according to claim 1, wherein the power converter is configured according to a boost topology, and wherein said voltage injection source is configured to be energized from input voltage for the power converter in a forward mode.

4. The resonant circuit formed in the power converter according to claim 1, wherein the power converter is configured according to a buck topology, and wherein said voltage injection source is configured to be energized from input voltage for the power converter in a forward mode.

5. The resonant circuit formed in the power converter according to claim 1, wherein the power converter includes a controlled current source configured to be injected in the parasitic capacitance across the switching element before the switching element turns on to discharge the parasitic capacitance toward zero.

* * * * *